United States Patent
Hosier, Jr.

(10) Patent No.: US 10,635,263 B2
(45) Date of Patent: Apr. 28, 2020

(54) ONLINE SYSTEMS AND METHODS FOR ADVANCING INFORMATION ORGANIZATION SHARING AND COLLECTIVE ACTION

(71) Applicant: Gerald Douglas Hosier, Jr., Crested Butte, CO (US)

(72) Inventor: Gerald Douglas Hosier, Jr., Crested Butte, CO (US)

( * ) Notice: Subject to any disclaimer, the term of this patent is extended or adjusted under 35 U.S.C. 154(b) by 135 days.

(21) Appl. No.: 15/289,035

(22) Filed: Oct. 7, 2016

(65) Prior Publication Data

US 2017/0024091 A1 Jan. 26, 2017

Related U.S. Application Data

(63) Continuation-in-part of application No. 15/059,301, filed on Mar. 2, 2016, which is a continuation-in-part
(Continued)

(51) Int. Cl.
| | |
|---|---|
| G06F 3/048 | (2013.01) |
| G06F 3/0482 | (2013.01) |
| G06F 3/0488 | (2013.01) |
| G06F 3/0481 | (2013.01) |
| H04L 12/58 | (2006.01) |

(Continued)

(52) U.S. Cl.
CPC ........ *G06F 3/0482* (2013.01); *G06F 3/04817* (2013.01); *G06F 3/04883* (2013.01); *G06F 40/166* (2020.01); *H04L 51/32* (2013.01); *H04L 67/306* (2013.01); *H04M 1/72522* (2013.01); *H04W 4/00* (2013.01); *H04W 4/21* (2018.02);
(Continued)

(58) Field of Classification Search
CPC ...... G06F 3/0482; G06F 3/0485; G06F 3/167; G06F 3/0481; G06F 3/04883; G06F 8/61; G06F 9/451; G06F 3/04817; G06F 3/0484; G06F 3/165; G06F 19/328; G06F 21/606; G06F 21/74; G06F 2203/04803; G06F 2221/2121; G06F 2221/2123; G06F 3/013; G06F 3/04845; G06F 16/957; G06F 16/9577; G06F 17/276; G06F 19/326; G06F 19/3418; G06F 21/6245; G06F 2203/04808; G06F 3/03547; G06F 3/038; G06F 3/04855; G06F 3/0488; H04W 4/21; H04W 51/32; H04M 1/72522
See application file for complete search history.

(56) References Cited

U.S. PATENT DOCUMENTS 7,949,611 B1 * 5/2011 Nielsen ............... G06F 21/6245
705/319
8,321,364 B1 2/2012 Gharpure et al.
(Continued)

OTHER PUBLICATIONS

Rainic et al., "Coming and Going on Facebook," Pew Research Internet Project (Feb. 5, 2013).
(Continued)

*Primary Examiner* — Di Xiao
(74) *Attorney, Agent, or Firm* — Law Offices of Gerald D. Hosier

(57) ABSTRACT

Methods and systems and mobile device interfaces for creating, joining, organizing and managing via mobile devices affinity groups in a cloud computing environment for social and business purposes.

10 Claims, 64 Drawing Sheets

New Account

Related U.S. Application Data of application No. 15/008,121, filed on Jan. 27, 2016, now Pat. No. 9,998,881, which is a continuation of application No. 14/202,115, filed on Mar. 10, 2014, now Pat. No. 9,253,609.

(60) Provisional application No. 62/128,418, filed on Mar. 4, 2015, provisional application No. 61/778,345, filed on Mar. 12, 2013.

(51) Int. Cl.

| | | |
|---|---|---|
| *H04L 29/08* | (2006.01) | |
| *H04M 1/725* | (2006.01) | |
| *H04W 4/00* | (2018.01) | |
| *H04W 4/21* | (2018.01) | |
| *G06F 40/166* | (2020.01) | |
| *H04W 4/08* | (2009.01) | |
| *H04W 4/021* | (2018.01) | |
| *H04W 4/18* | (2009.01) | |
| *H04W 4/70* | (2018.01) | |

(52) U.S. Cl.
CPC .............. *H04W 4/022* (2013.01); *H04W 4/08* (2013.01); *H04W 4/185* (2013.01); *H04W 4/70* (2018.02)

(56) References Cited

U.S. PATENT DOCUMENTS

| | | |
|---|---|---|
| 8,761,101 B1 | 6/2014 | Crosbie |
| 8,781,498 B2 | 7/2014 | Rothschild |
| 8,880,069 B2 | 11/2014 | Filipovic |
| 8,886,128 B2 | 11/2014 | Hubner |
| 8,930,459 B2 | 1/2015 | Mallet |
| 9,009,231 B2 | 4/2015 | Poikselka |
| 9,032,029 B2 | 5/2015 | Diner |
| 9,055,410 B2 | 6/2015 | Deshpande |
| 9,064,374 B2 | 6/2015 | Jabara |
| 9,253,609 B2 | 2/2016 | Hosier, Jr. |
| 9,324,078 B2 | 4/2016 | Palahnuk |
| 2003/0096621 A1 | 5/2003 | Jana et al. |
| 2011/0208958 A1 | 8/2011 | Stuedi et al. |
| 2013/0061156 A1* | 3/2013 | Olsen ..................... G06Q 50/01 715/753 |
| 2013/0275509 A1* | 10/2013 | Micucci .................. H04L 67/02 709/204 |
| 2014/0282016 A1 | 9/2014 | Hosier, Jr. |
| 2015/0295872 A1* | 10/2015 | Hawryluk ........... G06F 21/6245 715/752 |
| 2016/0142887 A1 | 5/2016 | Hosier, Jr. |
| 2016/0188201 A1 | 6/2016 | Hosier, Jr. |
| 2017/0024091 A1 | 1/2017 | Hosier, Jr. |

OTHER PUBLICATIONS

Bennett, "The Dunbar Number, From the Guru of Social Networks," Bloomberg Businessweek (Jan. 10, 2013).

Ronald Coase—Wikipedia, the free encyclopedia (last modified Feb. 5, 2014).

* cited by examiner

Contact Information

Profile Links

Profile Interests

Who Can See This Profile

Criteria to Discover this Profile via Search

Interest Criteria to Contact this Profile

Create/Edit Second Profile

Interests on Second Profile

Privacy Settings on Second Profile

Criteria to Discover
Second Profile via Search

Interest Criteria to Contact this Profile

Private Tracked Object Stream

Member Profile

Creator Profile

Tracked Object About Profile

Tracked Object About Profile Settings

Invite New Member

Profile Directory and Search

Profile Search

List Search

Association Account Setup

Profiles Page for Association Profile

Invite New Member to Association Profile

Association Tracked Object Stream

Another Association Profile

Sponsor Profile

Association Invite Panel

Profile Search Window on Association Profile Page

Association Tracked Object About Profile

Shared Media

●●●●● Carrier 🛜    8:08 AM    100% 🔋⚡

*See Fig 42*

< ⭐ AOPA Annoncements Settings    +

[Image]

tap to replace or delete image

Description:
General AOPA Announcements made here. Please see your List for other AOPA Groups or Search Membership to create your own Local Group.

Rules ▶

Members Profiles:
☐ are visible
☑ are not visible

---

All Members can Post ☐
Only Creator can Post ☑

All Members can Invite ☑
Only Creator can Invite ☐

This group is:
Private: ☐
members must be invited

Public: ☑
can be discovered via search within the app or by web search engine

*enter keywords for public discovery*

*aviation*
*aircraft*
*pilots*

Posts:
*tap + to add posts*

Association About Profile Settings

FIG. 44

Enterprise Account Setup

Enterprise Stream Entry

Enterprise Form

Enterprise Profiles Page

Enterprise Profile

Enterprise About Profile

Enterprise Tracked Object
About Profile Settings

Business Nested List

Business Nested List

Internet of Things Nested List

Enterprise Nested List

Association Nested List

List Filter Panel

Association List

ONLINE SYSTEMS AND METHODS FOR ADVANCING INFORMATION ORGANIZATION SHARING AND COLLECTIVE ACTION

CROSS-REFERENCES TO RELATED APPLICATIONS

Applicant's other applications include:
(a) U.S. Provisional Application Ser. No. 61/778,345, filed Mar. 12, 2013,
(b) U.S. Provisional Application Ser. No. 62/128,418, filed Mar. 4, 2015,
(c) U.S. application Ser. No. 14/202,115, filed Mar. 10, 2014 (issued as U.S. Pat. No. 9,253,609 on Feb. 2, 2016),
(d) U.S. application Ser. No. 15/008,121, filed Jan. 27, 2016 (issued as U.S. Pat. No. 9,998,881 on Jun. 12, 2018), and
(e) U.S. application Ser. No. 15/059,301, filed Mar. 2, 2016.

All of the above referenced provisional applications, non-provisional applications, and patents are herein incorporated by reference in their entirety for all purposes.

COPYRIGHT AND TRADEMARK STATEMENT

A portion of the disclosure of this patent document contains material that is subject to copyright protection. The copyright owner has no objection to the facsimile reproduction by anyone of the patent document as it appears in the Patent and Trademark Office patent records, but otherwise reserves all copyright rights. Several trademarks are identified and used in this application. All rights to such trademarks are fully reserved to the trademark owner.

FIELD OF THE INVENTION

The invention relates generally to mobile "smart" phones, tablet and other computers with wireless communications capabilities, to "apps" stored on and useful in such devices including new and improved human-device interfaces, the processes performed by such apps, and to cloud based "software as a service" and similar platforms and as well to cloud based methods and systems particularly suited for interaction with such devices.

BACKGROUND AND DESCRIPTION OF RELATED ART

As described more fully in the "Background and Description of Related Art" sections of the aforementioned formal and provisional applications, to which the reader is referred for a more fulsome discussion, the advent and stunning growth in popularity of "smart" mobile phones, mobile tablet computers and similar devices has led in turn to the development of hundreds of thousands of "apps," shorthand for software applications, that users may have preinstalled on their mobile devices or which users may selectively download to their devices from an internet "store" or other remote location. In conjunction with a cloud based server and associated cloud based software, such apps perform highly targeted, specific tasks beneficial to the user.

This mobile technology has, among other things, offered users the opportunity to conduct myriad business and personal activities (including those involving high levels of interaction with other individuals, groups, website based communities and businesses) in a timely fashion while "on the go." The combination of mobile phones, mobile tablet computers and the like with apps and cloud computing centers has created a highly customizable platform that has led to a burst of innovation, but much remains to be done to take full advantage of the opportunities offered by these technologies.

With cloud computing, selectively sharing of information with any number of third-parties has become more convenient and more prevalent, the well-known Google docs and Google sites applications being familiar examples of ways of creating, storing and selectively sharing a wide range of information with others. There are many other familiar examples of the creating and sharing of information via the internet including the so-called "social applications," such as Facebook, Twitter, LinkedIn, Tumblr, YouTube, Google+, website-based communities, messaging apps, such as iMessage by Apple, WhatsApp, now owned by Facebook, and various email services, e.g., GMail, that enable users to connect to business counterparts, their "friends" and others to share and exchange information or data with them.

The myriad of existing mobile applications, including those cloud-based applications now popularly known for embodying "social, mobile and local" capabilities, have created a cacophony of separate, sometimes complementary, but most often overlapping and/or competing applications. These applications have varying "features" and deficiencies, such that users often find themselves jumping from app to app to access features they seek, confronting different, and often inconvenient (and/or confusing) user interfaces for accessing the various app features, and encountering the differing privacy standards imposed by the app owner.

The forms of business and social communication in wide use today, such as the many email apps and the many texting/messaging apps, as well as the many social media apps that allow individuals and groups to form and interconnect, have serious shortcomings. For example, email is based on an outmoded post office paradigm where communications are formally addressed with a date, to, from, cc, bcc, subject line and signature line which often includes as well the business name, business title, address, phone, fax, mobile phone and other contact information of the sender, all part of message "overhead" displayed along with the substantive content of the message. Attachments are electronically appended to or "enclosed" with the message like enclosures to a letter.

Messages thus composed are "sent" as individual and inseparable packets to each of the named recipients, like letters deposited with the post office. The above-described email "overhead" often occupies more screen space than the substance of the communication, which is particularly problematic for users of relatively small screen mobile phones. In all events, such message overhead pointlessly distracts the recipients' attention from the substance of the message, a form of cognitive tax not offset by any significant substantive benefit.

With email, it is particularly burdensome and annoying when it is necessary to read in context a string of emails, each incorporating the same repetitive message overhead. Moreover, finding and accessing one or more attachments of interest in long strings of past emails with many attachments is exceptionally time consuming and inconvenient, prompting many users to download email attachments to their computers or mobile devices for filing in electronic folders on such devices or, alternatively, to upload the attachments to cloud based storage systems, such Google Drive or its equivalent, for filing there in electronic folders created by the user. These organizational burdens, which are similar to dealing with physical documents and files in paper form, are distracting and time consuming.

Continuing to use GMail as representative, emails only "go away" if they are archived, deleted or otherwise affirmatively acted upon by the user in a manner similar to one's handling of letters, documents and the like placed in a physical inbox. Many users neglect to perform these affirmative actions with the result that hundreds if not thousands of emails accumulate in the user's inbox. Alternatively, to clear their inboxes, more organized users may perform many, perhaps a hundred or more archiving and/or deleting steps per day, another nuisance "job" and distracting cognitive tax.

Archived emails in GMail are placed in a "haystack" filing system, to be found by initiating a search, another burdensome "job," or by opening folders where the attachments were previously filed or by relying on electronic criteria for sorting incoming emails into various categories, with varying, but usually unsatisfying, levels of accuracy and refinement. Serious email users are all too familiar with these and the many other shortcomings of email. Another burdensome problem with email is that information does not come to users in organized form by subject matter; rather it arrives chronologically and is presented to the user in that form, or perhaps crudely sorted into a few general categories, such as GMail currently offers. GMail also presents a sequence of emails between individuals as "strings," but this often is more aggravating than helpful. Searching a "haystack," the Google approach to organization, presents the user with an unwanted "job;" it is far preferable to have communications organized from the outset thereby enabling the user to easily view and deal with matters by subject matter, rather than by the order in which they are chronologically received.

Texting and messaging apps obviate the formality, and aspects of the associated complexity, of email as above described, but still transmit information in indivisible packets, like physical letters, and tend to be useful only for simple, in the moment communications and in the moment sharing of photos or the like. The younger demographic in particular abhors email while business people cling to email for business, but often use texting for personal matters. The simplicity and informality of texting/messaging is both its advantage and its shortcoming as demonstrated by the fact that this form of communication has not found currency as a substitute for email.

Texting/messaging apps and email all typically require that every user maintain his or her own "contact" list to provide a basis for communicating with others. This usually involves the annoying and time consuming task of exchanging "contact" information and placing such information in one's own contact list. Contact information often changes over time requiring that one way or another a person periodically "update" their contacts list. Apps such as iMessage now at least ease the updating process by noting a change in a certain aspects of a sender's contact information, but only when a message is received from that person, and asking if one wishes to accept the new information. Also, for one reason or another, one may wish to remove a person from their contacts list. Such tasks mimic the old rolodex files and the associated physical process of keeping track of one's "contacts." Social apps such as Facebook and LinkedIn now allow users to place their profiles online which can be used as a basis for communicating with others, but those apps are in many ways unsatisfactory for many well-known reasons. As will be seen, "profiles" in the context of the invention are useful for far more than simply providing personal information about an individual. For example, as will be seen, profiles in the context of the invention may be used as repository of information about virtually anything. In an affinity group or other tracked object, there may be profiles of activities or subject areas, which may supplement or replace information traditionally made part of a website thereby to make such information more easily accessible to users, particularly mobile device users.

Users should not have to jump from one app to another (e.g., email to message app, and vice versa) for formal/informal communications and/or for other forms of social interaction. A single app that has the simplicity and ease of texting/messaging but satisfies the needs of more formal or fulsome communication, and as well the needs of wide ranging social interaction and information sharing, e.g., photos, videos and documents, in a largely self-organizing manner is highly desirable goal unmet by the prior art.

Beyond email and messaging, social interaction often originates with web based communities which use websites as a way of creating and binding people to their online communities. For example, businesses, professional associations and social groups of all kinds, profit and nonprofit, such as university alumni associations, charitable organizations and other non-profits, and the hundreds of thousands of other associations, have historically created websites with varying levels of depth and complexity as a means to enable users to engage with them online. Since visiting of websites, even if the user is sufficiently motivated to create and use "bookmarks," is relatively inconvenient, businesses, associations and the like have come to send automated emails and texts, to any user who will accept them, as a means of maintaining the entity in the forefront of users' minds. Passively awaiting users to visit one's website is not a route to success for associations or businesses, nor a path for promoting effective social interaction with and among members in associations and other online communities.

Sizeable associations and other organizations not only maintain websites and send machine generated emails to their members, they also feel a necessity to have a presence on many of the popular social sites, such as Facebook, Twitter, Instagram, LinkedIn, YouTube, and Pinterest. The cost of maintaining a presence on such diverse platforms is not only high, but, worse, it sends association members to platforms that are controlled by businesses that favor their own best interests, not those of the association or other organization. Further, it disperses association members among many social sites, rather than keeping them in a common meeting place. Experience demonstrates that such association and business social sites often are wastelands, even for large associations, and provide at significant cost only modest, if any, benefit to relatively small portions of the organization membership.

Large organizations often spend millions of dollars building and maintaining their websites. For small, local businesses and other organizations, website creation, updating and maintenance is relatively (or prohibitively) expensive and difficult, often requiring expensive professional assistance. It is also relatively difficult and expensive for such small businesses, charitable organizations and tens of thousands of associations and the like to generate fresh emails or texts on a daily or weekly basis and, even if they are able to do so, users are naturally reluctant to accept emails from all but a handful of such entities least their inboxes become inundated with information in which they have only occasional interest. Small businesses and small organizations are distinctly disadvantaged in the online world.

Over the past decade an ever growing percentage of emails received by typical email users, from then perhaps thirty to forty percent to now often eighty to ninety percent, are machine generated, as opposed to being individually composed and sent by a human being. Most often such machine generated email is sent by an entity, such as member associations, nonprofit and charitable organizations, seeking the user's attention and/or money. This is not spam, but machine generated email recipients willingly opt to receive to facilitate interaction with the sender. A significant and growing percentage of texts are also auto generated. For example, it is estimated that about one-third of all Twitter "tweets" are generated electronically by machine bots and that the percentage of machine generated emails/texts are ever increasing. Researchers estimate that the expected continuing increase in such machine generated data, coupled with the impending "internet of things," will result by 2020 in forty percent of all internet data being auto-generated by machine. Better ways are needed for enabling users to manage such voluminous, frequently sent, machine generated data so that it does not overwhelm the recipient, bury human communications, and become more of a burden than a help.

Email, text messages and the like, whether received from machines or humans, prompt profoundly stimulus-driven behaviors. Such stimuli are largely unpredictable as email/texts and the like are typically ordered by time received, not subject matter. The repetitive switching between disparate tasks in going from email to email imposes a substantial cognitive tax. It is exhausting, depleting of cognitive processing and costly for productivity. Creating and implementing automated techniques for attempting to sort incoming emails by subject matter is not reliable and imposes yet another burdensome task on the user, and the ordinary person is simply unwilling or unable to take on these tasks. There is a long felt need for new, more useful and less cognitively taxing paradigms for enabling humans to cope with the enormity and diversity of mobile, social, local and, indeed, all forms of worldwide online human and machine generated communications that have come to dominate our lives.

BRIEF SUMMARY OF THE INVENTION AND OBJECTIVES

As explained more fully in the aforesaid provisional and formal applications, the goal of the inventions there described and the modifications, variations and improvements herein described is to provide effective solutions to the aforementioned and other shortcomings of the prior art.

As will be apparent to one skilled in the art on reading of the above-identified parent patent applications, the inventions there disclosed, and the variations, modifications and improvements herein disclosed, satisfy a long felt need for new, more useful and less cognitively taxing paradigms that have utility for, among other things: (a) participating in associations and other organizations through receipt of one-way member "broadcasts," while also allowing members to selectively participate personally and interactively with others (including by private messaging) in a multiplicity of member subgroups (with or without the association being a subgroup member), without the need to chronologically commingle such activity with other communications activity and while eliminating the need to receive machine emails, visit association websites and their related social sites, participate in online forums or the like; (b) participating in multiple associations and other groups and subgroups with the ability to uniquely tailor one's own profile/contact information as suitable for each group; (c) maintaining the most recent, updated contact information of others, including any detailed personal information others wish to share, such as the equivalent of what might be shown on a Facebook page, without imposition of the burdensome tasks noted above and, indeed, without the need for the recipient to do anything other than maintain his/her/its own profile and depend on others to do the same; (c) updating one's own contact information on a timely basis for all of one's desired contacts in a simple manner and withdrawing at will one's contact information from selected others; (d) selectively participating in a worldwide "phonebook," with one or more different publicly or semi-publicly accessible profiles, each one of which may include information one desires to reveal publicly (such as professional or personal interests, special expertise, demographics) and with revealing or not revealing one's personal identity; (e) enabling crowdsourcing of information for solving problems, collaborating or the like, while allowing members of the "crowd" to individually and selectively reveal or not reveal personal identity; (f) receiving desired information from businesses, such as advertising of new products and "deals," without the necessity to reveal personal identity and without the necessity for a user to see such information unless and until it is desired to do so, and with the ability of the user to tailor what is received by business type, location or the like, as shown in further detail in above-referenced priority applications and patent; (g) imbuing each group with desired communications characteristics or features, such as broadcast only, others may or may not invite to group, private messaging, messages disappear after preset time or event and, indeed, virtually any feature desired to be provided by the system operator; (h) accessing of popular social and other apps without leaving the app environment of the present invention; (i) providing an optimum user interface and an optimum message stream design for enabling easy accessing of messages and all other information relevant to an affinity group or other tracked object in one environment while obviating the cognitive tax typically associated with such activity; (j) providing through the profiles feature highly useful and user friendly ways to access information about or relevant to an affinity group or the like including parts or all of a traditional website and (k) allowing all of the above characteristics and features to be accessed from a mobile device through a single app interface so that a user may conduct virtually all personal, social, association, enterprise and business communication in one place, and particularly on a standardized and optimized platform having a message stream which eliminates repetitive message overhead, contact information or other unnecessary information that distracts the user.

The invention further enables, within a single mobile app, access to many popular features, and even access to independent apps, through a single platform having a simple interface that is familiar, easy and intuitive to use and navigate. The invention enables default modes that protect the identity and privacy of the user, and allows a compromise of identity and privacy only when and to the extent consent is knowingly given by the user.

In short, among other things, the invention is designed from the standpoint of what is best for the user, as opposed to what is in the best interest of app owners and advertisers. Advertising in the context of the invention is a service to the user to be seen only when desired, as opposed to the current practice of thrusting unwanted advertising in the face of the user as the price of admission to purportedly "free" apps. The invention enables a virtual self-organization of online communications and almost entirely eliminates the many cognitively taxing tasks, such as archive, delete and file, associated with other online platforms.

It is an objective of the invention to provide new and improved methods, systems, apps and app/human interfaces for mobile, social communication for individuals as well as national and local business/non-business entities.

It is an object of the invention to provide on a mobile device, among other things, the features and characteristics enumerated in the recitations (a)-(j) in the paragraph above.

It is an object of the invention to provide, among other things, methods, devices, systems, apps and app interfaces to enable users to more conveniently and selectively engage, without an excessive cognitive tax, with social/business communications/data of all kinds, including machine generated electronic communications.

It is an object of the invention to provide simple, easy to use apps, app interfaces, cloud platforms, methods, devices and systems for enabling highly organized and efficient bilateral, online communication. Among other things, repetitive, annoying tasks such as delete, archive naturally and file, are obviated, message overhead as earlier described is obviated and communications are organized without placing unnecessary burdens on the user.

These and the many other objectives of the invention, as described in part above and in the earlier identified provisional and formal applications, will become apparent to the reader from the drawings and written description that follows.

BRIEF DESCRIPTION OF THE DRAWINGS

In order to describe the manner in which the above-recited and other advantages and features of the disclosure are obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings, in which:

FIG. 44 is a smartphone wireframe diagram depicting an exemplary rules/permissions settings screen for the exemplary association tracked object AOPA Announcements, this screen being accessed by selection of the settings gear symbol in the upper right corner of the FIG. 44 screen;

DETAILED DESCRIPTION OF THE INVENTION

The following description is presented to enable any person skilled in the art to make and use the embodiments, and is provided in the context of particular applications and their requirements. Various modifications to the disclosed embodiments will be readily apparent to those skilled in the art, and the general principles defined herein may be applied to other embodiments and applications, such as those shown in the above-identified parent patent applications, without departing from the spirit and scope of the present disclosure. Thus, the present invention is not limited to the embodiments shown, but is to be accorded the widest scope consistent with the inventive principles and features disclosed herein.

Figure 1:
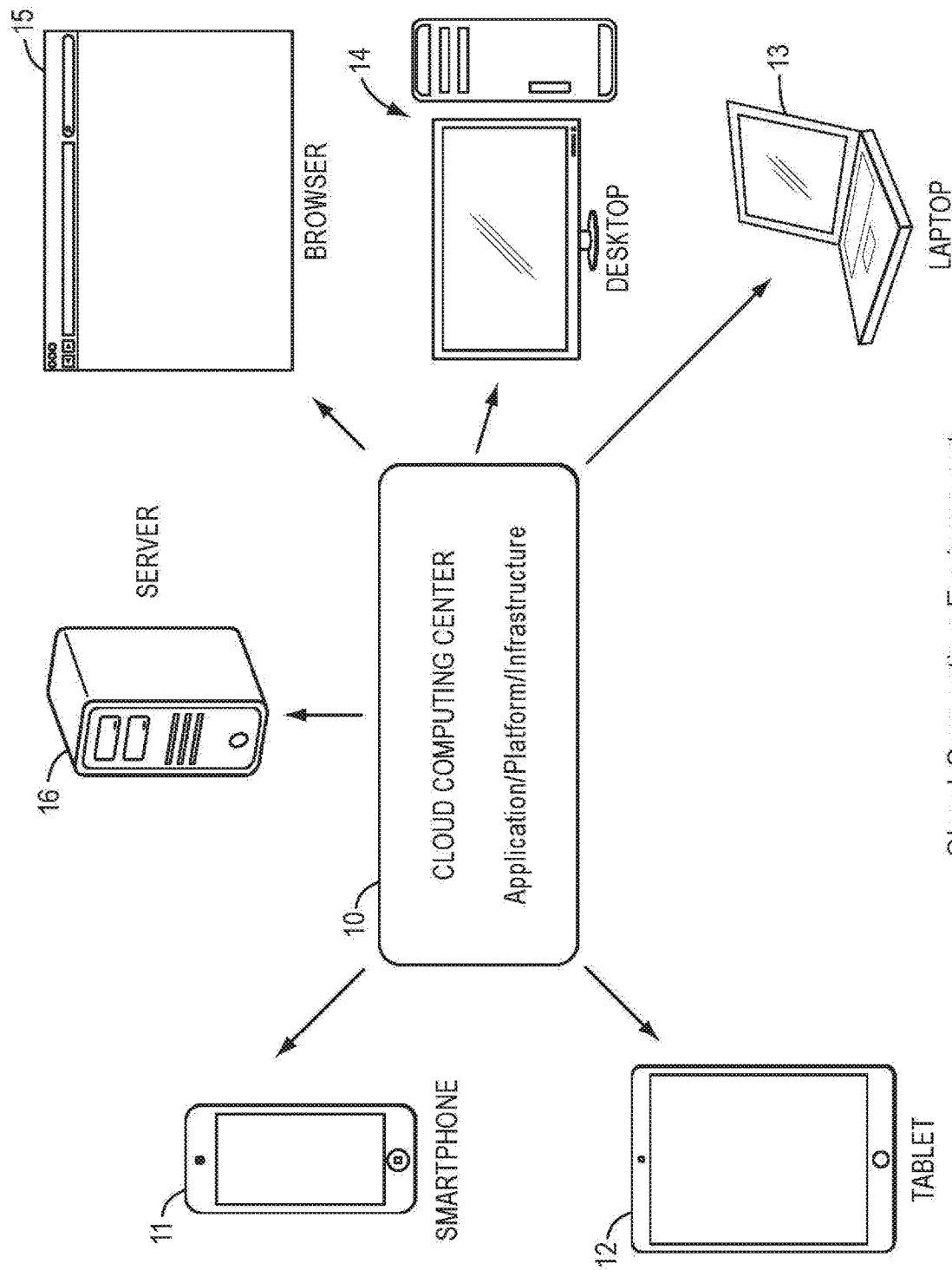
FIG. 1 is a diagrammatic depiction of a conventional cloud computing environment comprising a remote or cloud computing center and any number of mobile or other devices, e.g., mobile phones and mobile tablet computers, laptop and desktop computers, computer browsers and servers, that effectively communicate wirelessly and in a well-known manner with one another through the cloud computing center.

FIG. 1 here is similar to FIG. 1 in the above-identified provisional and formal applications to which priority is claimed. FIG. 1 depicts subject matter well known to the prior art; it is repeated here to provide convenient context and background to the invention.

FIG. 1 depicts the conventional and now familiar cloud computing environment comprising a cloud computing center 10 that communicates bilaterally and wirelessly (and in some cases by wire) with a large number of distant and geographically dispersed computing and communication devices that may include: (a) smartphones, exemplified in the drawing by the single mobile smartphone 11 (e.g., iPhones, iWatch, Android phones, Google Glass, etc.); (b) mobile tablet computers, exemplified in the drawing by the single tablet computer 12 (e.g., iPads, Android based tablets, the Microsoft "Surface" tablet, etc.); (c) conventional laptop and desktop computers respectively depicted in the drawing by the numerals 13 and 14; (d) computer servers denoted by the numeral 16; and (e) computer browsers, denoted by numeral 15 (collectively "devices"). The devices communicate directly with the remotely located cloud computing center 10 and indirectly with one another through the computing center 15. The devices may also connect with one another through cell phone towers or the like, all in well-known fashion.

In the present state of the art, the mobile and other devices typically have many downloaded or pre-installed apps that perform certain computer, memory and other functions locally within the device as directed by a local software application. The local "app" assures rapid response to user commands, while more complex matters are offloaded to controlling applications at the cloud computing center.

There may come a time in the not too distant future when mobile devices need not have sophisticated local apps, as increased wireless information/data transmission accessibility and speeds will allow all or near all computer, memory and other functions to be performed entirely at the remote computing center on a virtually instantaneous basis. In such event, the mobile devices may omit expensive electrical components, like powerful microprocessors, extensive memory and sophisticated app software. Such simplified phones, like "dumb" computer terminals, are much less expensive to produce and purchase, but the user will perceive no lack of feature availability, slowdown in responsiveness or other degradation in performance.

For convenience, the invention will be described primarily in the context of a smartphone having a downloaded or pre-installed app, although those skilled in the art will appreciate that the invention works equally well with any other device and/or if all, or nearly all, of the computational, memory and other functions are performed remotely at the cloud computing center rather than in material part on the mobile or other device.

Tens of thousands, hundreds of thousands and even millions of device users may connect to remotely located cloud computing centers as common users of the same mobile software apps, applications, widgets and/or templates, etc. of diverse kinds (collectively "apps"). The computing centers host the controlling programs for each such mobile app in a manner well understood in the art. Such centers store vast amounts of user and other data, and are able to undertake complex computational, analytical and other tasks, such as so-called big data analytics. Typically, at least a substantial portion of user data is stored in cloud based relational databases of well-known design to enable the users' selective retrieval and selective use of the stored information pertinent to a particular app.

The cloud computing center typically hosts many applications and provides computing infrastructure and platforms including an operating system, a programming language execution environment, a database, and a web server. Controlling software programs for mobile device apps hosted at the computing center perform wide ranging tasks, such as retrieval of a user's stored data for selective display on the user's device (e.g., photos, videos, documents, sound files), word processing, spreadsheet and presentation programs, complex computational and data handling functions, voice recognition/voice response and analysis of complex data for purposes of data visualization, to name just a few of the currently well-known computing center capabilities available to app developers and to users through their mobile devices.

Apps resident on the mobile device provide a user/device interface, some local device level functionality and the communications capability for accessing the host and controlling programs for that app at the computer center and for accessing other resources at the computing center. This now familiar and ever improving cloud architecture and app architecture enable the easily scalable, efficient and low cost off-loading of vast data storage, processor intensive, complex computational and other functions from individual devices to remote cloud computing centers, such as those operated by Amazon, Akamai, Apple, Microsoft, Google and many other companies. Cloud computing centers bring supercomputer capabilities to mobile smartphones.

Those skilled in the art will recognize that there are many hundreds of thousands of such apps currently available for use on the iPhone, Android and other mobile platforms. The basic architecture and functions above described, the rules of app and controlling program design to perform desired app features on a device, their implementation in a cloud environment and as well as numerous functions performed on demand at the computing center in response to a user's interactions with a mobile app interface are well understood to those skilled in the art. Such known matters are not a part of the invention and are not further described herein.

The present invention relies upon and makes use of the known and continually advancing app and cloud computing environment above described, as well as the ever advancing sophistication and functionality of mobile devices (either at the level of the mobile device itself or at the level of the controlling cloud computing center which empowers the mobile or other device), to bring new and important user functionality to mobile and other computing/communication devices. The unique architecture and structure of the present invention is enabled to provide continually advancing functionality as mobile devices and cloud computing technology further evolve and as desktop/laptop computer operating systems converge with mobile device operating systems. Desktop and laptop devices are trending toward having touch screens like those now widely used in mobile devices. In short, the power and utility of the present invention grows with the inevitable technological advances in mobile phones, utilitarian apps, tablets, laptop/desktop computers and cloud computing centers, rather than trending toward obsolescence as is the case with many tech developments.

As with the embodiments shown in the above-identified parent patent applications, the various features, improvements and variations of the invention disclosed herein are of particular utility in the organizing any of a wide range of human endeavor, business and personal, profit and nonprofit, around interests, events or activities, and things (living and nonliving), that is, virtually anything, herein collectively termed "tracked objects." For instance, stamp collecting is one of a virtually unlimited number of interests around which people might organize, even if they are not close friends, "friends" at all in any traditional sense, and even if they do not know one another. It is the interest or common affinity, i.e., tracked object, that connects them, not their personal relationships. This is in contrast to, for example, organizing around people talking about themselves or to or with "friends," as is common practice in the familiar social applications, such as Facebook and Google+. This tracked object based organizational structure of the invention yields many benefits, as will be seen.

Other than for an immediate or mid-range circle of family and friends, people typically associate with others for special purposes via common interests, events, clubs, condo or homeowners' associations, work or charitable projects, professional associations, sports and so on, which are the tracked objects in the present system. Some tracked objects may be permanent and unvarying, like family, some may be transitory, like planning a wedding and others may be fleeting, such as coordinating a weekend bike ride, or a neighborhood picnic with individuals assembled only for that purpose. Yet other tracked objects, like fraternities, sororities, hobbies (flying model planes, stamp collecting, etc.), club memberships, professional associations, workgroups within companies and so on may be long term interests involving significant numbers of people (even in certain cases people with whom the user is not personally acquainted). Further, tracked objects may be of a kind that the user only wants to passively observe or participate in sporadically. In short, the number and identity of people linked as users to each tracked object will vary markedly according to the nature of the tracked object, the nature of the users, the nature of the content and so on. The possibilities are virtually limitless thereby making it useful for a person to interact in aggregate with potentially hundreds or thousands of people, as long as the interaction can be done in ways that are beneficial and not burdensome.

In one form of the invention, the architecture comprises three primary elements: users, content and tracked objects. Rules, in the form of software that interacts with the hardware and firmware of the mobile device and the cloud computing center (including host programs at the center), govern the properties of the three elements and how they relate to one another and the functions performed. Permissions within the system manage access to content. Individual users or administrators establish permissions thereby controlling who may participate with respect to each tracked object and the limits of their participation, if any. This has many benefits as will be seen. The reader is referred to the above-identified priority applications for a further discussion and explanation of the foregoing.

Figure 2:
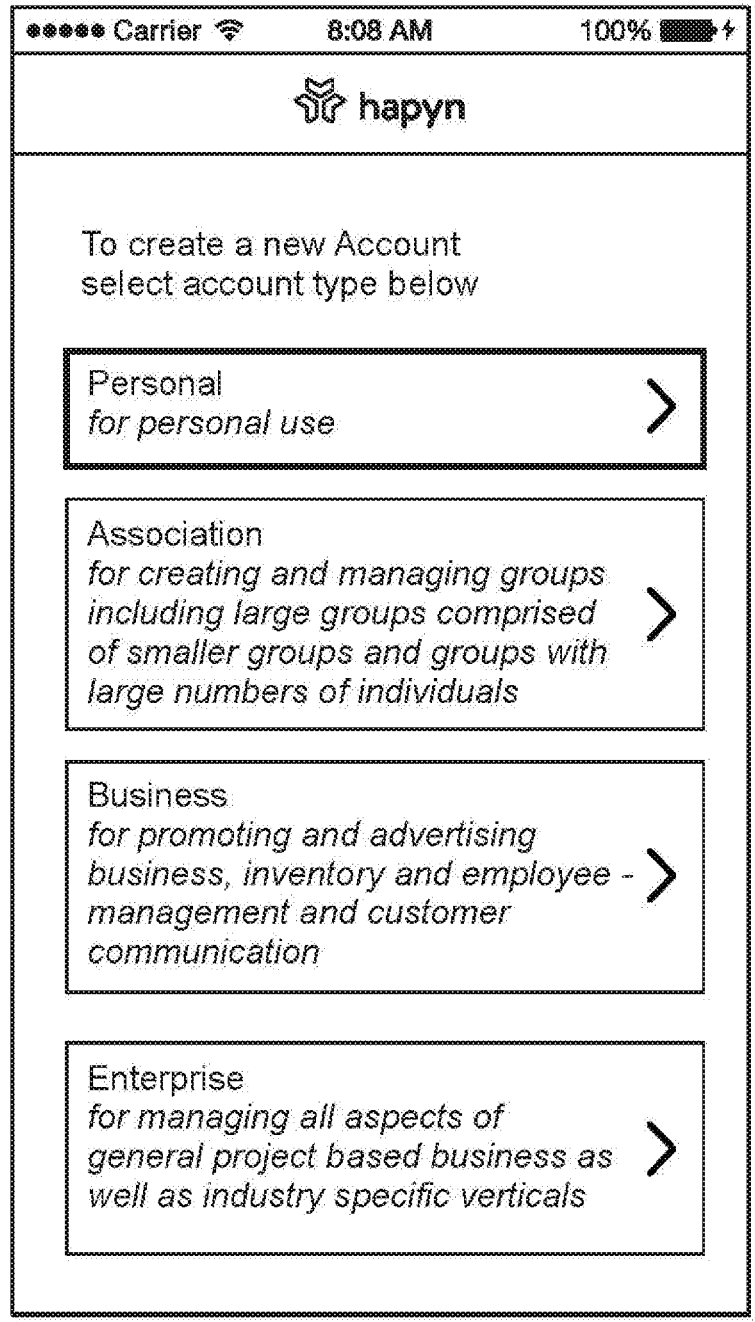
FIG. 2 is a smartphone wireframe diagram depicting an exemplary "new account" screen offering the user the option to select from among several different account types.

One of the first actions a prospective mobile app user is asked to perform on opening of the app is the selection of an account type. Different account types are a convenient way to differentiate and allocate features that are of utility to particular groups and often not needed by others. Of course, instead of the descriptive account types as shown, there may be standard, premium, etc. accounts or the like to achieve the same end. In this regard, FIG. 2 shows, as a wireframe depiction of a mobile phone display, a "New Account" screen offering the prospective user the option to select from among several different account types, including in this example Personal, Association, Business and Enterprise, all of which will presently be described with reference to those drawings identified in FIG. 2 adjacent each account type.

Upon selection of an account type, such as by a gesture, voice command or other appropriate action, the user is presented with an Account Information screen. The exemplary account information screen shown in FIG. 3 assumes that the user selected the account type "Personal," assigned an Account name "John," and assigned a username and password (or some equivalent such as a fingerprint or other biometric identifier) to gain entry to the application and/or cloud based ecosystem of the invention as a registered user.

The Account screen or another, preferably system level, screen, may present users with the optional opportunity (or mandatory requirement) to enter their own demographic data thereby to enable the system to provide benefits and services to users (such as product and service advertising), both individually and collectively, based on anonymous demographic information that does not compromise personal privacy by revealing personal identity. In this regard, in FIG. 3, there is shown a block labelled "Demographics," which, in response to a gesture or other appropriate action, opens a screen (not shown as such information screens are well known to the art) with individual blocks for the provision of any or all of wide ranging demographic information, such as gender, age, location by country and city, occupation, height, weight, health information and so on. The demographic information requested, or required, may be as terse or as extensive as deemed appropriate, but the information sought should be only that used to provide benefit to the user. The Account screen, may also offer the user, as shown, the opportunity to say "yes" or "no" with respect to whether to: (a) allow advertising to be directed to the user based on user demographics; and (b) allow contact to be made with the user based on user demographics (not personal identity). The advertising may be implemented in the present embodiment according to the teachings of the above-identified priority applications. Since such advertising features are detailed in the priority applications, to which the reader is referred, they are not repeated here.

Figure 3:
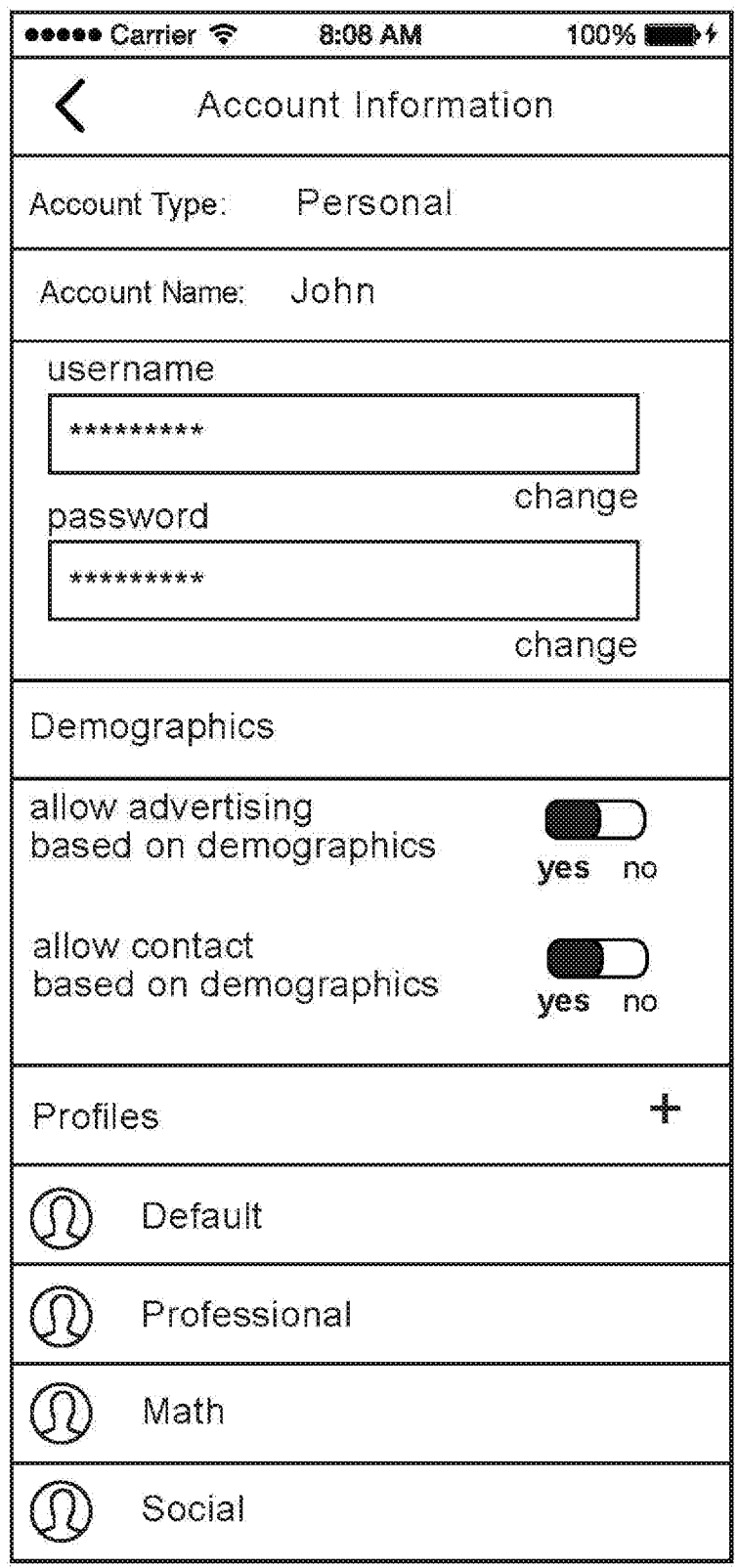
FIG. 3 is a smartphone wireframe diagram depicting an exemplary account information screen made available to a user upon selection of the account type "Personal" in FIG. 2, the FIG. 3 account information screen having, as desired or appropriate, conventional username and password fields, and as well the ability of the user to create multiple user profiles, an illustrative few of which, called Default, Professional, Math and Social, are identified by the like named, individually selectable blocks in FIG. 3 for opening of the respective profiles.

In accordance with the invention, while any individual has only a single set of unique demographic data (e.g., can't be age 50 and age 20 at the same time), individual users may have multiple personal profiles thereby to interface with the system and other users in different ways. The Account screen of FIG. 3 shows that the user has created four different personal profiles the user opted to name, respectively, Default, Professional, Math and Social. These existing profiles may be opened for viewing and/or editing by, for example, gesture selection of the associated profile block in FIG. 3. Profiles is one important aspect of the invention, as shown both here and in the above-identified priority applications. It will be recognized by those skilled in the art that the profiles feature of the invention has application well beyond simply providing information about a human being. Separate profiles may be provided for entities, groups and "things" of all kinds, such as a profile "about" an affinity group, its activities and institutional information that is traditionally found on an affinity group website. Profiles provides the opportunity to easily create many individual information channels serving many and varied purposes.

Figure 4:
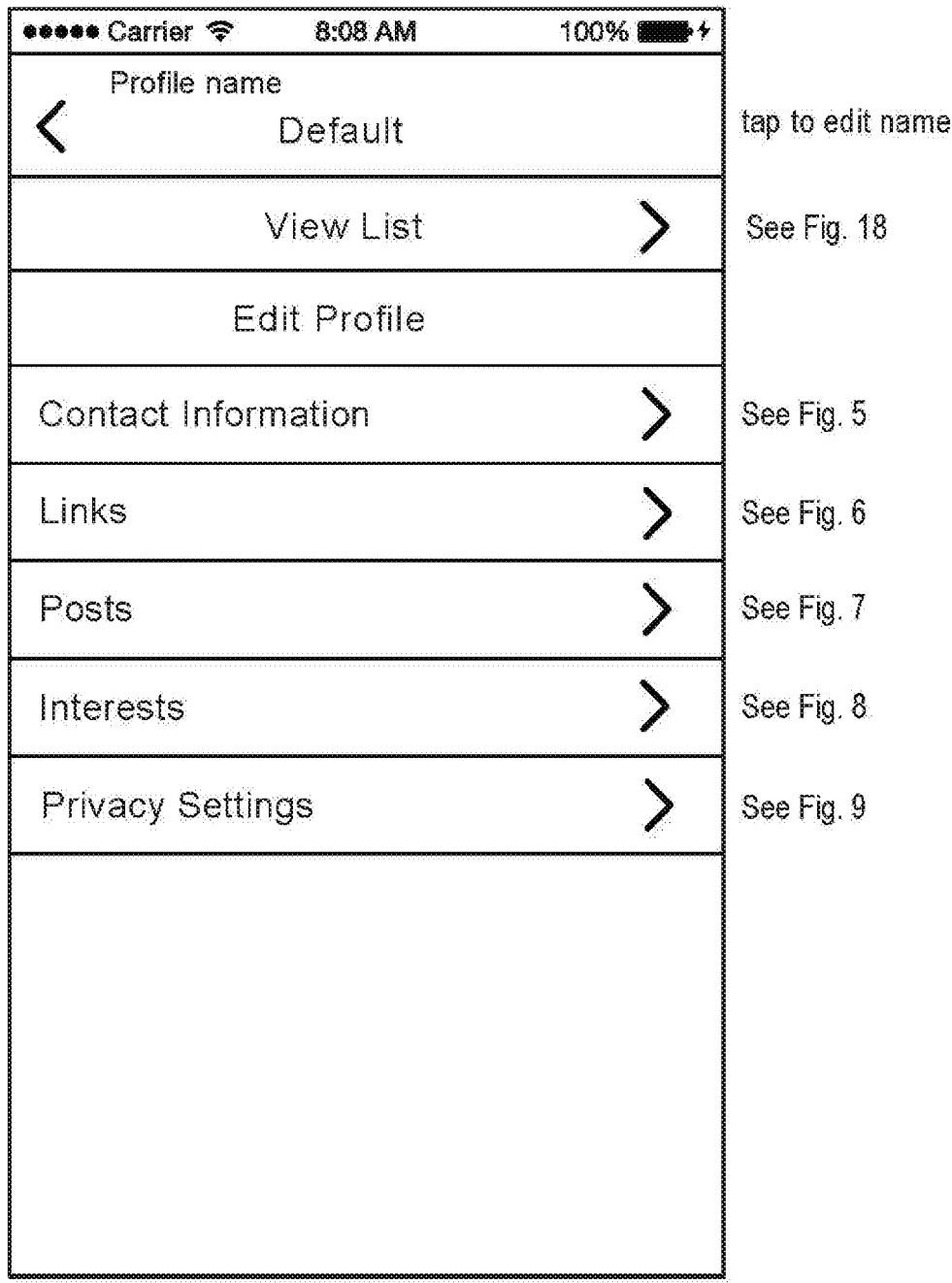
FIG. 4 is a smartphone wireframe diagram depicting a profile composition/edit screen made available to the user upon selection of the "+" symbol in FIG. 3, the profile in FIG. 4 having been earlier created and designated by the user as the user's "Default" profile.

Selection of the "+" sign to the right of the word Profiles in FIG. 3 header opens a new profile composition/edit screen, such as shown in FIG. 4; this was the initial step by the user in the creation of each of the named FIG. 3 profiles. FIG. 4 is a mobile phone wire frame diagram depicting in individually selectable blocks exemplary profile elements offered to the user as options in the creation of any one of a number of separate profiles, here the profile the user named "Default." In FIG. 4, the options offered are Contact Information, Links, Posts, Interests and Privacy Settings. A user may be offered the opportunity to select from among more, less and/or different profile elements according to certain determinations, preferably made on a system wide level at the cloud computing center. This design allows for ease and flexibility in adding, deleting or changing the available profile elements, the rules and permissions governing profiles, and the look and feel of profiles in general. While the invention described is novel, the technologies for implementing the teachings of the invention are well understood in the art, akin to building a beautiful and unique structure from known building materials.

In accordance with recognized convention, the various mobile device screens shown herein have a "back" arrow in the upper left-hand corner that may be selected to return the user to a prior screen; other approaches, such as "swiping" may be used to navigate between the various screens, as will be understood by those skilled in the art. The user interface screens here shown to illustrate the invention may be thought of as expressing one form of user experience. Although the user interface here described is presently preferred, other forms of user experience may be had by selecting a modified or different user interface, consistent with the teachings of the present invention. FIG. 4 also includes as shown a gesture selectable block "View List" which takes the user to a List screen, FIG. 18, described later herein.

Figure 5:
FIG. 5 is a smartphone wireframe diagram depicting an exemplary "Contact Information" screen accessed by selecting the like named bar on the FIG. 4 screen and in which the user has filled in certain information and/or made selections for the contact information to be included in the user's default profile.

FIG. 5 depicts exemplary contact information options offered the user upon selection of the associated block in FIG. 4. Other than for what may be required by the system proprietor, provision of user contact information is deemed optional in this example. In FIG. 5, the user has provided his name, i.e., John Smith, two telephone numbers, one email address and one physical address. Selection of the depicted "+" signs in FIG. 5 offers the user the option of adding additional contact information, such as further telephone numbers, emails, physical addresses and the like.

Figure 6:
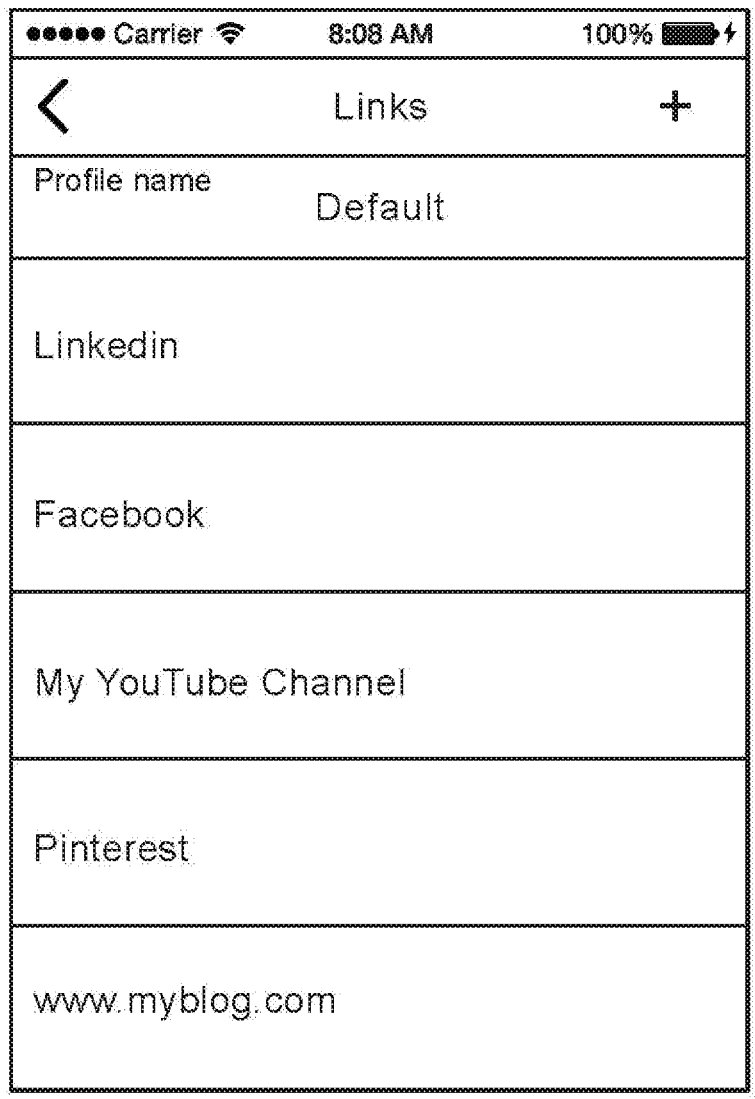
FIG. 6 is a smartphone wireframe diagram depicting an exemplary "Links" screen accessed by selecting the liked named bar on the FIG. 4 screen and in which the user has filled in certain information and/or made selections for links to the user's social applications that are accessible from the user's default profile.

FIG. 6 depicts an exemplary "links" options offered the user upon selection of the associated block in FIG. 4. Other than for what may be required by the system proprietor, provision of user links information is deemed optional in this example. As shown in FIG. 6, the user, John, has elected to identify electronic links to his LinkedIn, Facebook, YouTube Channel and Pinterest feeds from these well-known social sites and as well a link to his personal blog. Other links may be added by selecting the "+" symbol in the upper right corner of FIG. 6. The Links option, along with the other profile elements, provides the opportunity to bring together in one convenient place information that is typically located, and available for access, only in diverse, separate applications and in that sense the invention serves to provide an application manager. Most social and other applications view themselves as being in competition with one another. As competitors for the time and attention of users, the proprietors of such applications focus on their own best interests, rather than the best interests of users who inevitably want convenient access to various applications on their own terms including having all social and other apps accessible from one place as well as meaningful privacy options. The present invention, as detailed here and in the priority patent applications, is designed and implemented from the perspective of what is best for the user including the ability to access multiple apps from a single controlling application.

Figure 7:
FIG. 7 is a smartphone wireframe diagram depicting an exemplary "Posts" screen accessed by selecting the like named bar on the FIG. 4 screen and in which the user has the ability by selecting the "+" symbol in FIG. 7 to make individual posts to the user's default profile, such as those shown in FIG. 7.

The FIG. 7 "posts" screen for the default profile, available to a user upon selection of the like named block in FIG. 4, offers a user the option to add any desired media or other posts to the default profile, for example, text, audio, video, documents and photos that may include professional resumes and other information about one's self to be selectively shared with others having common interests, expertise, or the like, and/or with prospective employers as well as charitable, business, trade and professional associations, etc. Other than for what may be required by the system proprietor, posts are likewise deemed optional in this example. As shown in FIG. 7, the user has posted photos of his home garden and noted in accompanying text his interest in growing orchids and has also posted portfolio pictures of his commercial building projects. Such posts and text may be elaborate, such as the equivalent of a Facebook or LinkedIn page, sparse or nonexistent, at the option of the user and as well depending on the resources made available to the user on the mobile device directly and/or through the cloud computing center. Further posts may be added from time to time as desired by selecting the "+" symbol at the upper right corner of the FIG. 7 screen, while existing posts may be deleted by "swiping" them off the screen or by some equivalent action. Such actions are well known to the art, with several conventions having become familiar to users.

Figure 8:
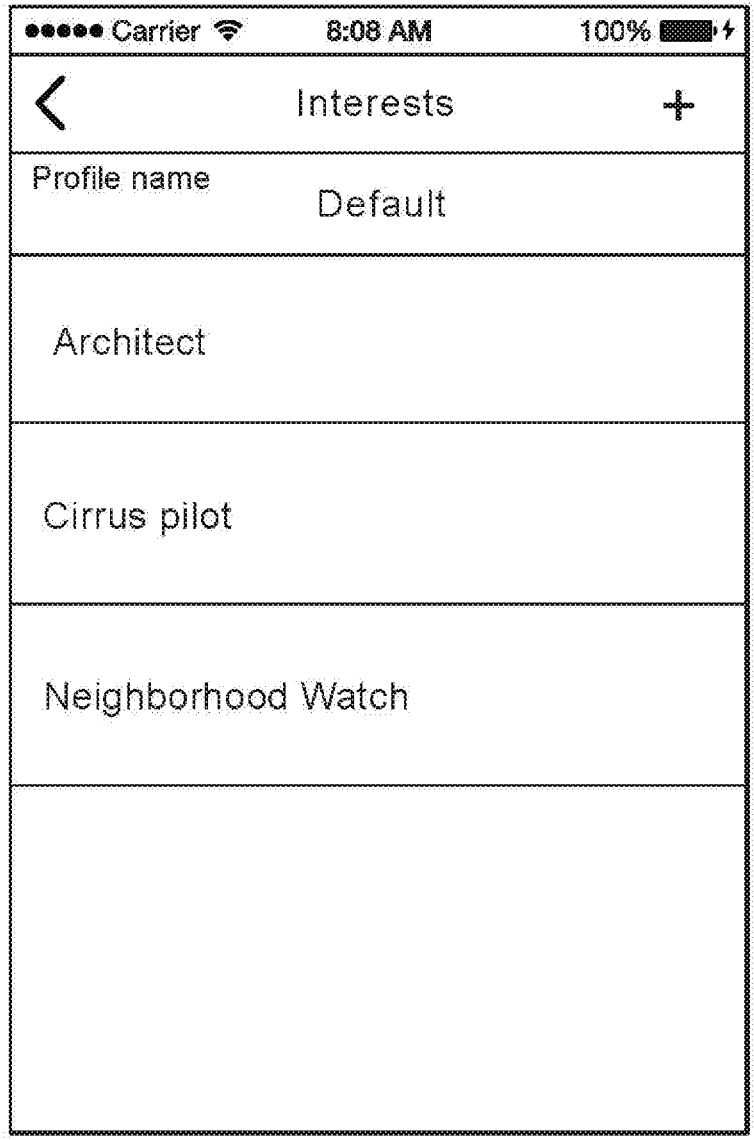
FIG. 8 is a smartphone wireframe diagram depicting an exemplary "Interests" screen accessed by selecting the like named bar on the FIG. 4 screen and in which the user has specified certain interests associated with the user's default profile.

The FIG. 8 default profile "Interests" screen, available to a user upon selection of the associated block in FIG. 4, offers a user the option to specify any desired profile interests. Other than for what may be required by the system proprietor, provision of interests information is likewise deemed optional in this example. As shown in FIG. 8, the user has elected to separately set forth as interests: Architect, Cirrus pilot and Neighborhood Watch. Additional interests of any kind or type desired by a user and allowed by the system proprietor, may be added to a profile by selection of the "+" sign shown in the at the upper right corner of the FIG. 8 screen and then identifying the interest.

As will be explained, profile interests also allows individuals and entities to potentially connect, even anonymously, by user specified interests, such as those reflecting a user's skills, professional expertise, hobbies and personal interests (like growing orchids or flying Cirrus aircraft) and so on. Additionally, interests may be used to discover diverse information, such as how many persons within the system have identified themselves as Cirrus pilots located in Denver, Colo. Depending on whether such individuals have allowed others to contact them based on the discovery of such profile information, accompanied or not by other profile information, persons with common interests may connect via profiles (including via relatively terse, anonymous profiles) even if they have never met or do not at the time of contact know anything else about one another aside from the revealed common interest, as will be more fully explained later herein.

Figure 9:
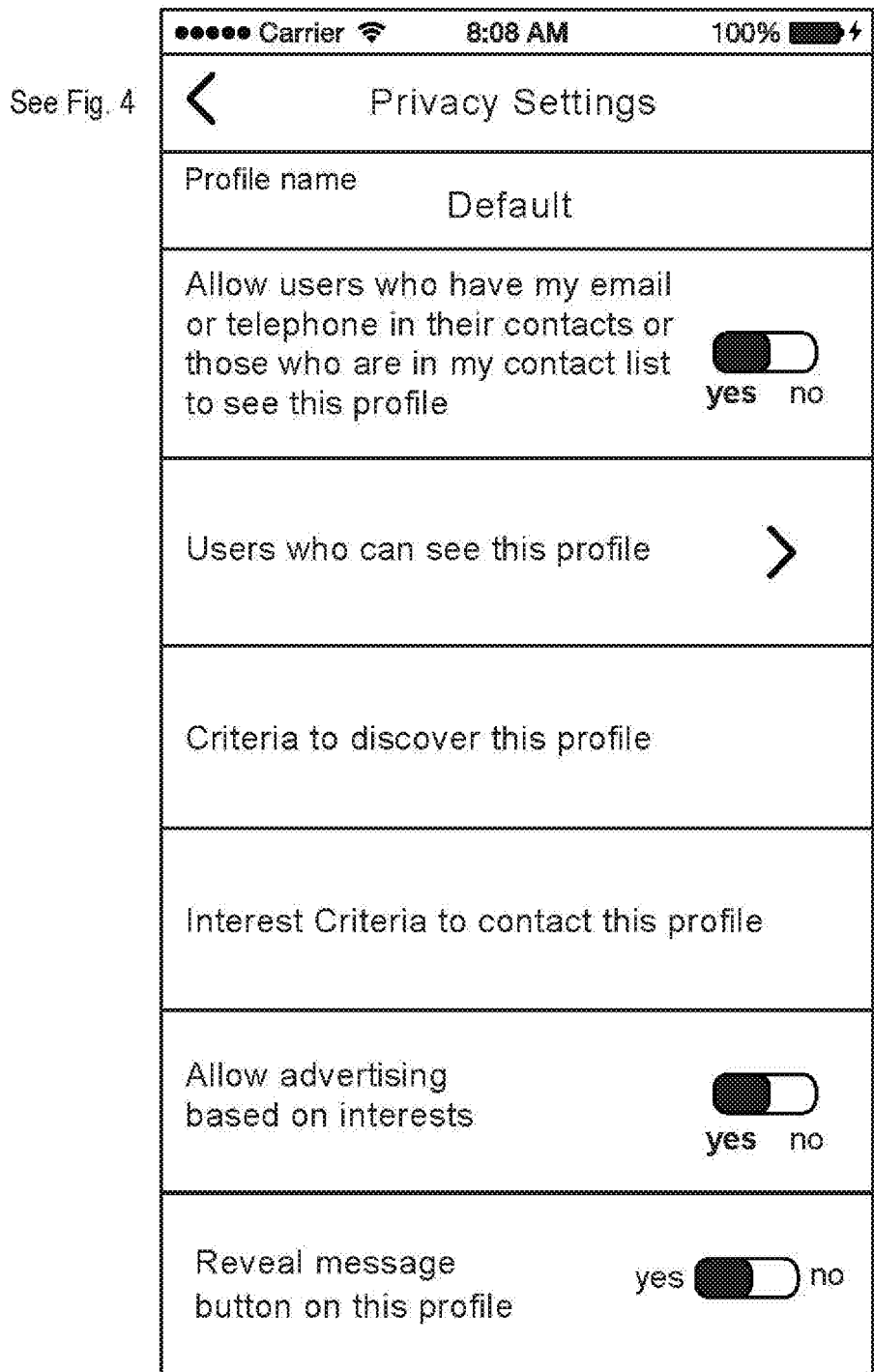
FIG. 9 is a smartphone wireframe diagram depicting an exemplary "Privacy Settings" screen accessed by selecting the like named bar on the FIG. 4 screen and in which the user has filled in certain information and/or made selections for the user's default profile.

FIG. 9 is an exemplary "privacy settings" screen for each profile available to a user upon selection of the associated block in FIG. 4. Privacy settings in the context of the invention enable, among other things, the opportunity to not only provide individual users, rather than just system operators, meaningful control over how and to what extent their personal information (including or excluding information for making contact and revealing demographic and other information of diverse kinds) is used, shared and/or made available to others, but also to make changes when and as desired, and to see from time to time who has access to such information, from what source, and to selectively rescind such access, if desired.

In the FIG. 9 example, John Smith, upon joining the ecosystem of the invention (which may include tens to hundreds of millions, even billions, of people), has opted to allow both those persons or entities in Smith's own historical, computer based contacts list and those others in the ecosystem, not in Smith's own contact list, but who have, from one source or another, his unique email and telephone information (as optionally revealed to the system by such others), to see his Default profile. Thus, if users grant permission for their own existing contact files, such as those compiled and maintained in an historically conventional fashion, to be made available to the present system, then the system is enabled to recognize and interpret such information, by means well known to the art, thereby authorize, for example, those persons or entities: (a) in John Smith's pre-existing contact list to have access to his Default and/or other profiles; and/or (b) others who have John Smith's contact information in their pre-existing contact list to access John Smith's Default profile, even though John Smith may not have their contact information in his contacts list. The selections (a) and (b) above are offered in the FIG. 9 example as a combined, single selection, there answered "yes," but it will be understood by those skilled in the art that they easily may be presented to the user as separate selections. By answering "yes" to the foregoing, all such persons will have access to so much of John Smith's default profile as he has elected to reveal to others.

The exemplary FIG. 9 privacy settings screen also allows users to select, or not, other privacy options to be explained in connection with FIGS. 10-12 and to allow, or not, advertising to be made available to the user based on stated user interests (yes/no selection in penultimate block on FIG. 9 screen), but not based on personal identity and without compromising personal privacy. One feature of the present system is to make available to users, at a user's option, advertising responsive to user stated interests without the user yielding personal information. This is in distinct contrast to the business models of most online businesses, such as Google and Facebook, which are predicated upon building ever more detailed personal profiles of individual persons, under the guise of "helping" the user. In accordance with the invention, "helping" the user and giving the user meaningful control over personal privacy are not inconsistent; rather they are compatible goals.

Selection of the FIG. 9 block "Reveal message button profile" places a "message button" on the user's profile; as will be seen, selection of this "button," assuming it is present, allows the user to be contacted by others. Selection of the block labelled "view users who can see this profile" in FIG. 9 opens the FIG. 10 screen. The FIG. 10 privacy option allows a user, such as John Smith, first to see each person or entity that will have access to his Default profile within the system because: (a) John Smith has their contact information in his "contacts" application; or (b) such person/entity has John Smith's contact information (e.g., his unique telephone number and/or email address) in their historical contact lists, even though John Smith may not have such persons/entities in his own historical contacts list. In the FIG. 10 example, John Smith has chosen to rescind access to his Default profile for two people, Bane and Callas, while opting to retain Abbey. Thus, the invention provides, if desired, a convenient way for users to immediately "connect" (or "disconnect") within the system to all persons/entities: (a) who are in their own historical contact list; and (b) those others not in their contacts list, but who have the user's unique contact information (e.g., telephone numbers/email addresses). If a person in an historical contact list of John Smith is not a member of the ecosystem (or if the user wishes to add a new contact), it will send that person an email or text invitation from John Smith inviting them to connect with John Smith within the system of the invention.

Figure 10:
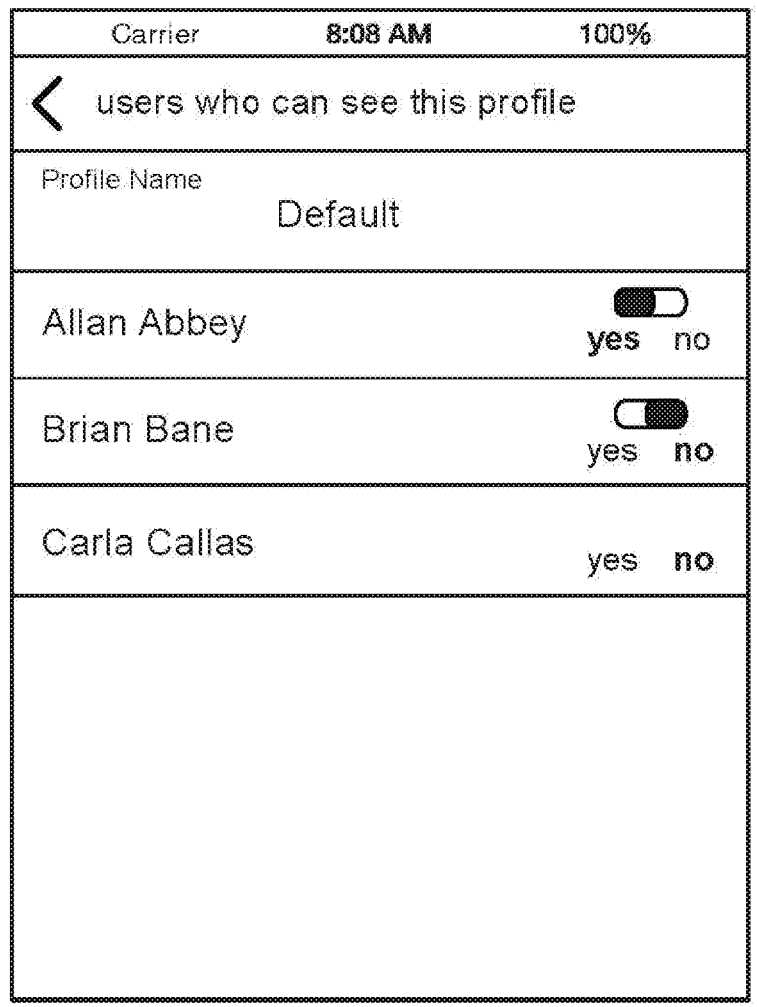
FIGS. 10-12 are user privacy setting screens accessed by selecting the respective, identified blocks on the FIG. 9 screen.

In short, as shown in FIG. 10, the invention empowers individuals to individually view who has access to their profiles and to selectively and individually "rescind" such profile access and thus to rescind the ability of those rescinded parties to contact the user within the system of the invention. If desired, different colored dots, or some other readily identifiable visual indicator, may be placed by the system adjacent a person's name in the user's directory, as described later herein, to denote how a particular person or entity came to be included in the directory.

Figure 11:

Selection of the FIG. 9 block "Criteria to discover this profile," opens the FIG. 11 screen. In the exemplary FIG. 11 screen, the user has chosen to make his Default profile uniquely discoverable via search based on the combination of his common name, John Smith, and one or more of his specified interests (Architect, Cirrus Pilot, Neighborhood Watch) and/or the password, "butterfly," all by selecting "yes" for each of these items. While a search based on the common name "John Smith" may discover an extraordinary number of people with a like name, even if the search is geographically limited, for example, to "Denver Colo., those persons that are given the additional word "butterfly" as a keyword (or some easily remembered phrase) are effectively given a "password" by John Smith to use as one search criteria that will likely find only one John Smith responding to the combined criteria. John Smith listed his email address and two telephone numbers as part of his interests/criteria in composing his default profile as earlier explained, but has chosen via the "no" selections made in the FIG. 11 screen to not make that information available as a way to discover his profile via a system wide search.

Figure 12:
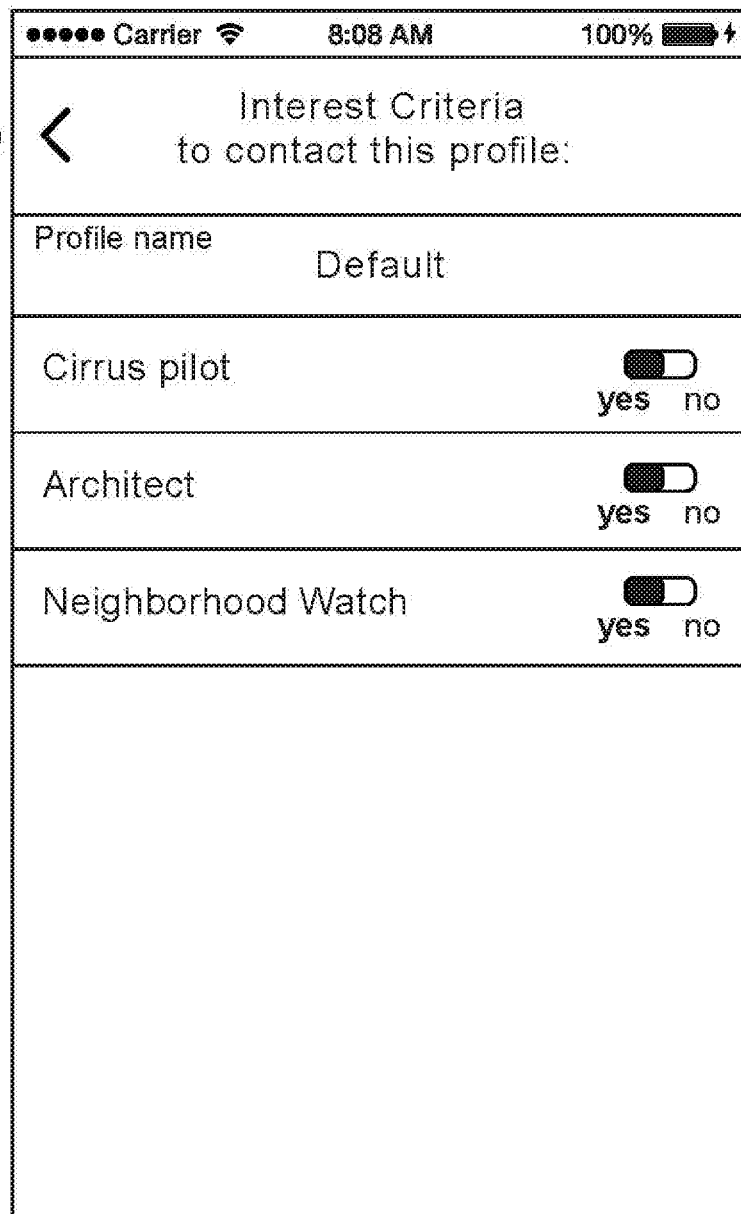

In the present example, and as shown in FIG. 9, the user is allowed to set "interest criteria to contact this profile." Tapping the "Interest Criteria to contact this Profile" block of FIG. 9, takes the user to the FIG. 12 screen. In FIG. 12, John Smith has selected three criteria, namely, Cirrus pilot, Architect and Neighborhood Watch, by which he may be discovered within the system and contacted, all without John Smith or the person contacting him revealing any more personal information. A system wide search with any of these criteria using well known search techniques will reveal how many persons within the system have allowed themselves to be contacted by the particular criteria. Specifically, the person doing the search will see none or some number of persons falling within the search criteria, including those who have allowed the search to reveal some or all of their profile and some number who have not allowed their profiles to be discovered by the search term(s). By his FIG. 11 selections, John Smith has authorized anyone doing a search by the foregoing criteria to see those elements of his profile for which he answered "yes," but to not see those profile elements for which his answer was "no." It is up to John Smith whether or not (and how) to respond to any communication and, if so, what, if any, additional information to reveal. Privacy settings are thus individually made by users from a privacy settings screen that offers the user selections from a predetermined menu of privacy options. Privacy settings may be individually set for each user profile thereby to provide the system with user instructions governing privacy of each particular user profile.

This feature enables persons with particular interests, skills and experience to make themselves discoverable, and able to be contacted, within the system by such characteristics, with or without yielding their name or other profile elements, unless the person determines to do so. Thus, by way of example, a person in the Denver area wishing to form a local Cirrus pilots club can initiate a search within the system for those who respond to this criteria. Some with such criteria in their profiles may allow their profiles to be seen in response to such a search, while others may not, but still allow themselves to be contacted anonymously. All persons contacted may respond or not as they see fit to the inquiry about starting a local Cirrus pilots club. This feature allows, among other things, affinity groups to be formed by persons with common interests, independently of whether they know one another at the time the common interest is identified and the inquiry is made. If permitted by the system operator, this criteria could also allow targeted advertising to reach only, for example, Cirrus pilots in Denver. The advertising may be implemented in accordance with the methods described in the aforesaid priority applications.

Figure 13:
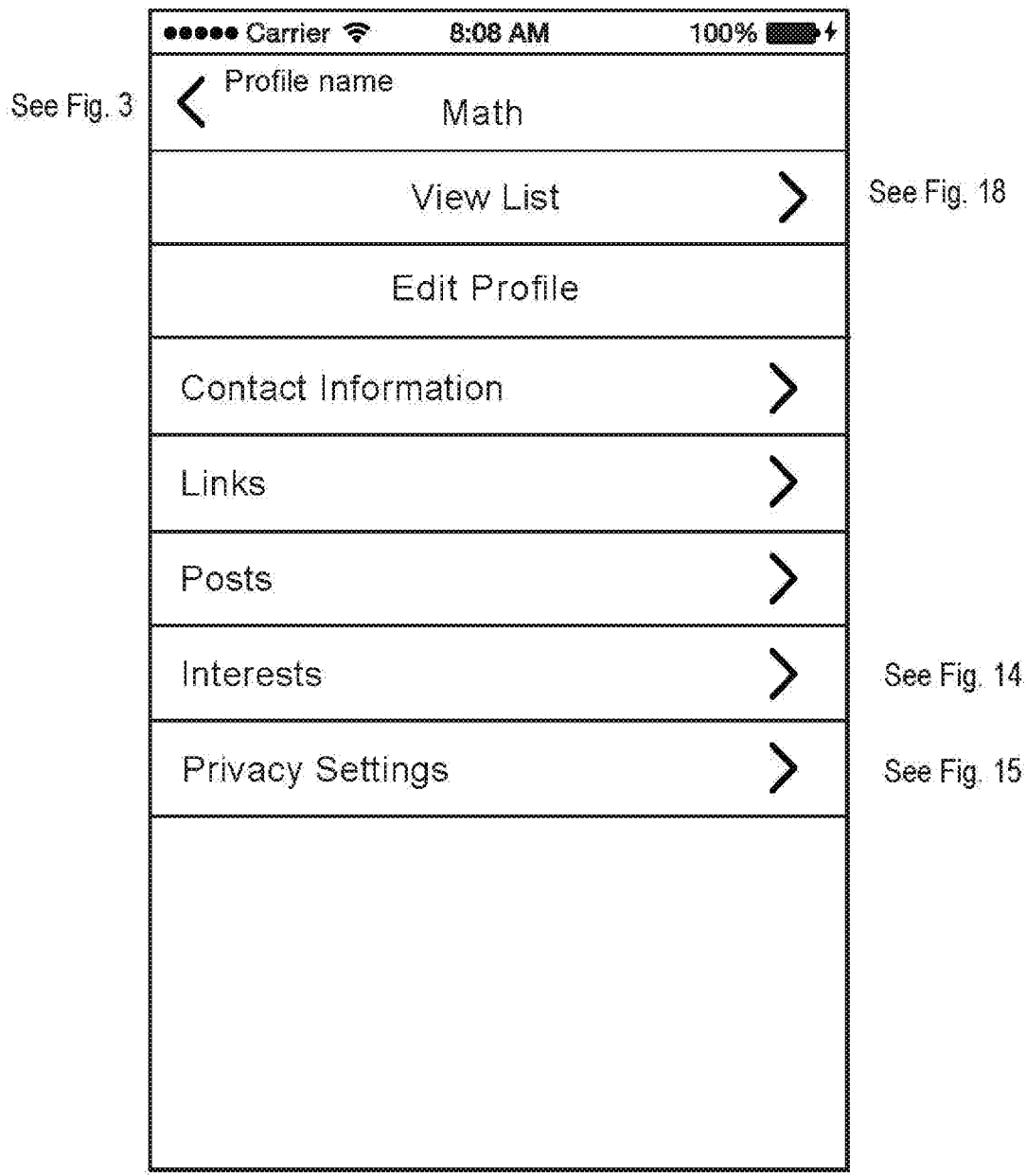
FIGS. 13-17 are smartphone wireframe diagrams, similar to those used for composing/editing the user's default profile information of FIGS. 4-12, but wherein the user has composed a second profile, named "Math," by selecting the "+" symbol in FIG. 3 and by populating or not populating the information bars in the FIG. 4 screen differently from those in the user's default profile.
Figure 14:
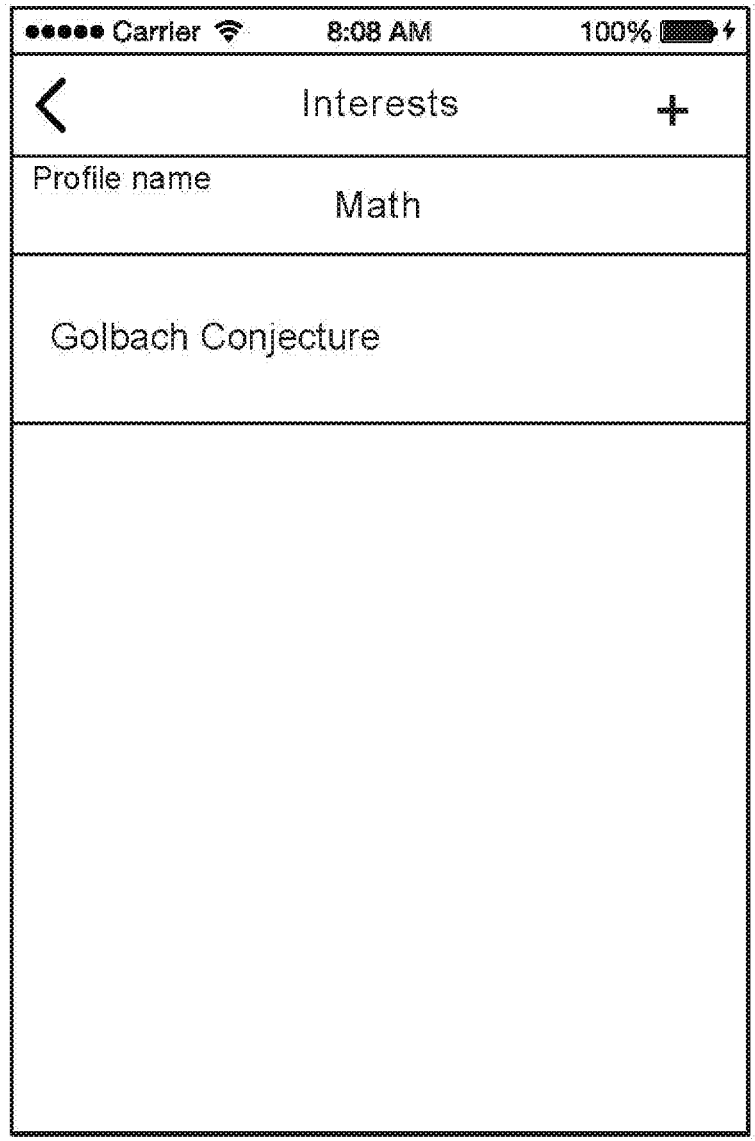
Figure 15:
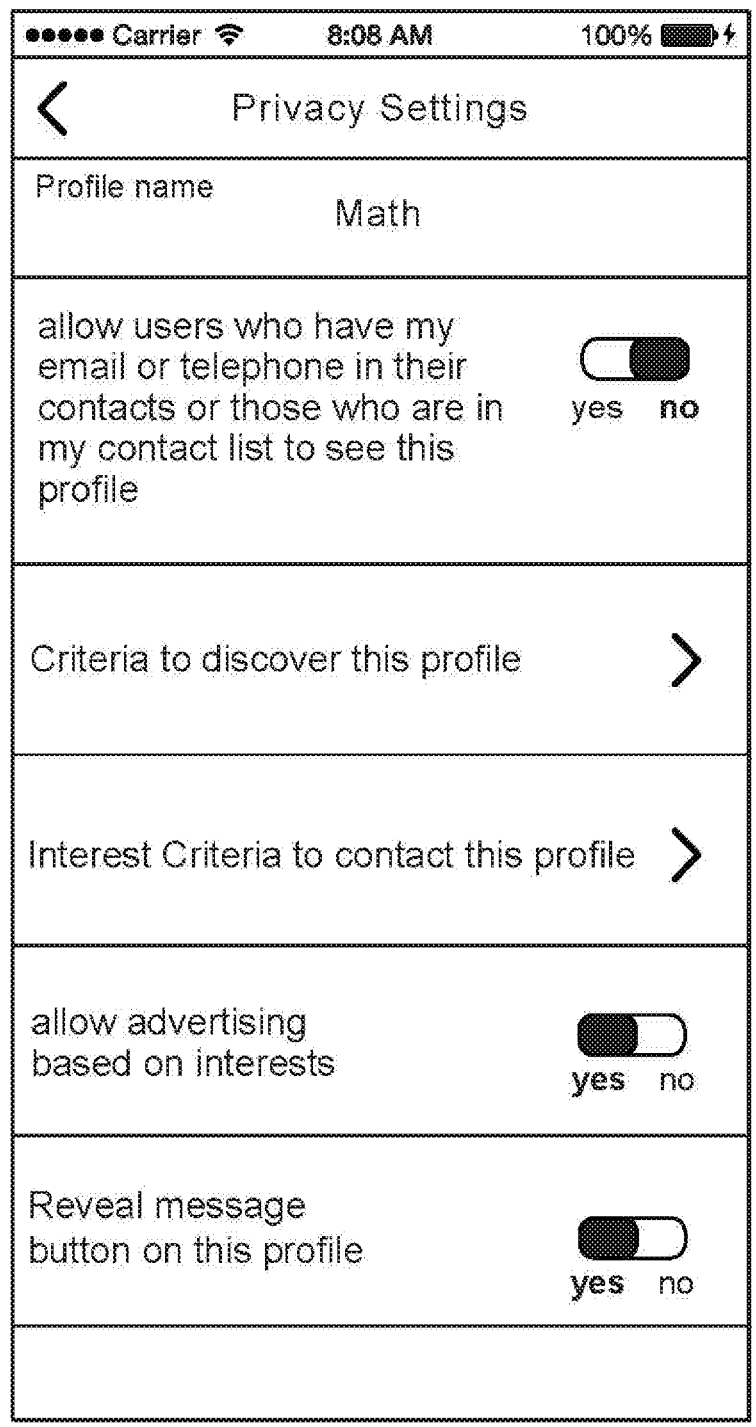

FIGS. 13-15 depict how the Math profile identified in FIG. 3 was created by the user, what it contains and what purpose it serves. First, the user tapped the "+" symbol in FIG. 3 to open a blank FIG. 13 profile screen, which the user then named "Math;" the user may at any time exit a profile by selecting the "View List" block which takes the user to the FIG. 18 screen presently to be described. In this example, it is assumed, that John Smith opted to not provide any contact information, links or posts as part of his Math profile; he did so by intentionally leaving all of these fields blank. John Smith opted to specify only Criteria and Privacy settings, as shown respectively in FIGS. 14 and 15, and which are individually accessed by selecting the appropriate one of the like named blocks in FIG. 13. Specifically, in FIG. 14, John Smith opted to reveal to others in response to a search, his interest in the "Golbach Conjecture," which expression is widely known among serious mathematicians as identifying one of the oldest unsolved problems in number theory and, indeed, in all of mathematics.

FIG. 15 depicts the privacy selections made by John Smith for his Math profile. First, by selecting "no," in response to the question "allow users who have my email or telephone number in their contacts to have access to this profile," he determined to not make his Math profile available to such persons solely by reason of such facts. These individuals may still discover his Math profile by search like any other member of the ecosystem, but they will not know at the time of the search that the person discovered is in their own contact list.

Figure 16:
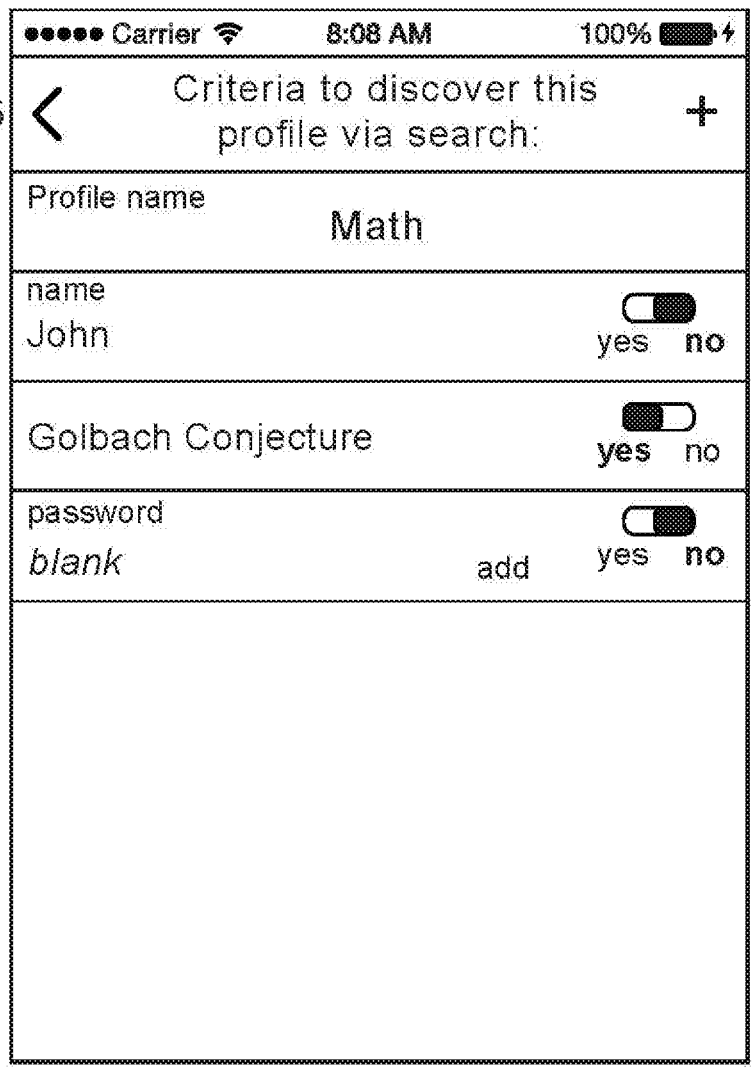

By selecting in FIG. 15 the block stating "Criteria to discover this profile," John accessed the FIG. 16 screen which offered him the opportunity to specify further criteria for the discovery of his profile via search. By responding "no" in the name and password fields of FIG. 16 and "yes" to the field in which he placed the phrase "Golbach Conjecture," he specified that his Math profile could not be discovered via search other than through the term "Golbach Conjecture." By answering "yes" on the last two blocks on the FIG. 15 screen, Smith allowed advertising to be directed to him based on his identified interest and to reveal the message button on his Math profile, selection of which button by a person having his profile would allow composition and sending of a message to him from any person who discovered him through the search term "Golbach Conjecture."

Figure 17:
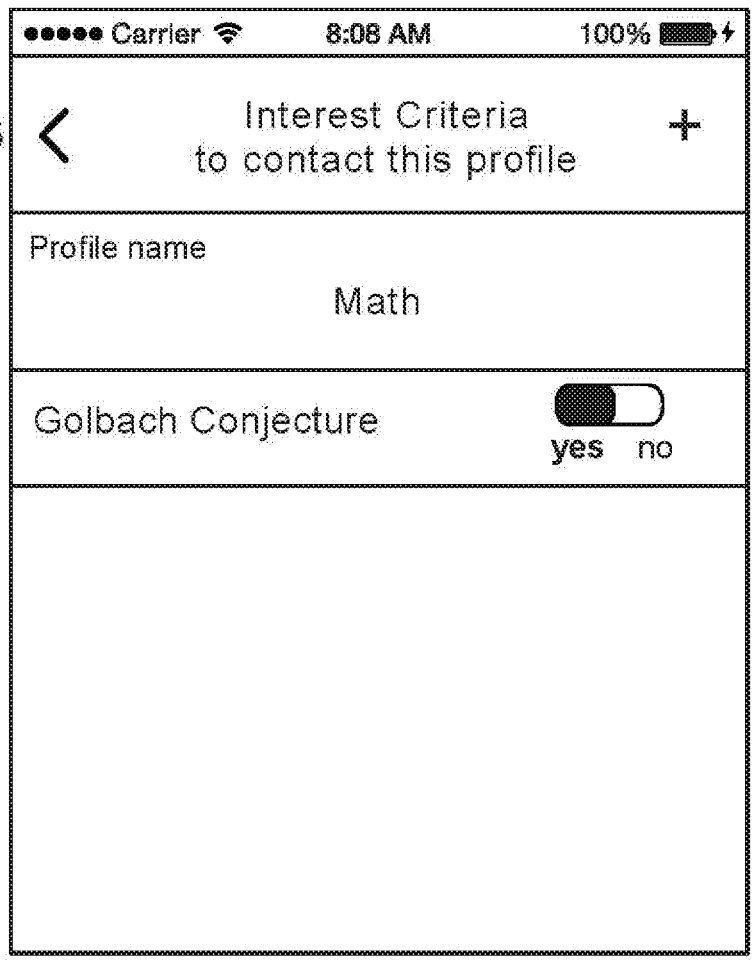

By selecting in FIG. 15 the block "Interest Criteria to contact this profile," John accessed the FIG. 17 screen. He there specified that anyone discovering his Math profile via search had the option of contacting him, but only as an unnamed person willing to receive a message from anyone sharing his interest in the "Golbach Conjecture." The person sending the message would know nothing about the person to whom he/she was sending the message other than the fact that such person was willing to receive messages pertinent to "Golbach Conjecture."

Upon receiving a message, John Smith may reply or not as he sees fit. Depending on what the person sending the message chose to reveal in their message and/or profile accompanying the message, John Smith might have more or less interest in responding. Assuming the parties were motivated or interested enough to continue communications, they might determine to communicate and share their thoughts about the Golbach Conjecture, and might ultimately decide to reveal their personal identities and/or professional qualifications in mathematics. They might also seek to discover others having the same interest and ask them to join with them in exploring possible solutions to the "Golbach Conjecture" and thereby form a common interest affinity group. In this way, persons with a common interest in, for example, an obscure but important matter may search even the worldwide "crowd" for others sharing a common interest, without compromising personal identity, and determine whether or not to communicate and/or collaborate with one another and others.

As those skilled in the art will understand, privacy settings within the construct and teachings of the present invention may offer many and varied privacy options to the system user beyond the particular examples described, all as determined by selections made available to the user by the system proprietor from the host cloud computing center. In accordance with the invention, central storage and judicious handling of the various elements of "profiles," rather than compromising privacy, actually enables enhanced personal privacy by ceding to each individual member meaningful control over their own system privacy. In accordance with the invention, personal privacy is not inconsistent with individuals being able to meaningfully join and/or participate in affinity groups of all sizes and kinds, nor is compromise of personal privacy necessary to enable meaningful online connection with others, nor for users to benefit from business advertising. This is in distinct contrast to the popular social, search and other prominent online businesses of the day, such as Google, Facebook and LinkedIn, which have widely criticized "privacy" policies calculated to invade individual privacy for their own financial gain, under the guise that such is necessary to "help" the user. The present invention helps the user without compromising personal privacy except as desired by a user to achieve some user objective, and without building within the system an ever more detailed personal profile of a person's online actions to achieve some commercial objective which may be antithetical to the interests of the user.

Figure 18:
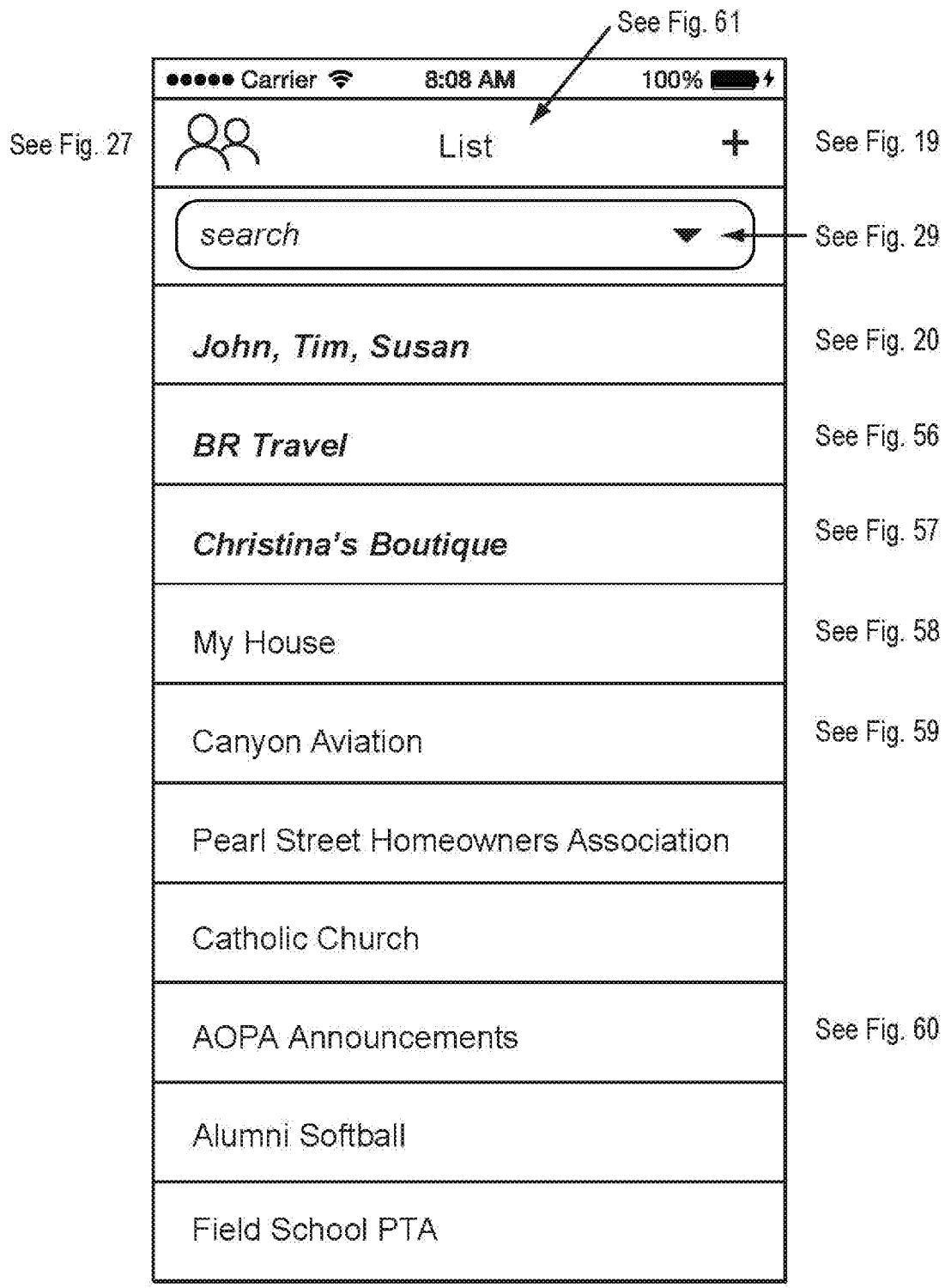
FIG. 18 is a smartphone wireframe diagram showing an exemplary, scrollable "List" screen, listing in individually selectable bars all of the "tracked objects" that the exemplary user created, joined or otherwise became a member.

FIG. 18 is a List screen listing all of the "tracked objects" a user has created, joined or otherwise become a member. The FIG. 18 screen identifies by name all tracked objects with which the user is associated and does so in separate, individually selectable gesture sensitive blocks. Private messages sent in the manner above described will result in the creation by the system of a new tracked object which appears in the user's list, which tracked object has the attributes of a tracked object joined or created by a user. Instead of, or in addition to, being selected by gesture, the individual blocks in FIG. 18 and the other figures described may be selected by voice or other command, as is well known to the art. In any event, the listed tracked objects are either those created by the user in a manner shortly to be described, or created by another person or entity that included this user as an addressee or invitee, based on having the user's contact information, or created by the system when a person "messages" another person as just described. Gesture selection of the word "List" in the header of FIG. 18 takes the user to the FIG. 61 List Filter Panel screen described later herein. Likewise gesture selection of the specified individual tracked object identifier blocks in FIG. 18 takes the user to the respective screens shown in FIGS. 56-60, which screens are discussed later herein.

Figure 29:
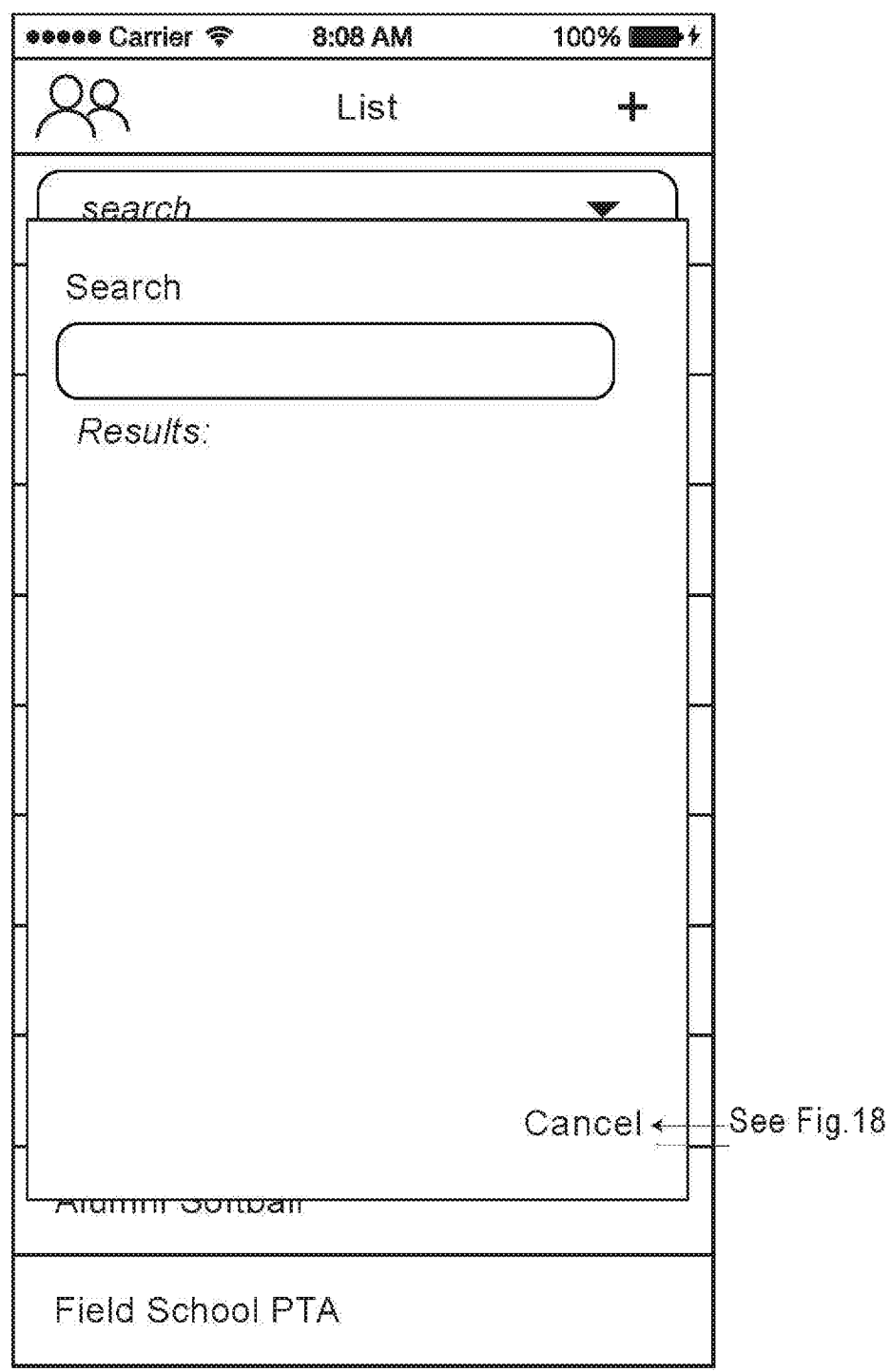
FIG. 29 is a smartphone wireframe diagram depicting a search screen for a tracked objects list, accessed in the example by selecting the down arrow in the FIG. 18 search window.

Selection of the down arrow in the search window of FIG. 20 opens a list search screen shown in FIG. 29, as described later herein.

FIG. 18 shows only some of this user's tracked objects. The list screen is scrollable thereby imposing no artificial limit on the number of tracked objects with which a user may associate and still conveniently view by, for example, thumb scrolling of the mobile phone screen. The tracked objects may be ordered in the list view in any of several ways, such as alphabetically or, alternatively, by having those tracked objects with new messages always migrate to the top of the list and be identified in bold print, as shown, or some other easily distinguishable visual indicia may be used to denote tracked objects with new messages. As a further option, by selection of an edit icon or the like, the user may order the blocks in any way desired simply by placing a finger on the block and moving the finger (and block) to a new vertical location. Many well-known apps use this technique so it is familiar to those skilled in the art and even to the average app user. This same approach may be used to create tracked object folders, for example, an "aviation" folder containing a number of aviation related tracked objects, such as aviation groups, businesses and other online aviation communities that now typically send machine generated information of interest to the user, but which the user only needs or wants to view when interested in doing so. The invention thus allows the user to participate in many such online communities without being overrun by an avalanche of machine generated messages, particularly when such messages are commingled with other, more pressing communications, as is inevitably the case with email. The reader is referred to the above-identified priority applications for a further discussion of the List page.

Figure 19:
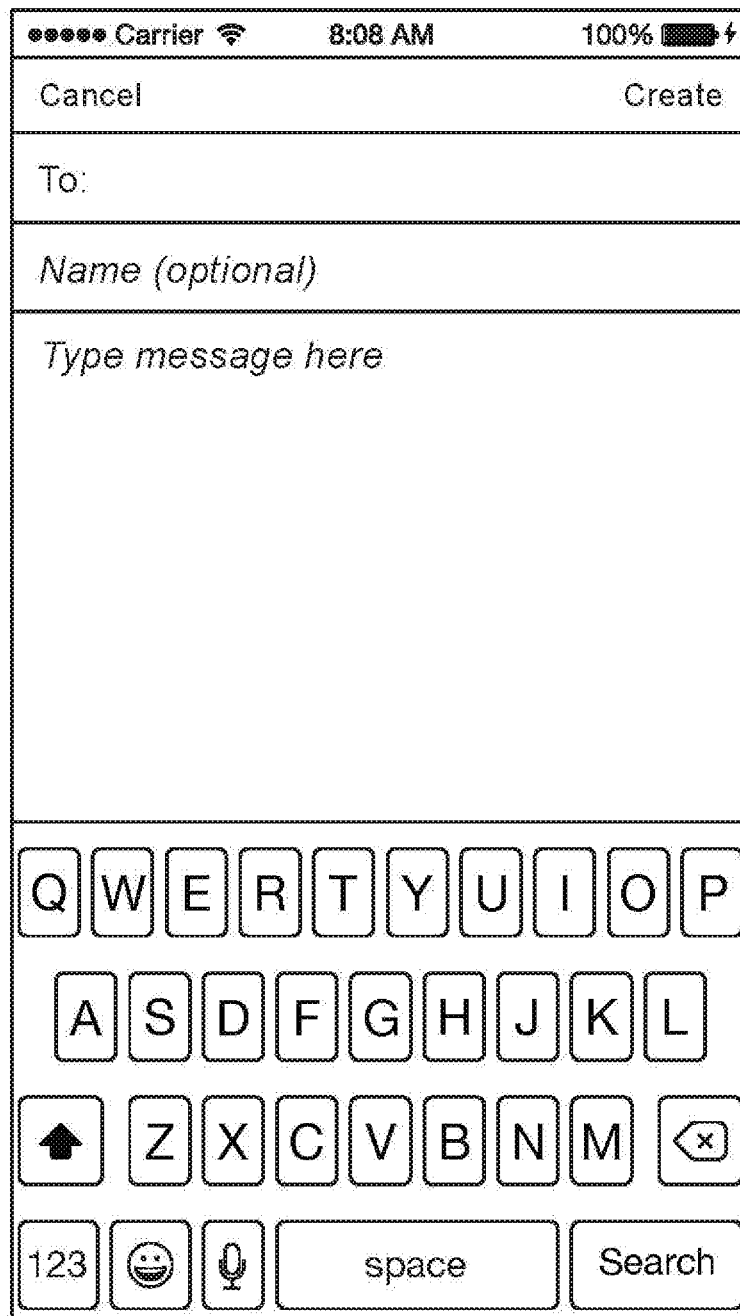
FIG. 19 is a smartphone wireframe diagram showing an exemplary, blank "tracked object" creation screen, which is accessed by selecting the "+" symbol in FIG. 18 and which, in the present example, is intentionally made to appear to the user to be as simple and familiar to engage as a conventional email creation screen.

FIG. 19 shows how a mobile device user may easily create a new tracked object. The FIG. 19 screen is accessed by selecting the "+" symbol in the upper right corner of the FIG. 18 screen. The FIG. 19 screen is intentionally made to appear like a typical email message or text message composition screen so users will find the screen familiar and easy to use. The names of those to be included as tracked object members are set forth in the "To:" line, as usual with email or text messages. A name may be assigned or not, at the user's option, to the tracked object. If a name is assigned, it is that name which will appear on the List page of FIG. 18; otherwise the first names (or other identifier) of at least some of those specified in the "To" line will appear on the List, such as John, Tim, Susan in FIG. 18. Also note that a tracked object may be named and the creator may leave the "To:" line empty. This allows creation of tracked objects where the creator is the only member and may be used for gathering and organizing notes and other media according to an area of interest, for example recipes, pictures of food, wedding pictures and the like. This technique may also be used when the tracked object will subsequently be made "public" as will be described later. The reader will recognize that the FIG. 18 List is also in a format familiar to users of text and email. Creation of a new tracked object in FIG. 19 will add that tracked object to the List screen in FIG. 18. Tracked objects may be removed from the List page and deleted with a "swiping" action, again an action familiar to email and text message users.

Content for the FIG. 19 tracked objects, which may include text, photos, videos and oral messages, among other things, may be included (in ways familiar to the art) with the initial, as well as later, tracked object posts, all as described more fully in the above-identified priority applications. Selecting a particular tracked object, such as John, Tim and Susan in FIG. 18, takes the user to the FIG. 20 screen, again as is familiar, and unintimidating, to email and text users. FIG. 20, here called the "stream," is a chronological presentation of individual posts to the associated tracked object, here "John, Tim and Susan," as identified in the header at the top center of the FIG. 20 screen. To facilitate the handling of long communications including those with many photos, lengthy text, etc., each post is of a standard cell size long enough to enable a user to get the gist of the communication and perhaps see thumbnails of a few photos, as shown, but short enough so that a user may quickly and easily scroll through a long list of posts with ease.

In the present example, a maximum of three thumbnail photos or the like are visible in each standard cell as well as a predetermined maximum of a few lines of text. The "See More" indication in the second block of FIG. 20 both informs the user that this post exceeds the standard cell size and serves as a gesture sensitive icon for opening of the full post. Users may return to the FIG. 18 list screen by gesture selecting the back arrow at the top left corner of the FIG. 20 screen. New posts are created by selecting the "+" symbol in the header of FIG. 20 thereby to open a screen for the creation of new posts. Further aspects of the new post screen are described in the earlier identified priority applications.

Figure 20:
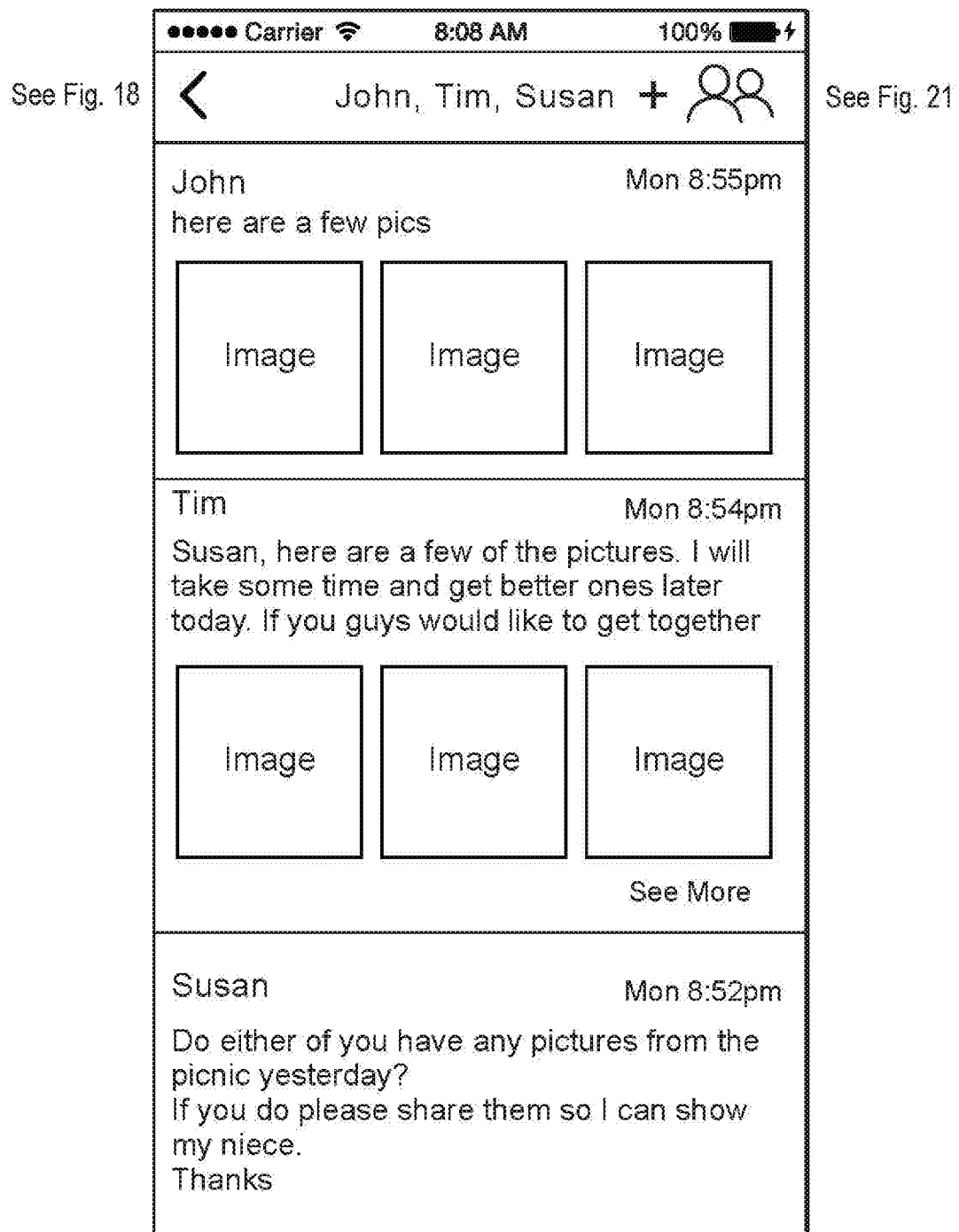
FIG. 20 is a smartphone wireframe diagram depicting an exemplary, scrollable communications or "messaging" screen (called "the stream" in the context of the present invention) accessed by the user selecting the "Doug, Tim, Susan" tracked object bar in FIG. 18, this screen having user friendly features made possible by the present invention.

Unlike typical email formats and text message formats, each post identifies only the author of the post, the date and time posted and the tracked object name (one time in one place—at the top of the screen, here as "John, Tim and Susan"), as seen in the several messages in FIG. 20. This is, in most cases, all a user needs or wants to know about a post, aside from its substantive content. Unlike email in particular, there is no "message overhead" in the FIG. 20 posts, such as the "To:" names included in the tracked object and the contact information of the party making the post, and the familiar, but aggravating "Confidentiality" statements, or footers containing extensive contact information, repeated in every mail of many business people. An unnecessary cognitive tax is avoided by preventing such information from being repetitively included in posts, or even included at all. The "tracked object" and related design features assure organization of all related posts into a singular stream for the tracked object. The stream for a tracked object is organized chronologically as an endlessly scrollable screen thereby eliminating the need to "delete" or "archive" posts, as typical in email. Also, since subjects are organized at the outset as tracked objects, each tracked object stream contains only posts related to that tracked object. This is contrast to the Gmail approach of listing emails chronologically as they arrive, regardless of subject matter, or sender, which, as a practical matter, requires deleting or archiving of emails to clear one's inbox and further necessitates a keyword search of a "haystack" of unrelated emails to recover archived emails related to a particular subject or from a particular person. Gmail has in recent years attempted automated electronic organization of incoming emails into crudely identified, broad categories by applying certain algorithmic rules and other automated practices, but this approach leaves much to be desired. Gmail also allows creation of folders into which users can organize incoming messages; however, this imposes a never ending administrative job on the end user to update and manage folders for incoming messages. The described system, by contrast, puts the organizational burden on the tracked object creator but this burden is at most the simple, one-time job of identifying the tracked object; in doing so, the invention resolves and eliminates any administrative task for any original or future members of the tracked object.

The system of the invention does not "send" messages and attachments to recipients; rather it posts information and "attachments" to a cloud server. Authorized users, in effect, visit the information at the cloud server, rather than receive it like physical mail, contrary to what is often done in email and text applications in accordance with the outdated post office paradigm. Of course, if desired the system may allow downloading of the tracked objects, messages and the like to the user's device for reading offline. Unlike email, but similar to certain text message applications, information is organized at the outset by subject matter, whether or not the user gives the tracked object a name. Of course, having a tracked object name is particularly useful when one belongs to an association or group thereby to clearly distinguish groups from one another, whether they be simply friends, family, other affinity groups and/or trade, business and other associations.

Figure 21:
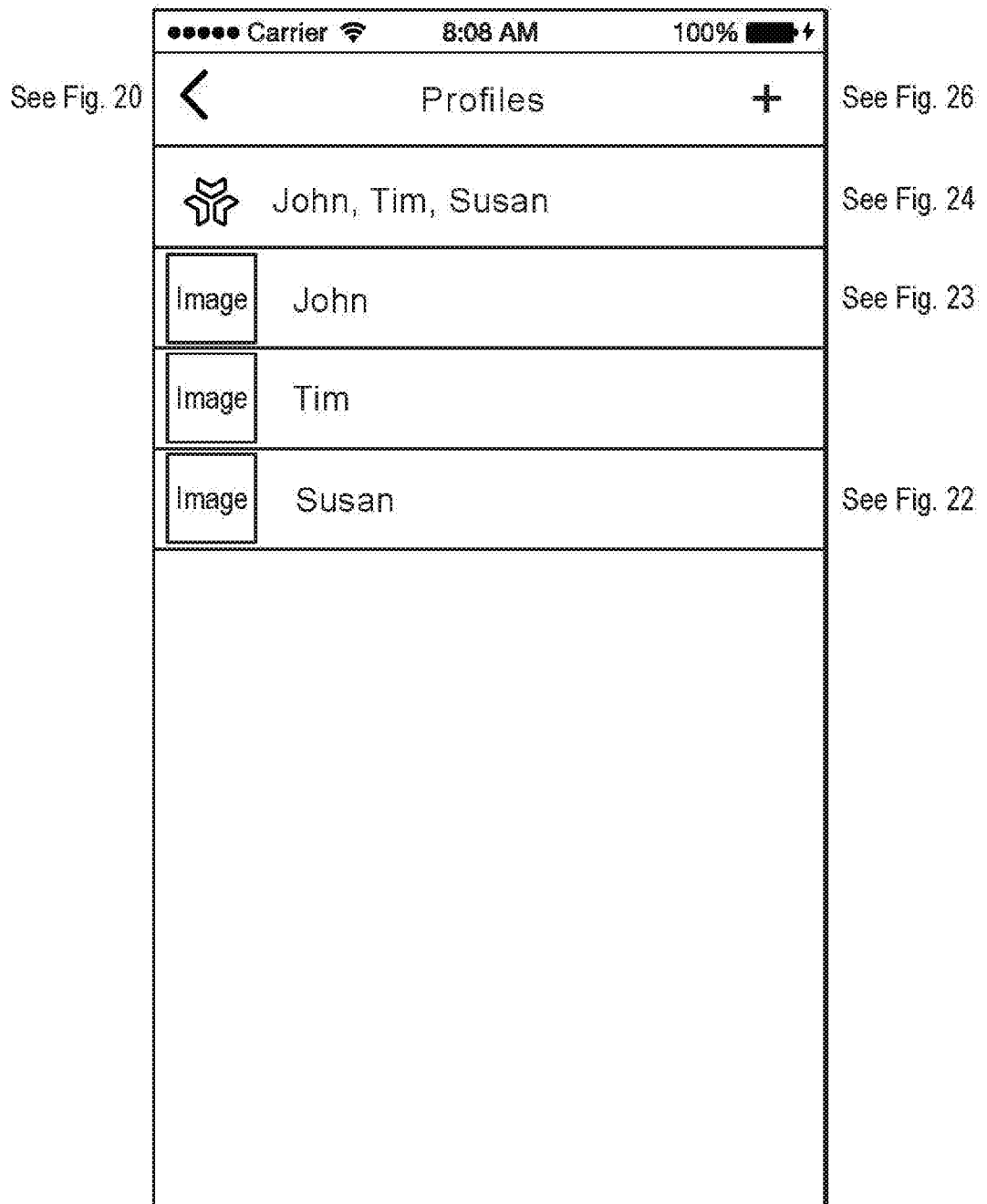
FIG. 21 is a smartphone wireframe diagram showing an exemplary profiles screen for the tracked object "Doug, Tim, Susan," accessed by selection of the persons symbol in the upper right corner of the FIG. 20 screen and listing in separately selectable blocks the identity of the members of the selected tracked object and, at the top of the list adjacent the hapyn trademark logo, a profile identifier for a profile "about" the tracked object.

All of the "message overhead" omitted from the posts in the FIG. 20 "stream" may be found, along with other important, useful information, by selecting the persons icon at the top right corner of the FIG. 20 screen which takes the user to the FIG. 21 tracked object profile identifiers screen for the exemplary, unnamed (i.e., not named by the user) tracked object "John, Tim and Susan." As shown in FIG. 21, there are listed, in separate individually selectable blocks, the profile identifiers of each of the tracked object members, with the profile identifier of the tracked object creator, John, being at the top of the list of individual profile identifiers. Each of these tracked object members, like all other system members, is able to create a multiplicity of profiles containing the content, interests, criteria and privacy settings desired for selective use with individual affinity groups or the like, such as in the manner earlier described in connection with FIGS. 2-17. Presumably, although not essential, each of John, Tim and Susan may have created a comprehensive default profile from which they composed one or more limited "social" or other profiles to be used in simple, personal communications with friends and acquaintances, while reserving additional profiles, composed as appropriate, for other affinity groups, such as professional and alumni associations, local Cirrus pilot groups, architect associations, friends with interests in growing orchids, the exemplary groups on the FIG. 18 list and the like.

Figure 22:
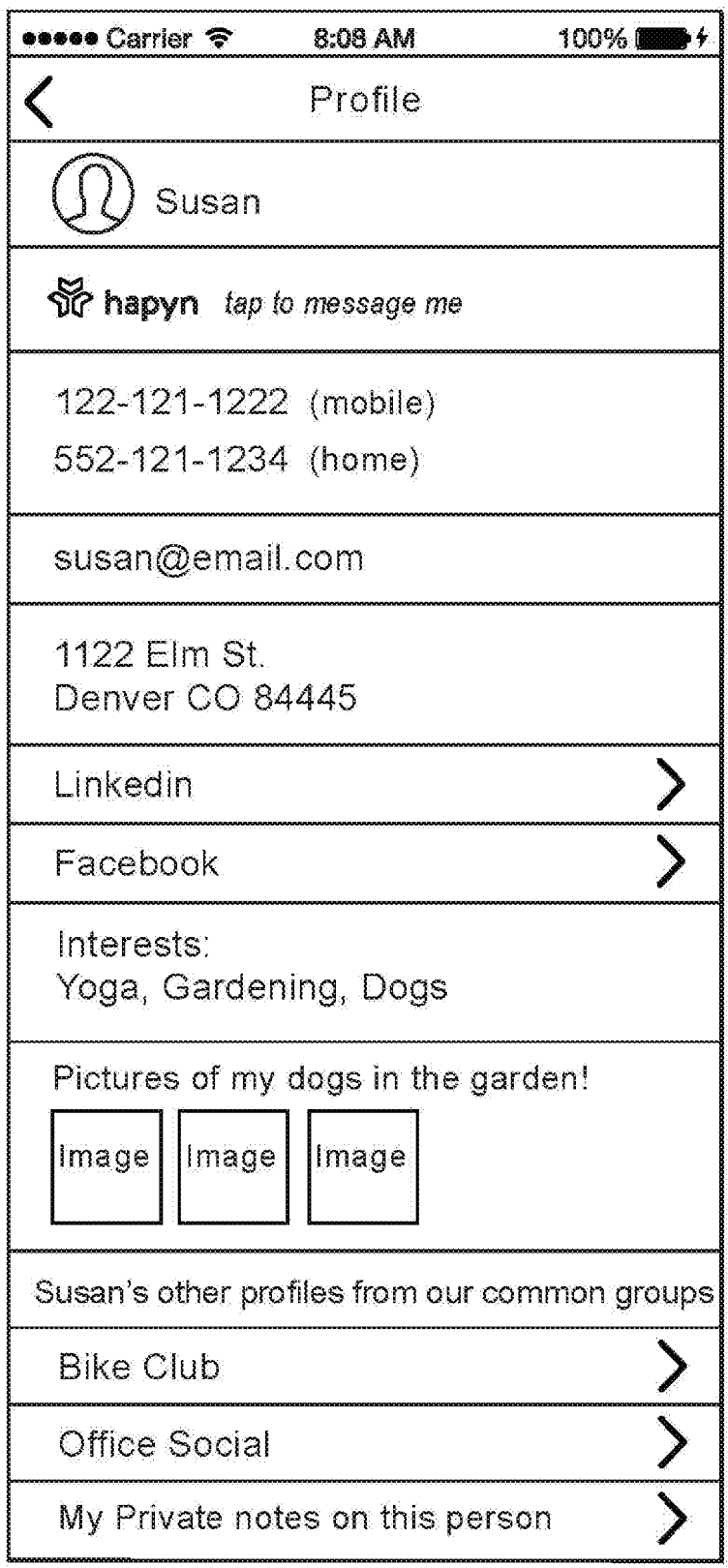
FIG. 22 is a smartphone wireframe diagram depicting the personal profile of the tracked object member "Susan" accessed by selecting in FIG. 21 the bar with her name on it.

Another tracked object member, i.e., either Tim or John in this example, selecting the profile identifier "Susan" in FIG. 21 opens Susan's profile as shown in FIG. 22, which FIG. 22 profile is composed in the manner Susan wishes to be known to this affinity group, presumably two friends. The FIG. 22 profile includes her first name, a mobile and home phone number, an email address, a physical address, links to her LinkedIn and Facebook feeds, reference to her interests in yoga, gardening and dogs, and a post of some photos of Susan in her garden with her dogs. Profile posts, like those in the stream, may be of a standard cell size which is expandable as earlier described. The person opening the profile, FIG. 22, may "send" Susan a private message by selecting the block or message button near the top of the screen and the words "tap to message me," which block in the present example also displays the trademark "hapyn" and the associated, distinctive trademark logo. This action creates a new affinity group in the same manner as that earlier described, that is, the names of the parties to the private message become the tracked object identifier on the list page (assuming no subject name is provided) and there is created a message stream screen and profiles identifier screen (and individual profile screens) associated with the new tracked object. The private "message" is not actually sent like physical mail to Susan, rather the "message" and any accompanying "attachments" are posted on the cloud server with the appropriate parties being permissioned to see the content. The private message block is seen on Susan's profile because she chose "yes" for the "reveal message button on this profile" selection in the privacy settings screen shown in FIG. 9. The private message button would not be present in Susan's profile if Susan had answered this question "no."

The system recognizes by techniques well understood in the art that the person viewing Susan's profile has other affinity groups in common with her, here "Bike Club" and "Office Social," and identifies and lists the common groups in separate fields using techniques well known to the art. Selecting one of the listed affinity groups, i.e., Bike Club or Office Social, takes the user directly from Susan's profile to the named affinity group, in the same manner as would selecting the affinity group directly from one's own list page. However, when selecting an affinity group from the list page, one would not be informed of which affinity groups were had in common with others.

A tracked object creator, John in this example, and others authorized by John, may remove persons from the tracked object by, for example, swiping left on the profile identifier for a person on the profile identifier list, FIG. 21. A right swiping gesture, or some other gesture such as a higher touch pressure on a haptic screen may elicit a submenu from which various other actions may be taken with respect to the selected profile identifier, such as bestowing a "creator-like" status on the selected person or other privileges.

The FIG. 22 profile, in the lowermost block, references "My private notes on this person." Selecting this block takes the user to a screen depicting the user's private notes, if any, on Susan. The person may, in conventional fashion, add to, delete or modify their own personal, private notes about the person in the profile. Of course, the person, here Susan, is not privy to these private notes.

Anyone in an affinity group may open their own profile and may add to, alter or delete any portion of their own profile from within the affinity group or, alternatively, may return to their Account information page, FIG. 3, select the profile there and make the desired changes. Only the profile so modified henceforth will be available to others within the affinity groups to which the profile applies. The "old" profile, that is, the one changed, is not available to others subsequent to the changes being made. In this way, users can "change their minds" about what information they wish accessible to others.

Readers will recognize that, among other things, the invention relieves all participants from ever again having to exchange "contact" information in the manner historically done to compile and update one's own contact list. This enables a user to effectively update their own contact and other personal information for everyone in their so-called "contacts" list or contacts directory simply by changing their own profile(s) on their own device, which results in a change in the corresponding profile at the cloud computing center. With the profiles feature of the invention, all within the system have the most current information for all in their own "contacts" list or personal directory, to the extent that each person wishes to provide a particular user or group of users updated information, while the profile changed is no longer accessible to any third-party. The onus is, as it should be, on each person to do their own housekeeping in timely fashion in terms of updating their own contact and other profile information; the burden is not on others to "reach out" for updated contact information. The invention also enables one to "take back" their profile information from one or more others thereby to present only a new or modified profile and/or clear out from their directories others that, for one reason or another, a person or entity no longer wishes to retain in their own directory. Such removed persons are thereafter unable to contact within the system the person that did the removal. The profiles feature also offers the opportunity to put forward to others far more information than is practical in a business card, an email signature block or other format. Although not explicitly shown in the drawings here (although shown in the parent priority applications), it will be understood that user profiles may have other sections beyond those shown in FIG. 4, such as to include the annoying "confidentiality" statements repeated in all emails sent by many business persons. Placing such "confidentiality" statements in one's own profile provides the requisite notice to others, while eliminating the clutter and associated cognitive burden on the recipient(s) of including such statements repetitively in the body of each post in the message stream.

Figure 23:
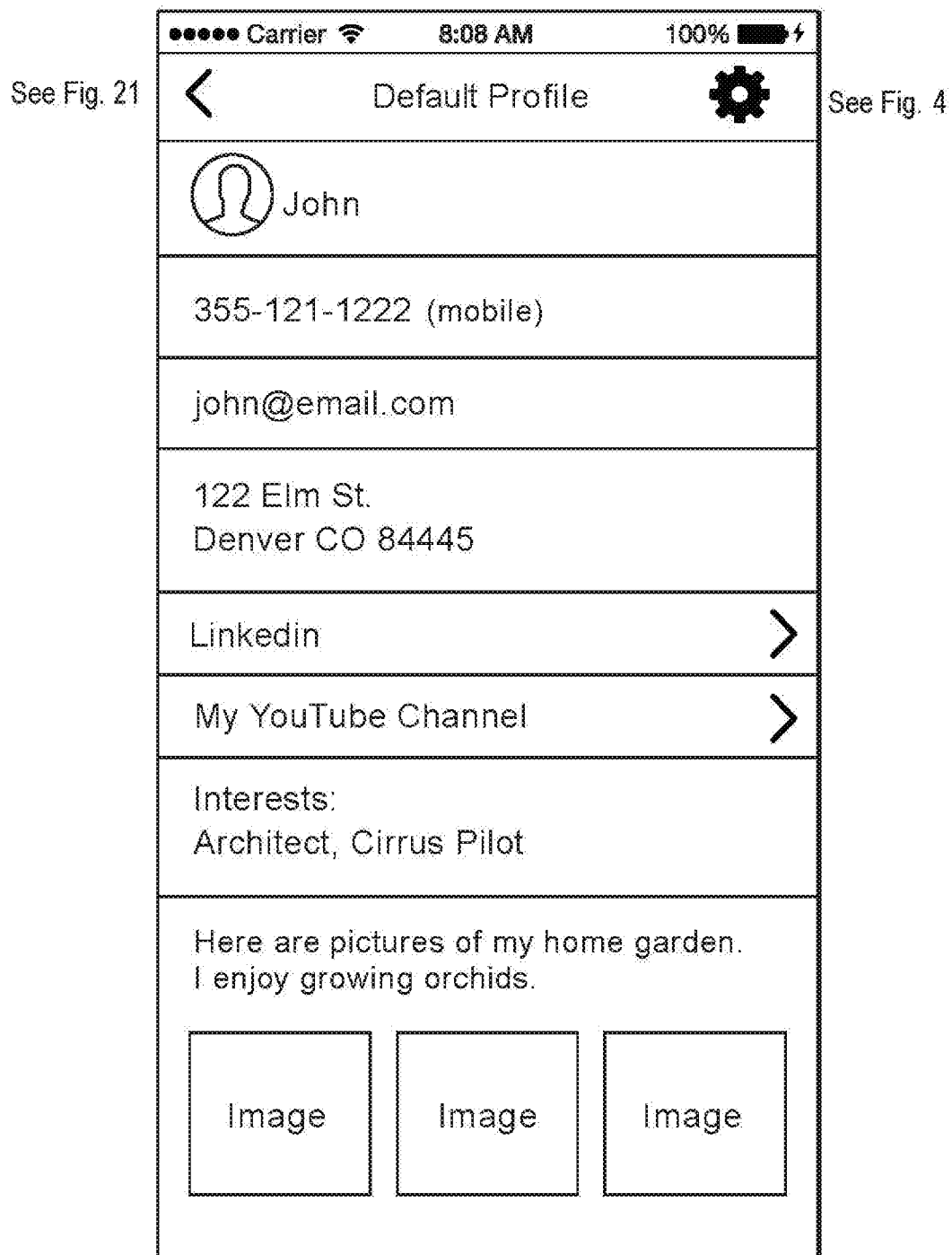
FIG. 23 is a smartphone wireframe diagram depicting the profile of the tracked object creator "John," accessed from the FIG. 21 screen by any tracked object member selecting the bar with John's name on it, the creator's profile bar preferably always being the uppermost one of the individual profile identifiers, and the creator profile being here shown with a "settings" gear indicator in the upper right-hand corner of the screen (visible only to the profile owner, that is the person who created the profile and not to other tracked object members who select the profile) to return the creator to the FIG. 4 screen for editing of the creator's profile.

An affinity group member who opens their own profile from the exemplary FIG. 21 profile identifiers page will see some items different from those seen by another member opening the same profile. In this regard, FIG. 23 depicts what the tracked object member, John, sees when he opens his own profile. The information John sees is generally the same as others see on opening his profile except that John cannot, for obvious reasons, send a private message to himself, nor is there any listing of the tracked objects John has in common with himself, nor any field for private notes about himself. When a person opens their own profile, there is also a settings gear icon in the upper right corner of the profile page header, as shown in FIG. 23 that is not seen by others who open his profile. Selection of the gear symbol takes the user, here John, to the edit profile screen for this profile, here John's Default profile, FIG. 4 where John Smith may make any desired changes in the profile, which is the profile he has used for this tracked object. If John Smith reached the FIG. 4 screen from the FIG. 23 screen, selection of the back arrow in the FIG. 4 screen returns him to the FIG. 23 screen. Selection of the back arrow in the upper left corner of the FIG. 23 screen returns the user to the prior screen, here FIG. 21, the profile identifiers screen. The back arrow is a common convention and one followed on the various screens shown herein.

Although not essential for a simple tracked object, such as friends engaged in mundane, wide ranging social communications typical of personal texts and emails, like where to meet, go to dinner, share in the moment photos, etc., those tracked objects involving a significant common interest among members will benefit from having at least one further profile, here called the "About" profile; the About page or profile is also disclosed and discussed at length in the above-identified priority applications. There may be listed on the profile identifier screen, as appropriate or as required for a particular tracked object, additional "profiles" that are not person profiles, nor even profiles at all, but rather are in the nature of separate information channels that may be used for wide ranging purposes, such as "unpacking" a deep, complex website into any number of separate "profiles" for ease of access, "thing" profiles (meaning a profile/information channel relating to any inanimate object or the like) and/or are entity profiles, such as for businesses, associations or informal affinity groups related to or pertinent in some way to the tracked object with which they are associated. Examples of such other types of profiles or information channels are discussed later herein. Profiles/information channels is a very powerful feature as any number of profiles/information channels for any number of purposes may be created and accessed directly from the scrollable profiles identifier page or screen.

Here, the single About profile identifier is shown as the uppermost profile identifier block in the FIG. 21 profile identifiers screen, and is there denoted by the hapyn trademark logo and the name of the tracked object. Selection of the About profile identifier by any one of the tracked object members, takes that person to the About profile page, FIG. 24, here shown schematically since it may take many different forms, as appropriate to the situation. The About profile may have images, videos, audio, texts or the like for sharing common interest information "about" the tracked object, such as reference materials and other information that otherwise might be shared in a group website. If all users are given permission to post to the About page, there will be a "+" symbol in the FIG. 24 header; if only the creator may post to the About page, the "+" symbol will only be available in the about header of the tracked object creator.

Figure 24:
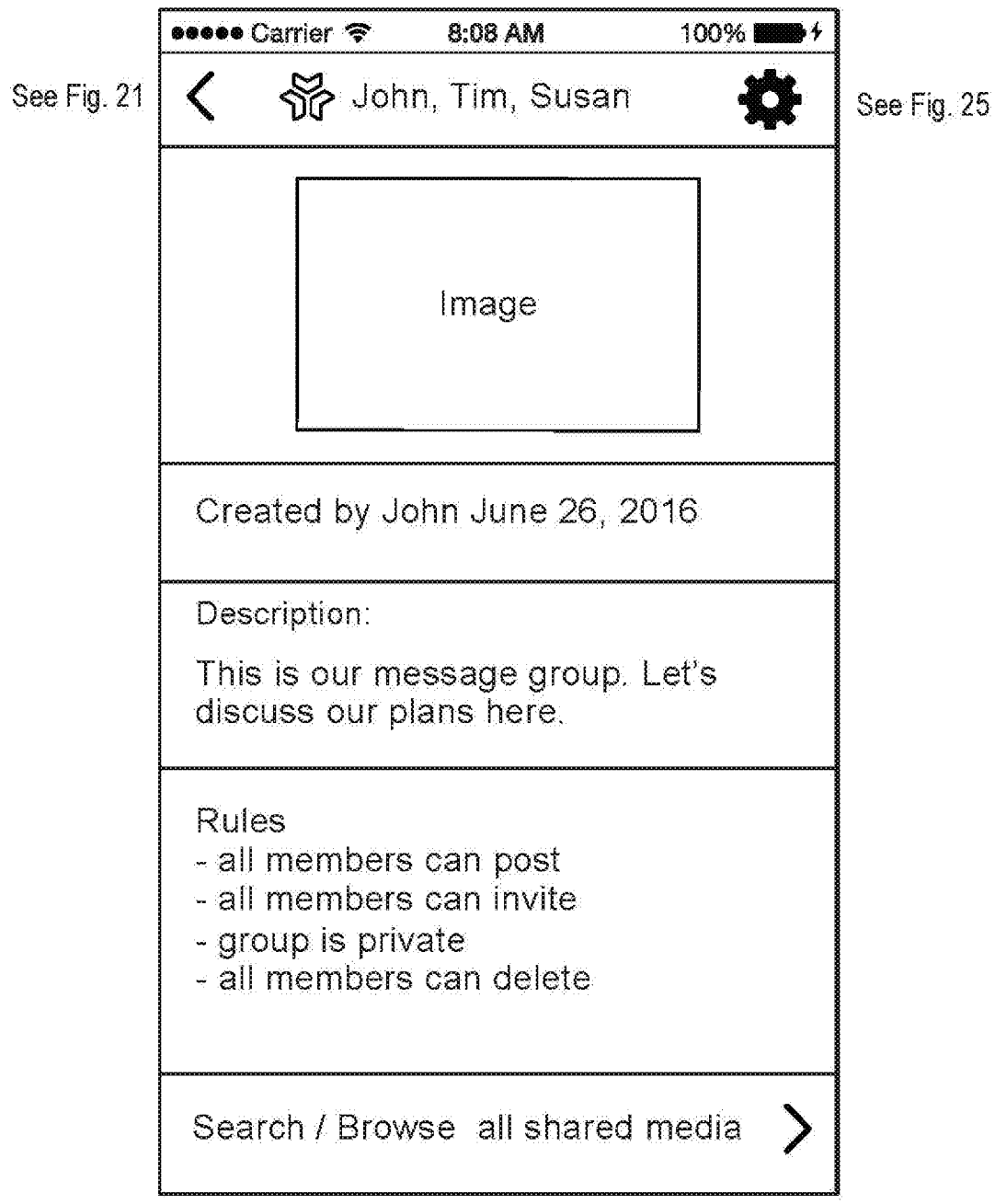
FIG. 24 is a smartphone wireframe diagram depicting an "about" profile for the tracked object itself (as opposed to a profile of an individual tracked object member), accessed by any tracked object member selecting the uppermost bar in FIG. 21 (the bar with the hapyn logo trademark and tracked object name), and the FIG. 24 diagram shown further depicting, in the upper right-hand corner of the screen, a "settings" gear icon visible only to the tracked object creator, John.
Figure 25:
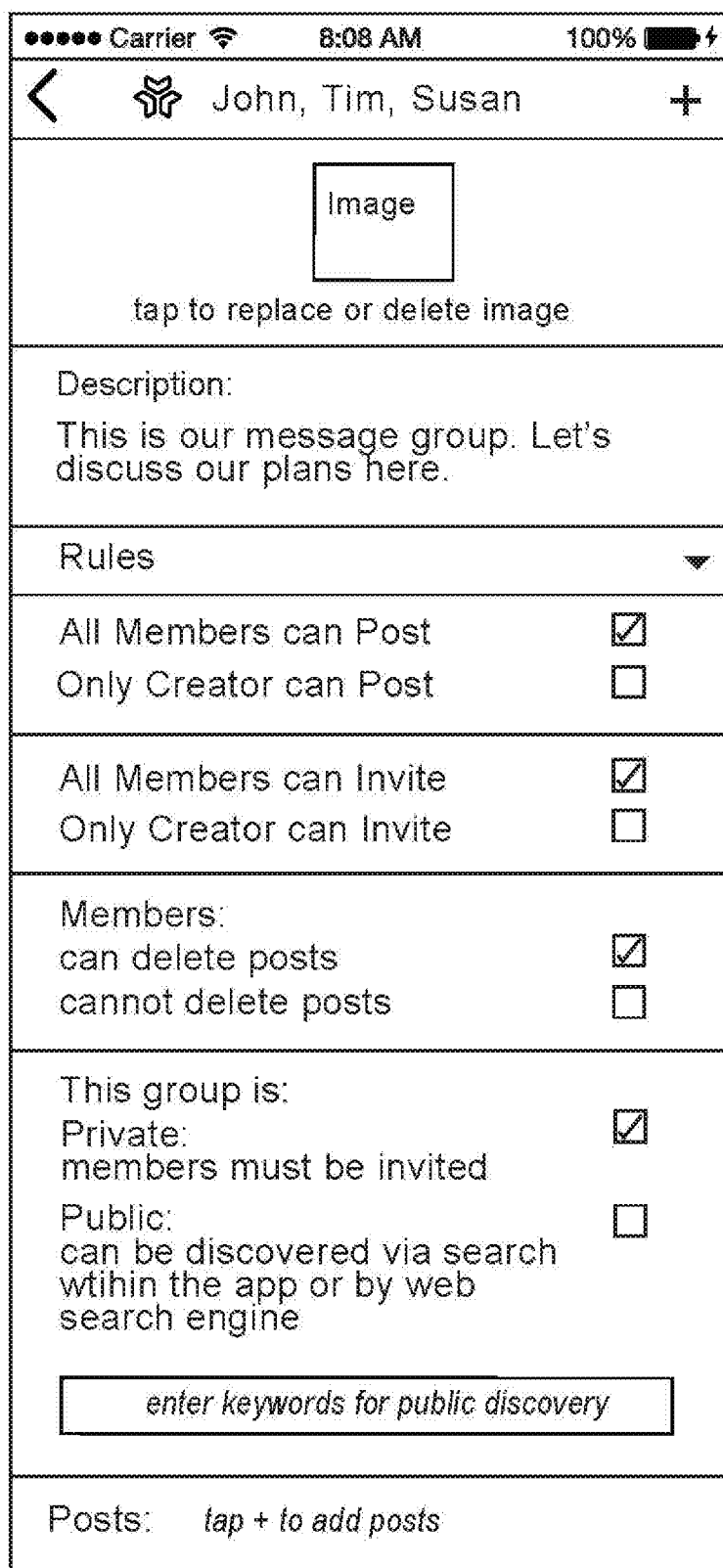
FIG. 25 is a smartphone wireframe diagram depicting a "settings" screen for the tracked object, accessible only to the tracked object creator, John, upon selection of the settings gear icon in FIG. 24.

Tracked objects may have different properties as assigned by the tracked object creator. The assignment of these properties, such as "rules" and permissions, are conveniently made by the tracked object creator in a manner presently to be described. In the present example, the About screen is composed of separate fields having separate purposes. Here, there is an image or the like representative of the group at the top of the FIG. 24 screen (for simplicity, depicted here schematically as the block labelled "Image"), a statement of when and by whom the tracked object was created (here created by John on Jun. 26, 2016), a verbal description of what the tracked object is "about" and as well the rules/permissions set by the creator for the tracked object. The various Rules options made available to a user, as established by the system operator and controlled from the cloud computing center, are those set forth in FIG. 25 presently to be described. In FIG. 24, the creator selections specify that all members may both post and invite others to the tracked object, that the group is private (i.e., includes only those invited by the creator or other authorized group member) and that all members may delete their own posts to the stream (but not the posts of others). There is also in the FIG. 24 example a lowermost block, here called "Search/Browse all shared media" (opened by gesture selection) on the assumption that what is shared is voluminous, but this block may be as simple as a few photos or the like. In short, the About profile may be as simple or as sophisticated as appropriate to the situation. Unlike a website, the About page is not only easy for those not schooled in technology to conveniently create and update, it also is easily accessed by others in the context of the shared common interest rather than requiring a user navigation to a separate website, all as is further described in the above-identified priority patent applications. There may be multiple, different "about" or other types of profiles or information channels within an affinity group, such as about specific sub-group activities and particular subject areas pertinent to an affinity group or the like. Profiles adds an additional degree of freedom in communication among members of an affinity group as profiles may be about anything pertinent to the group and profiles may be included in any numbered desired on the profiles identifier page since the page is endlessly scrollable.

Since John's profile identifier in this example is at the top of the individual profile identifiers in FIG. 21 that fact signals to everyone in the group that John is not only a group member, but also the tracked object creator. Because John is the creator, he sees, on selecting the About profile identifier in FIG. 21, a settings gear (in the upper right corner of the screen) in the About profile, FIG. 24, that is not visible to others in the group on opening the About profile. This settings gear is selected and choices made for the tracked object (among those offered as options by the system proprietor) at the time the tracked object is created and such choices may be later modified as allowed or appropriate, to the extent consistent with the controlling rules options established by the system proprietor. New rule and permission options may be added, modified or deleted by the system proprietor from time to time thereby giving tracked object creators, potentially retroactively, further (or fewer) rule and permission options for their existing and newly created tracked objects.

Selection of the gear icon in the upper right corner of FIG. 24 takes the creator to the FIG. 25 screen, the tracked object About profile settings screen. Here, in the present example, the creator is able to select some media for the title or first page of the tracked object (selecting the "+" symbol in the upper right corner of the screen allows for the making of multiple posts and for adding posts from time to time) and set the rules for the particular tracked object. In the present example, the creator has selected "all members can post" in the stream, "all members can invite" others, and all members may delete their own posts, but not those posts made by others, and that the group is "private," meaning in this context that only its invited members are privy to it and that it cannot be discovered by a system wide search. In the event the group is designated as "public" and discoverable by search (a system search or a public search by a web search engine), there is provided a box at the bottom of the screen for specifying the keyword criteria by which it may be discovered in a search. Of course, other and further selections may be offered as appropriate and permitted by the system operator.

Tapping the "+" in the upper right corner of FIG. 25 opens a box for adding media and/or text in a manner familiar to the art. For example, if perhaps 20, or even 100 or more, persons belong to an informally organized Bike Club, the club may post information "about" the club purpose, membership requirements, activities, favored bikes, past events, etc. on the About page, while members may be encouraged to post more in the moment communications, such as upcoming events, in the stream. The About profile may be simply a photo or two or, if desired, the About profile may be far more sophisticated, such as similar in appearance to all or selected portions of a website and may be used to provide extensive reference information useful to the group as a whole.

There is also a selection of whether the group is private, meaning that members must be invited to the group to obtain access to it or, alternatively, that the group is public, meaning the tracked object may be discovered by a system wide search or potentially even by a web search engine. If the tracked object is public, keywords to aid in its discovery by search may be entered in the "keyword" box in FIG. 25. Tapping the "Rules" bar collapses all of the rules into the rules bar (with a reversal of the direction of down arrow in the Rules bar), while tapping again opens the rules page as shown in FIG. 25.

Figure 26:
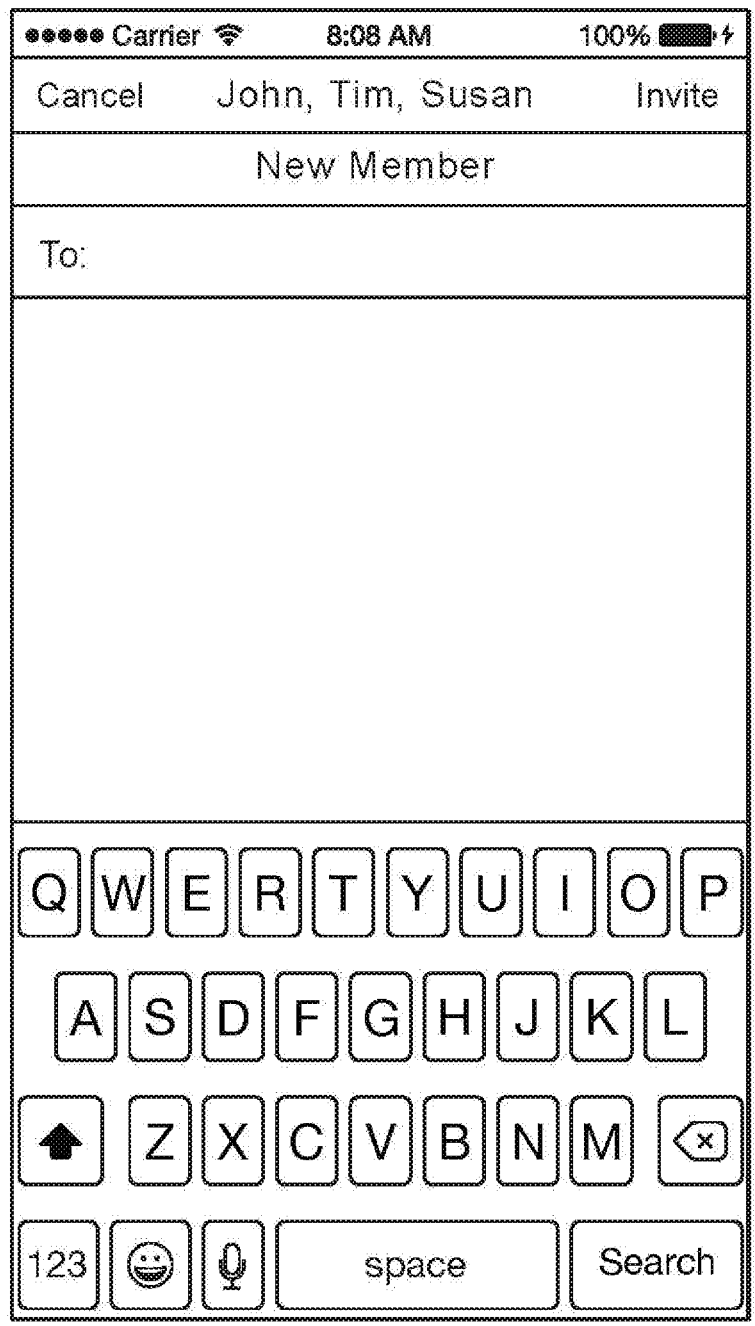
FIG. 26 is a smartphone wireframe diagram depicting an exemplary "add new member" screen accessed by selecting the "+" symbol in the upper right corner of FIG. 21.

Selection of the "+" symbol in the upper right corner of the profiles identifier screen, FIG. 21, takes the user to the FIG. 26 screen. The FIG. 26 screen allows authorized tracked object members to invite others to the tracked object and to accompany the invitation with a message and/or other content, such as photos, videos or the like. If only the creator has such authority, then the "+" symbol will be visible only to the creator in FIG. 21 and not to the other tracked object members. After identifying those new members to be invited to the tracked by naming them in the "To:" line of FIG. 26, selecting "Invite" in the upper right hand corner of FIG. 26 invites those individuals/entities to the tracked object returns the user to the profile page FIG. 21 screen where the user will see the newly added members in addition to those already members of the tracked object. Selecting "Cancel" in the upper left hand corner of the header in FIG. 26 returns the user to the FIG. 21 screen.

Figure 27:
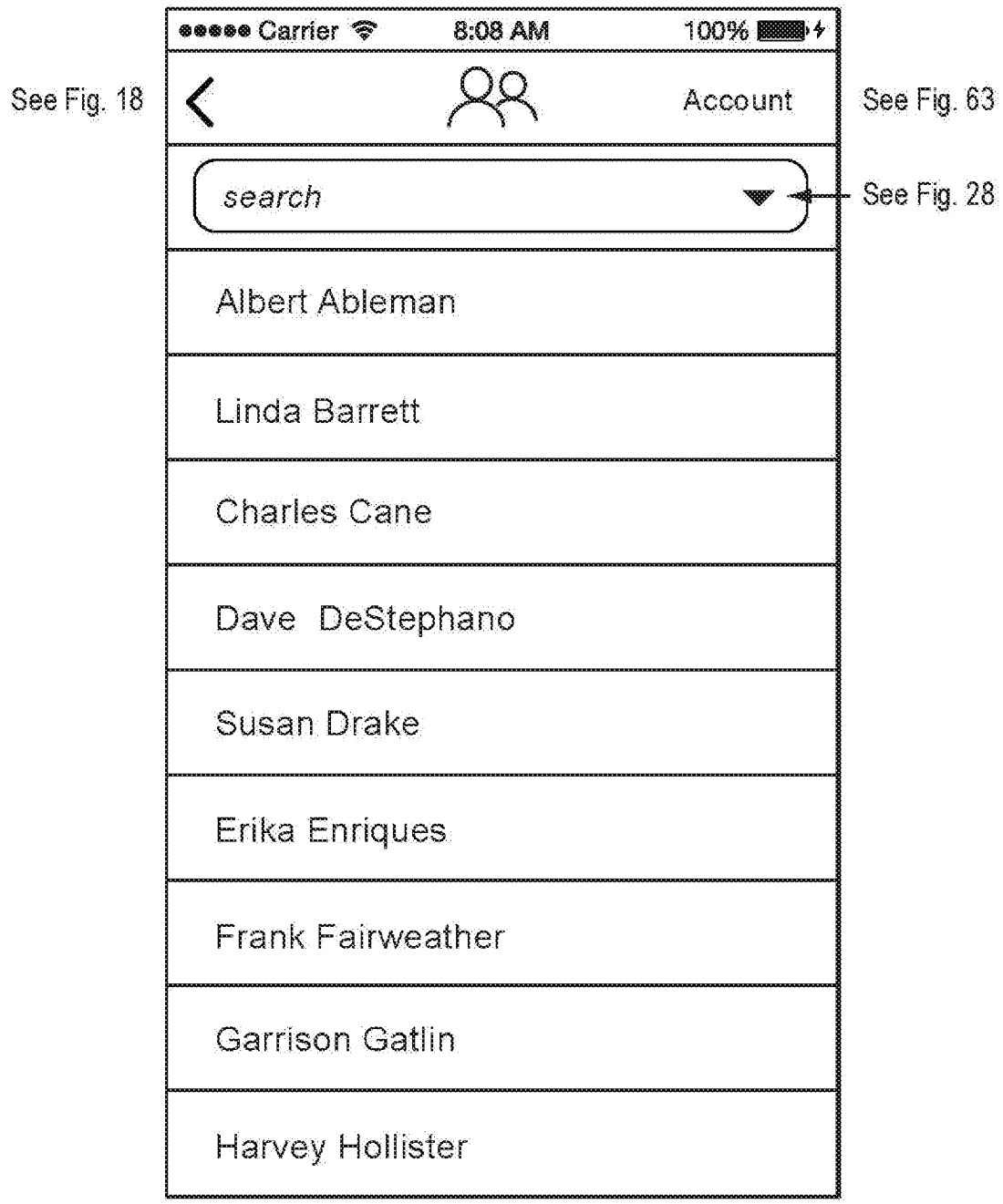
FIG. 27 is a smartphone wireframe diagram depicting an exemplary system level profile directory/search screen accessed by selecting the persons symbol in the upper left-hand corner of the FIG. 18 List screen.

Selection of the persons icon in the left corner of the control bar at the top of the FIG. 18 list screen takes the user to the profiles directory/search screen, FIG. 27. The profile directory of existing "contacts" of the user are presented in a scrollable, alphabetical list as shown and as is familiar to the art. This contact list, as we call it for convenience, may have been composed initially from an historical contact list, and then updated from time to time as persons and entities come and go in life. As will be apparent to those skilled in the art, the "contacts" list in the present context is not a traditional contacts list kept on one's own computer; rather the contacts in the context of the invention are based on data stored at the cloud computing center that maintains the relationships or links between persons in the system. Gesture selection of an individual name opens the profile for that individual or entity, as composed by that person or entity and in a form presented to this particular user. The individual profile identifier blocks may have visual indicia, such as different colored dots or some other indicator denoting the original source of the contact, as earlier described.

Figure 28:
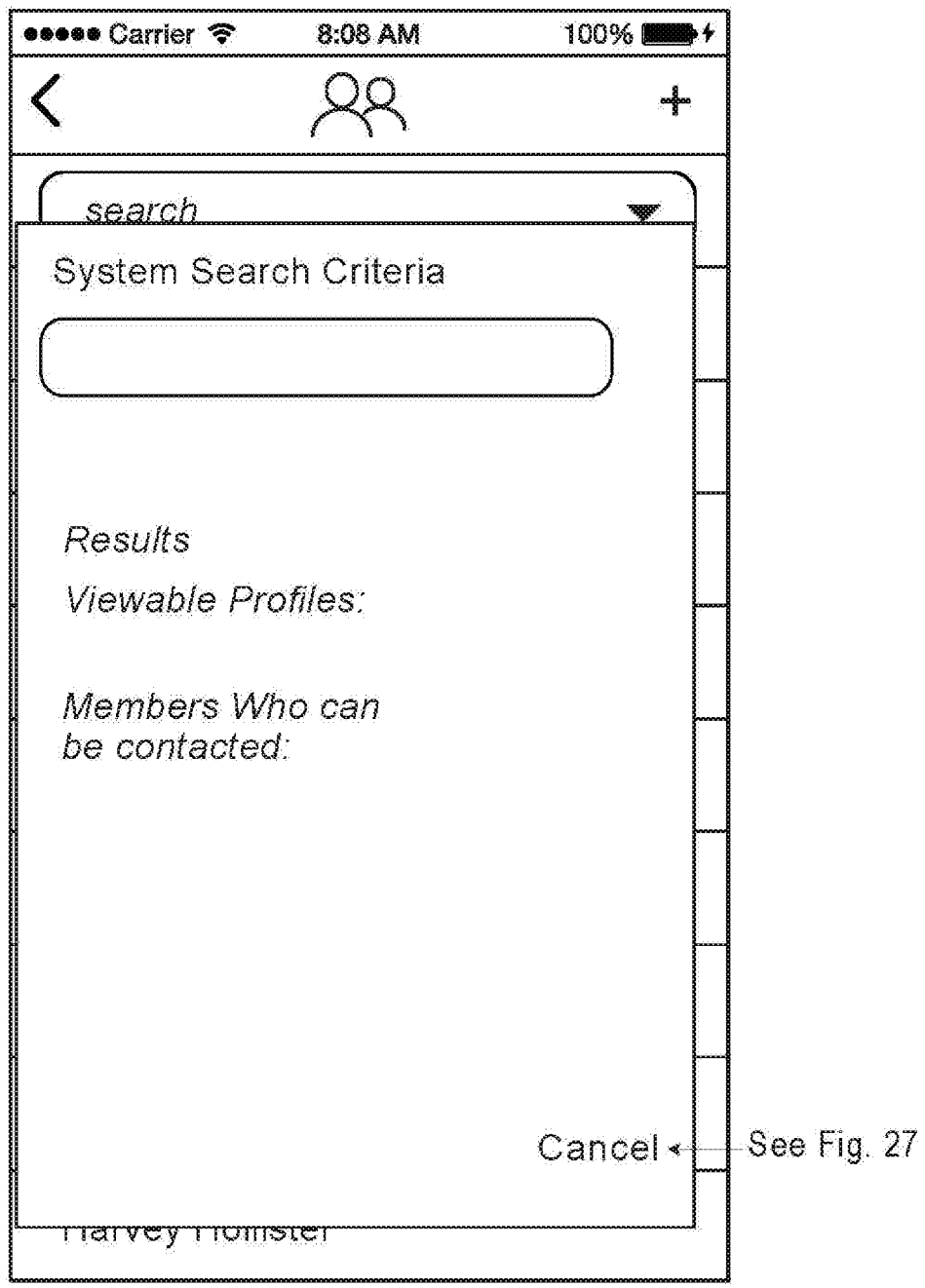
FIG. 28 is a smartphone wireframe diagram depicting a profile search window screen accessed by selecting the down arrow in the search window of the FIG. 27 screen.

Selection of the search box down arrow in FIG. 27 opens the search criteria/search results screen, FIG. 28, which, like the search box in FIG. 18, is for convenience depicted only schematically since search is a common function widely understood by those of ordinary skill in the art. The search criteria/results screen may have many search options, as likewise is well understood in the art. In the present example, profiles may be searched by individual criteria or multiple criteria (by selecting the "+" in the upper right corner of the screen to add criteria). The search may reveal the number of people in the system who have allowed themselves to be discovered by the selected search criteria, members who have selected that they may be contacted by anyone discovering them by a criteria search and those persons, if any, discovered by the search criteria who opted to allow viewing of their profile discovered by the search. The discovered profile may be only one of many profiles a person has created.

Similarly to the search function above described, there is a search function for the list screen FIG. 18. Selection of the down arrow in FIG. 18 opens the list search screen FIG. 29, which allows search of the list screen, and of all public tracked objects, by user selected criteria, for example, keywords. Selection of the word "Cancel" at the bottom right of the FIG. 29 search screen returns the user to the FIG. 18 list screen. Similarly, selection of "Cancel" at the bottom right of the FIG. 28 profiles search screen returns the user to the FIG. 27 profiles directory screen.

Figure 30:
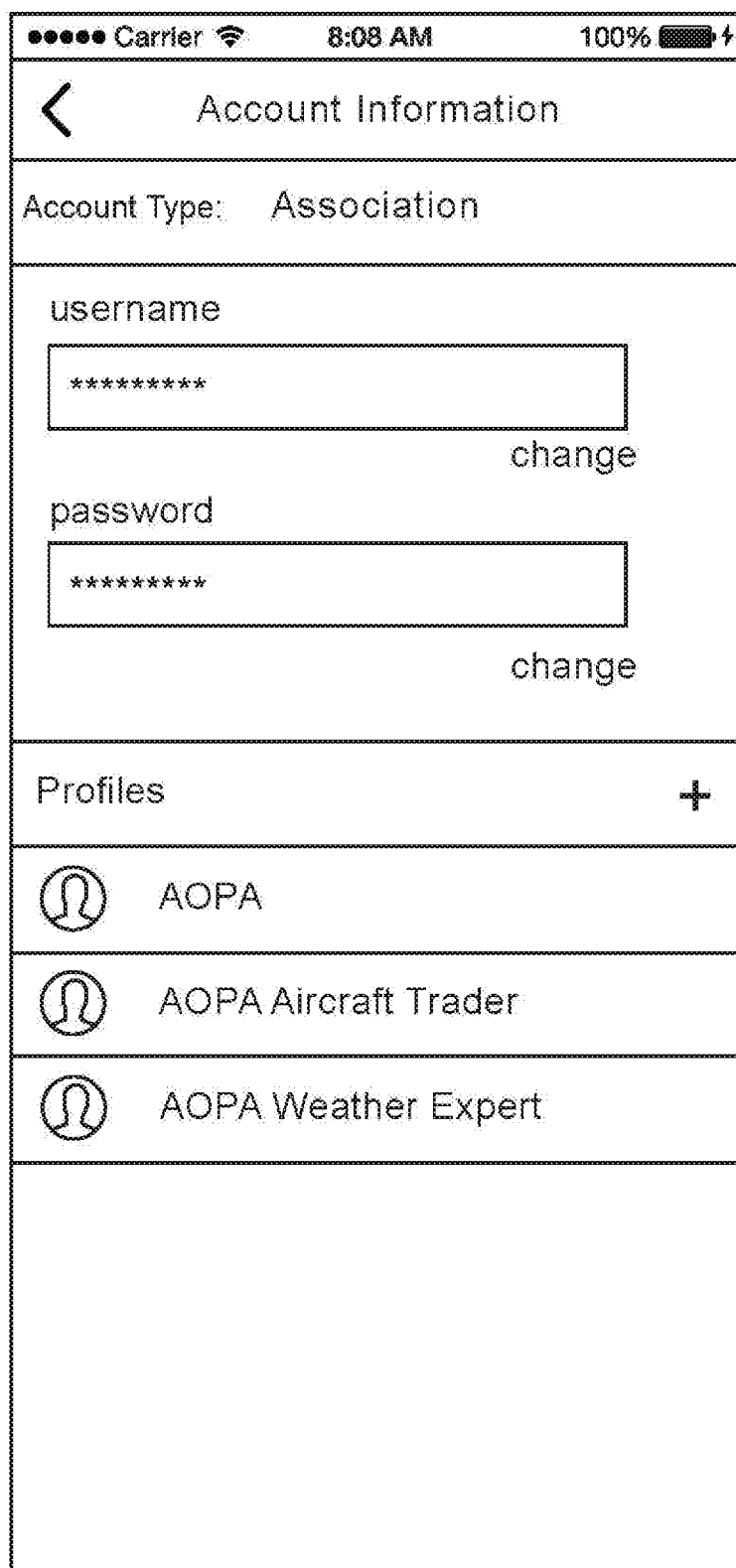
FIG. 30 is a smartphone wireframe diagram depicting an account information/profiles screen (similar in appearance to that of the FIG. 3 personal account information/profiles screen) made available to a user upon selection of the account type "Association" in FIG. 2.

Selection in FIG. 2 of an "Association" account takes the user to FIG. 30. An association is defined as "an organization of people with a common purpose and having a formal structure" or, more broadly, as "a group of people organized for a joint purpose." An "affinity group," that is, "a group of people linked by a common interest or purpose" may or may not have the organization and/or structure characteristic of associations. Affinity groups that are not associations may still find the features of an Association account beneficial to their operations as may some individuals, such as celebrities with large followings.

Associations and other affinity groups, particularly those having significant numbers of participants, tend to have similar problems in the online world that differ materially from those of individuals, which is a reason to establish for associations a different account type with different features than those made available to an individual user. These similar problems, including those of communication to and among members and the maintenance of a sense of community with and among members as a whole and various member subgroups, become progressively more acute as groups become larger, more structured and/or involve dues paying members which expect a high level of service from the association as a justification for paying annual dues. Ever more complex websites and email, often machine generated, are commonly used by associations to maintain contact with and to inform members of association activities. The invention offers a unique and better solution to these and other problems.

The FIG. 30 Association Account set-up screen is shown for simplicity as being similar in appearance to the FIG. 3 screen earlier described for a Personal account. There is a username, password and Profiles header block with a "+" on the right side of the block, the selection of which takes the user to a new Association Profile composition/edit screen, as earlier shown in connection with a Personal Account. Selection of the earlier created association profile block "AOPA" in FIG. 30 takes the user to the AOPA profile composition/edit screen, FIG. 31.

Figure 31:
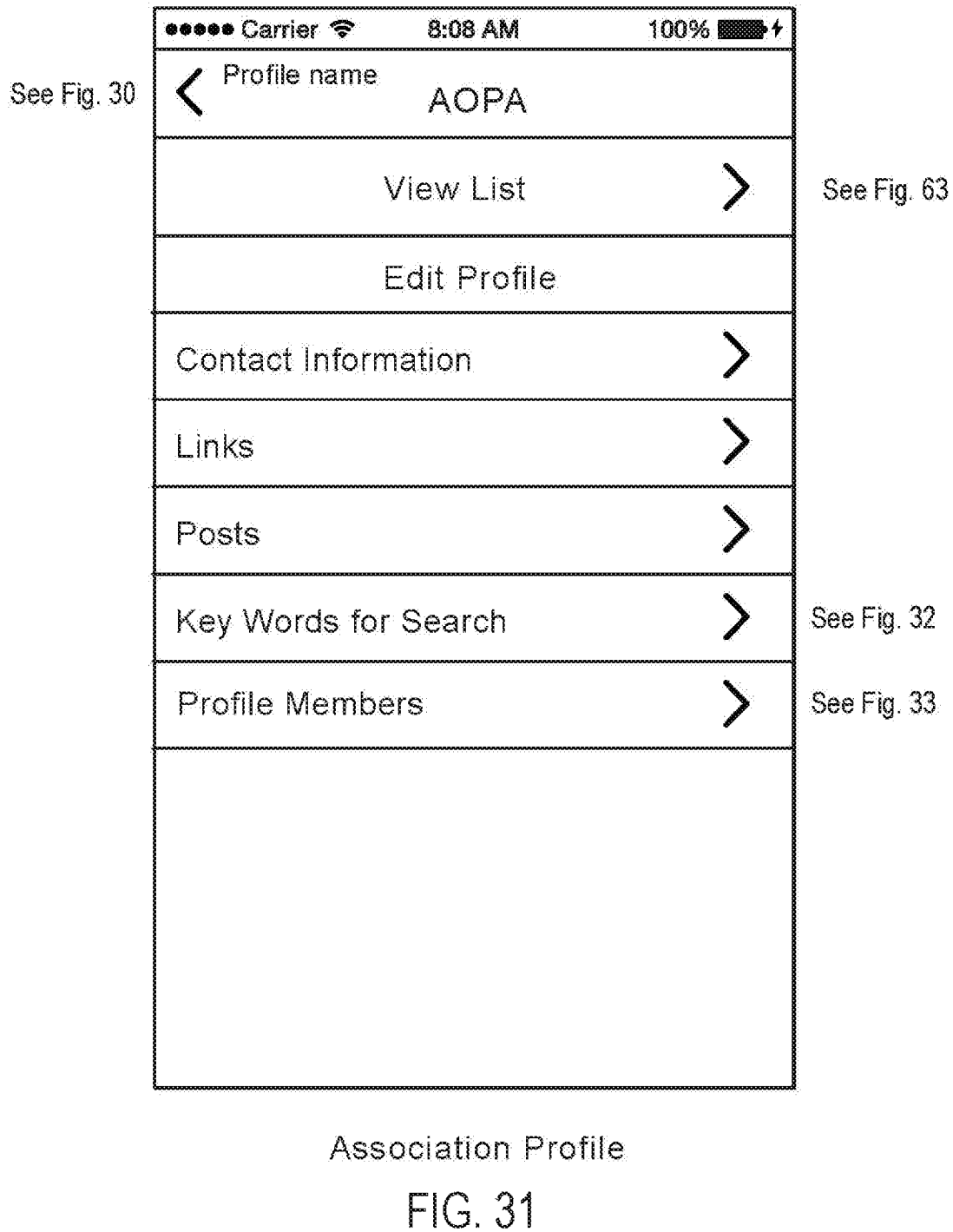
FIG. 31 is a smartphone wireframe diagram depicting an association profile composition/edit screen made available to the user upon selection of the "+" symbol in FIG. 30, the profile in FIG. 31 being named by an acronym that identifies the association.

For convenience and simplicity, the elements of an Association profile are depicted in FIG. 31 as including, like FIG. 4, a profile name (AOPA), contact information, links and posts, although it will be understood that consistent with the present invention an entity profile may, as appropriate, take on far more complexity and sophistication than the profile of an ordinary, individual user. For example, an association profile may include some or all of the elements of an association's website or, alternatively, may include direct links to, or the separate sections of, at least the more frequently visited/most important destinations of the website.

Like an individual account, an association account offers the association the opportunity to reach its members through multiple, different profiles and multiple, different, albeit related, tracked objects with different member groups composed, for example, of subgroups of the overall membership. In FIG. 31, the exemplary profile is that for the "AOPA," that is, the "Aircraft Owners and Pilots Association," an actual dues paying member organization with approximately 400,000 members. Members in such large associations typically have a broad common interest, such as aircraft and flying, but there may be many subgroups within the association that reflect more particularized interests for which the association may have additional profiles, shown, for example, in FIG. 30 as "AOPA Aircraft Trader," here a profile related to the buying and selling of personal aircraft, and "AOPA Weather Expert," a profile of significance to those individuals having a deep interest in aviation weather. Using AOPA as exemplary, there are numerous subgroups, such as pilots that fly certain kinds of aircraft, pilots in particular areas of the country, those pilots interested in weather, those interested in aviation safety, etc. Broadcasts, that is, one-way communication of information from the association to its full membership and/or broadcasts to various member subgroups and as well groups or subgroups which permit member participation/communication among the group members and/or with the association itself are important in the operation of most associations. Of course, in the context of the AOPA and tens of thousands of other associations, like alumni associations, there may be a large number of affinity groups reflecting the many different areas of member interest within the association. Alumni associations, for example, often have subgroups based on class year, course majors like computer science, and many others. Affinity to the association is vastly strengthened by having members personally participating with other association members in areas of common interest. In interacting with and among members of such associations, individual may wish to have one profile for their aviation interests and a materially different profile for their church group, homeowners' association or their college alumni groups. The invention facilitates all aspects of such interaction.

The profiles feature, among other things, also allows the "unpacking" of complex websites into multiple, independent profiles, which are far more easily accessed by association members than is the same information buried in a complex website with multiple, lengthy dropdown menus. The aircraft trader and weather expert profiles in FIG. 30 are examples of taking whole subject areas from a complex website and making the relevant information easily accessible to association members via profiles. Different subject areas are also made available to group members through different, albeit related "tracked objects," as will be explained later herein.

Websites typically include: (a) static, reference information which may not change materially even over a period of years, although additions and revisions may be made to such information from time to time, and (b) dynamic information which may change frequently, like newsworthy items and schedules for upcoming events. In the present invention, such dynamic information may be conveniently placed in the "message" stream while information that tends to be more static may be conveniently placed in profiles, at the discretion of the association. In short, the present invention provides associations and other affinity group organizations/businesses with a versatile platform for conducting its activities/business and interacting with prospective members, members, sponsors and advertisers.

Associations, particularly larger ones, typically have a "back office" for managing interaction with members. The Association account enables the Association profile(s) to be composed and managed by several, even numerous, people who may come and go over time, while the Association continues. Likewise, as above noted, an association may have many different, but related "tracked objects" with home or back office people monitoring/participating in many member streams (reflecting different subgroups within the association) and multiple back office people receiving and responding to stream posts and individual, private messages/inquiries "sent" by association members to the home office. Further, unlike individuals who may conduct most of their online activities via a mobile device, an organization, such as an association or business will usually find it much more convenient to conduct its business via laptop or desktop computers that have a browser or other computer interface presented to the user on a large monitor screen. However, for convenience, all accounts are here shown on a mobile device, although it will be understood that large display laptop, desktop and other large display computers with browsers may be preferable for use in some situations, for example, at the home offices of large organizations, although individual organization, association or affinity group members may find small display mobile devices more convenient. Where the device displays are sufficiently large, such as in large size iPads or the like, or in large display laptop or desktop computers, more than one of the individual screens described herein for displaying tracked objects, profile identifiers, posts, etc. may be simultaneously visible and accessible to the user on the device display. Hence, absent an express limitation to the contrary in the claims that follow this specification, the term "screen" as used herein is meant to embrace invention embodiments where only one screen at a time is visible on, for example, a mobile device having a relatively small display as well as embodiments where more than one "screen" from among those disclosed (e.g., tracked object list screen, profile identifiers screen, posts screen) is concurrently visible to the user, in whole or in part, on the device display. One distinction and advantage of the invention in the context of relatively small screen mobile phones is the highly efficient and full use of available screen "real estate" to display only necessary information on the several screens with easy, intuitive navigation between screens, while eliminating unnecessary, cognitively taxing "message overhead" from all screens.

Figure 32:
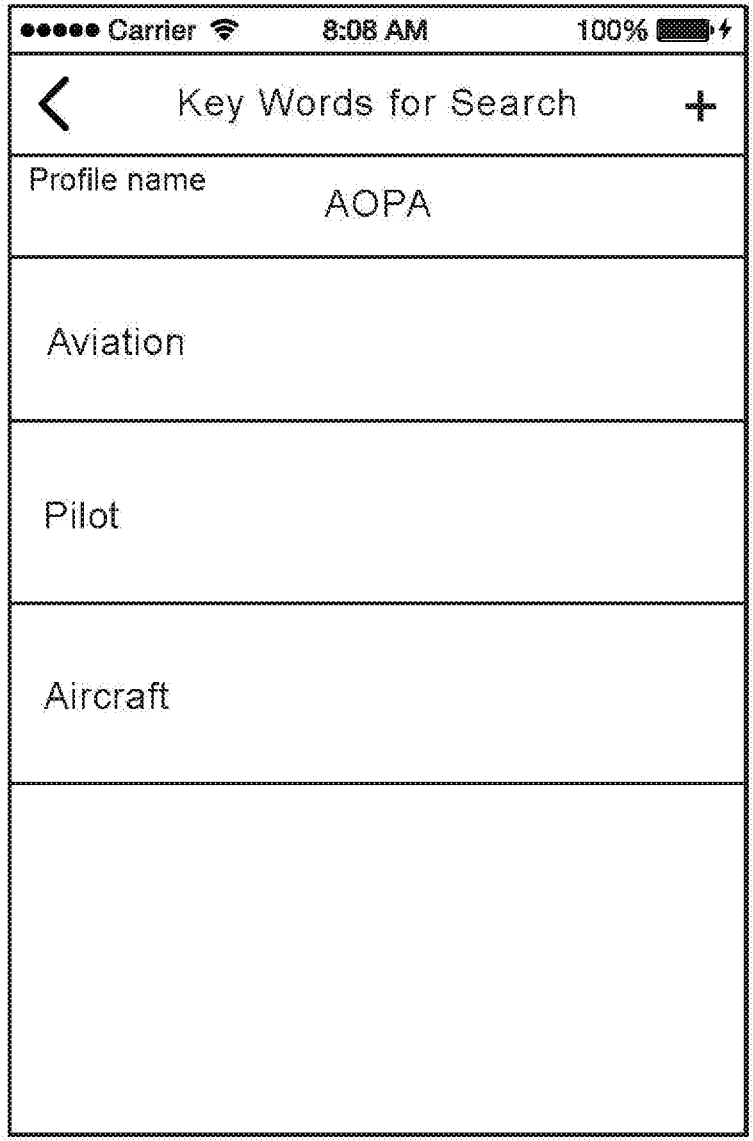
FIG. 32 is a smartphone wireframe diagram depicting an exemplary keyword search screen accessed by selecting the "keywords for search" block in the FIG. 31 screen and in which the user has selected Aviation, Pilot and Aircraft as key search words.

Unlike some individuals who may wish privacy, associations typically wish to be found from publicly available sources, either within the ecosystem of the invention and/or by a "keyword" internet search via a Google search engine or the like. To this end, selection of the block "Keywords for Search" in FIG. 31 takes the user to the FIG. 32 screen, where the desired keywords may be entered, here by way of a simple example, aviation, pilot and aircraft. If someone searches by these keywords, one of the results will be this association. Selection of the back arrow in the upper left corner of the FIG. 32 screen returns the user to the FIG. 31 screen. Likewise the back arrow in the upper left corner of the FIG. 31 screen returns the user to the FIG. 30 screen.

Figure 33:
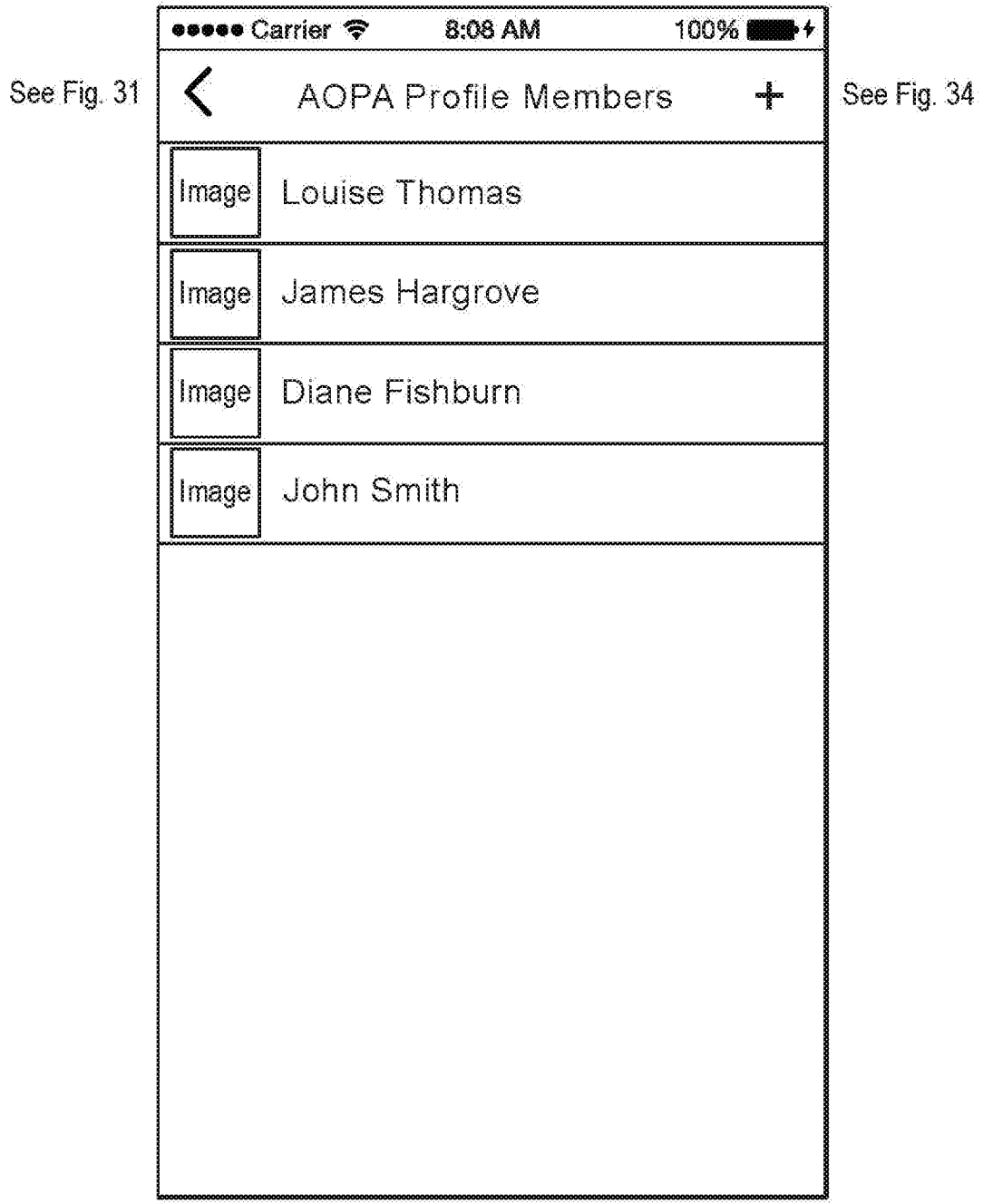
FIG. 33 is a smartphone wireframe diagram depicting an exemplary profile members screen for an association, accessed by selecting the "Profile Members" block in FIG. 31.
Figure 34:
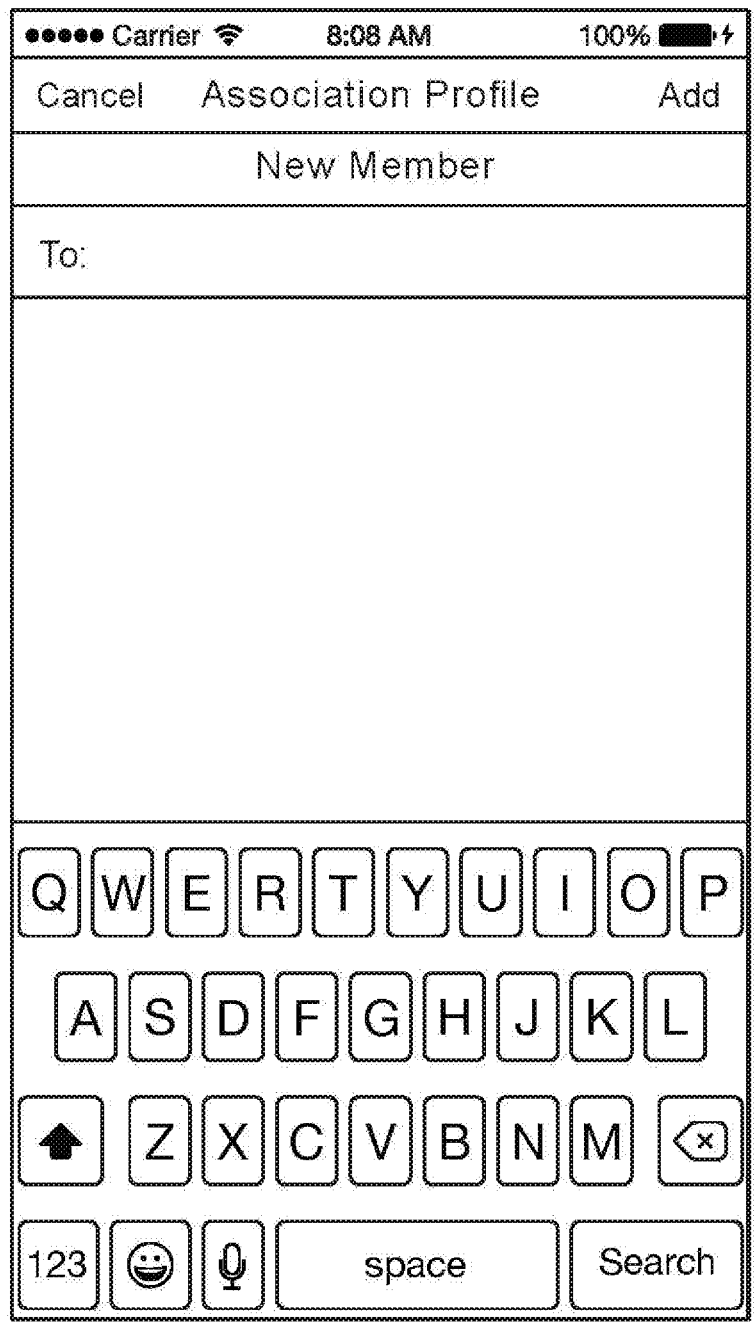
FIG. 34 is a smartphone wireframe diagram depicting a screen for adding a new association profile member, this screen being accessed by selecting the "+" symbol in the upper right-hand corner of FIG. 33.

Selection of the "Profile Members" block in FIG. 31 takes the user to the FIG. 33 screen. Here, whomever is the association profile administrator, that is, the person in charge of association profiles, that is, the person in charge of those people on the staff of the association that are authorized to act on its behalf online in the present invention, may add individuals as AOPA Profile Members by selecting the "+" in the upper right corner of the FIG. 33 header block and then adding the new member information. Such action takes the administrator to the FIG. 34 screen where a new profile member may be added to the AOPA Profile screen by identification of the person on the "to" line and entry of appropriate information about that person in the body of the screen page. FIG. 33 shows, in individually selectable blocks, four people as current members of the association profile with authority to act at least in certain areas on behalf of the association thereby to spread the workload. Each of these individuals is authorized to appear online as the association speaking, rather than as the named individual, although the association may opt to identify the member acting on behalf of the association. Notice that John Smith is both a member of AOPA as shown in his List page FIG. 18 and is an authorized person to act on its behalf via the Association profiles page, FIG. 33.

Figure 35:
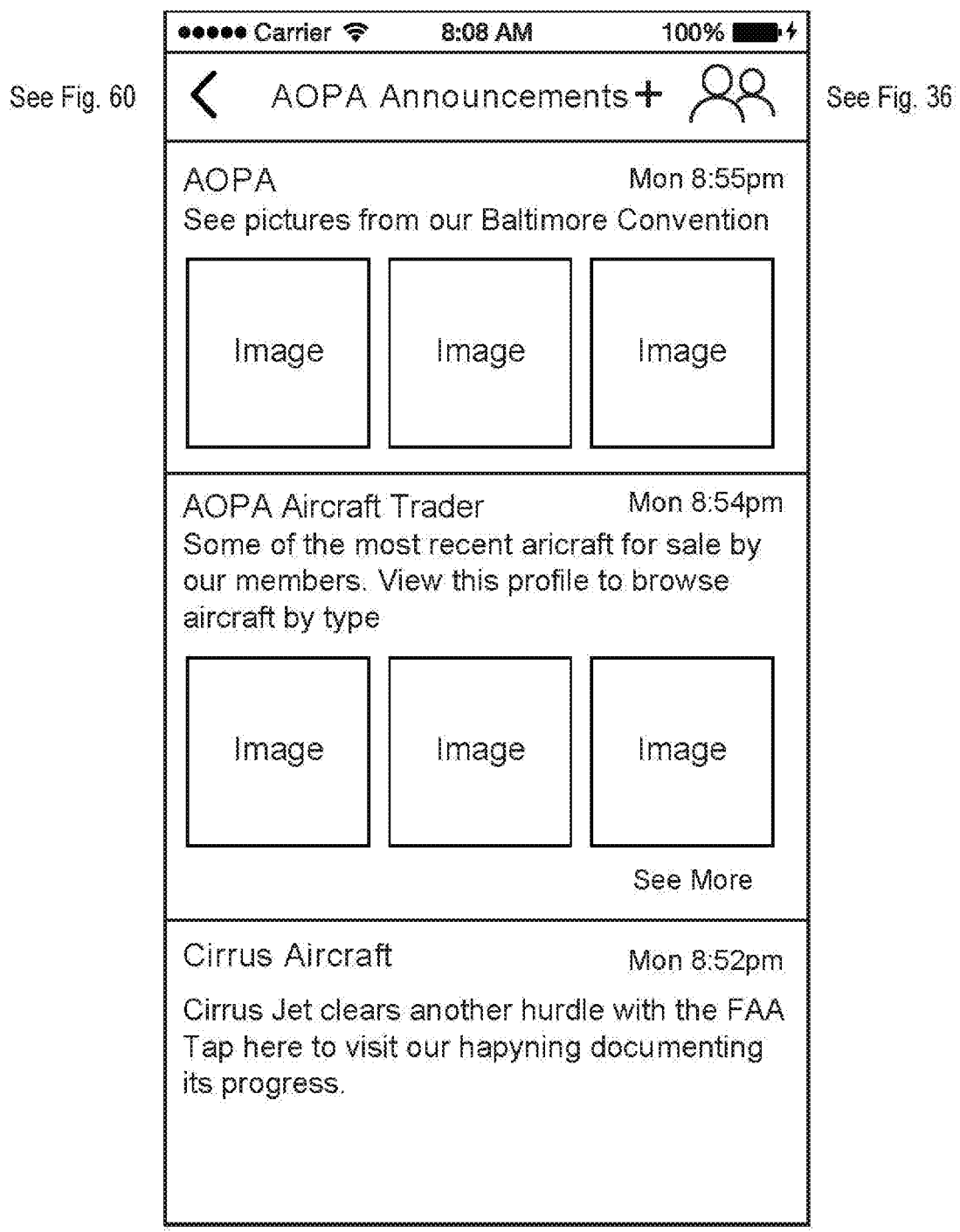
FIG. 35 is a smartphone wireframe diagram depicting an exemplary, scrollable communications or "messaging" screen (called "the stream" in the context of the present invention) accessed by the user selecting the "AOPA Announcements" tracked object bar in FIG. 18.

Selection of individual profile identifiers in FIG. 33 opens the individual profiles of the "backoffice" persons assigned to managing the association profile. These profiles may be composed like, and appear like, profiles of persons in an individual account except here the profiles often are not identified to association members; rather they are only identified internally within the organization to the appropriate association managers, such as the association profile administrator, and therefore would include information about the individuals that is useful for the administrators. In this way, the association profile administrator may delegate portions of the responsibilities associated with updating and maintaining the association profile, and responding to questions/messages to the organization from individual association members, to multiple association staff members. Should one of the Profile Members be fired, resign or be assigned to another job in the organization, that person's profile may be deleted from the association profiles list, by "swiping" it off the list or deleted by some other familiar means, thereby to deny such deleted person continued access to the association backoffice activities. FIG. 35 is an exemplary message stream for the AOPA association, which includes messages from the association itself (AOPA), a subgroup (AOPA Aircraft Trader) and an AOPA sponsor/advertiser (Cirrus Aircraft). The AOPA Announcements tracked object (see FIG. 18—accessed by selection of the back arrow in FIG. 35) may include messages from these various sources. The message stream is accessed by selecting the AOPA Announcements tracked object in FIG. 18, further detail of which tracked object features will be explained later herein in connection with FIG. 60, which shows "nested" AOPA subgroups.

Figure 36:
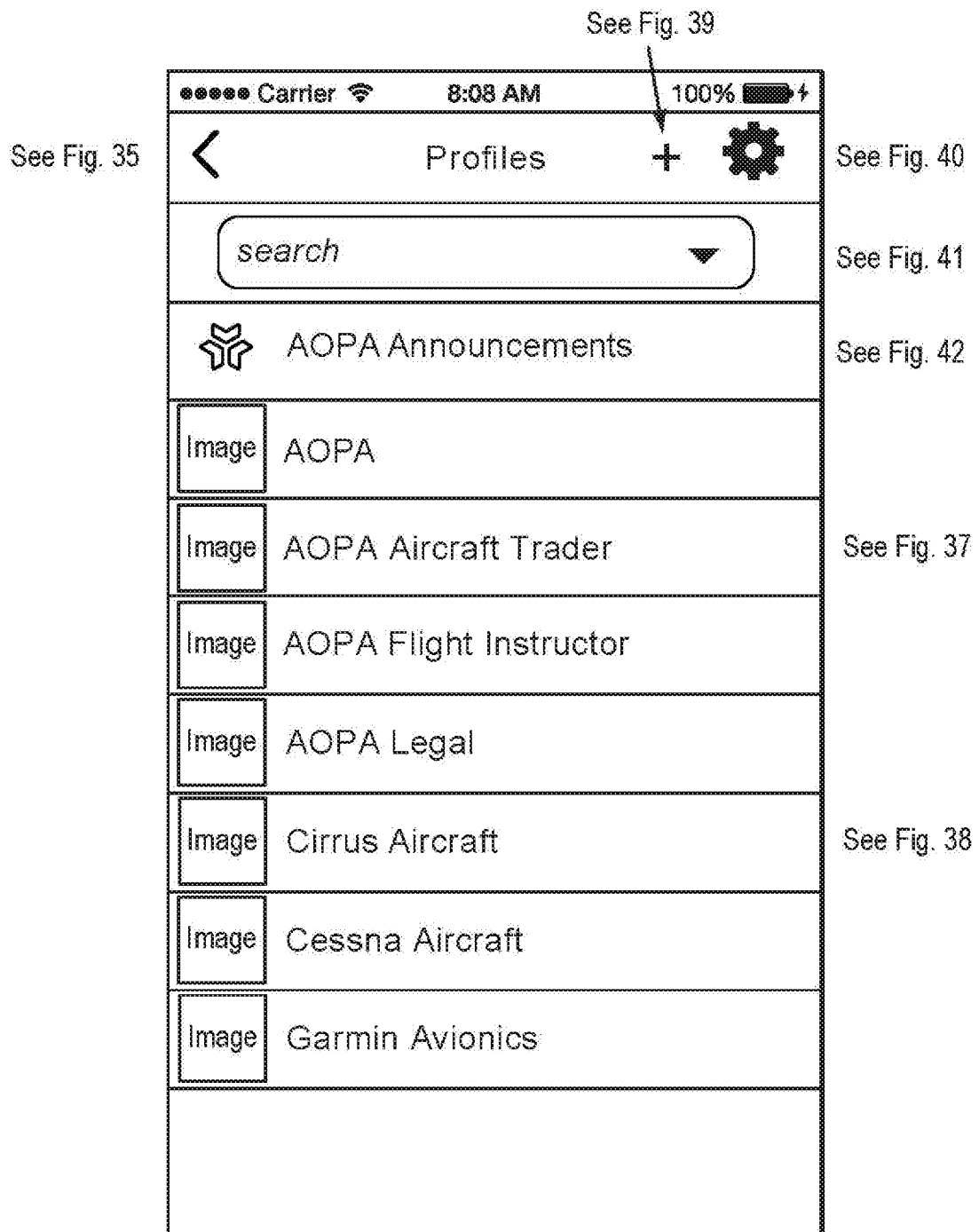
FIG. 36 is a smartphone wireframe diagram depicting a profiles screen for those persons or entities that the association has designated as members of the AOPA Announcements tracked object, this profiles screen being accessed by selecting the persons icon in the upper right hand corner of the association's message stream screen FIG. 35.
Figure 37:
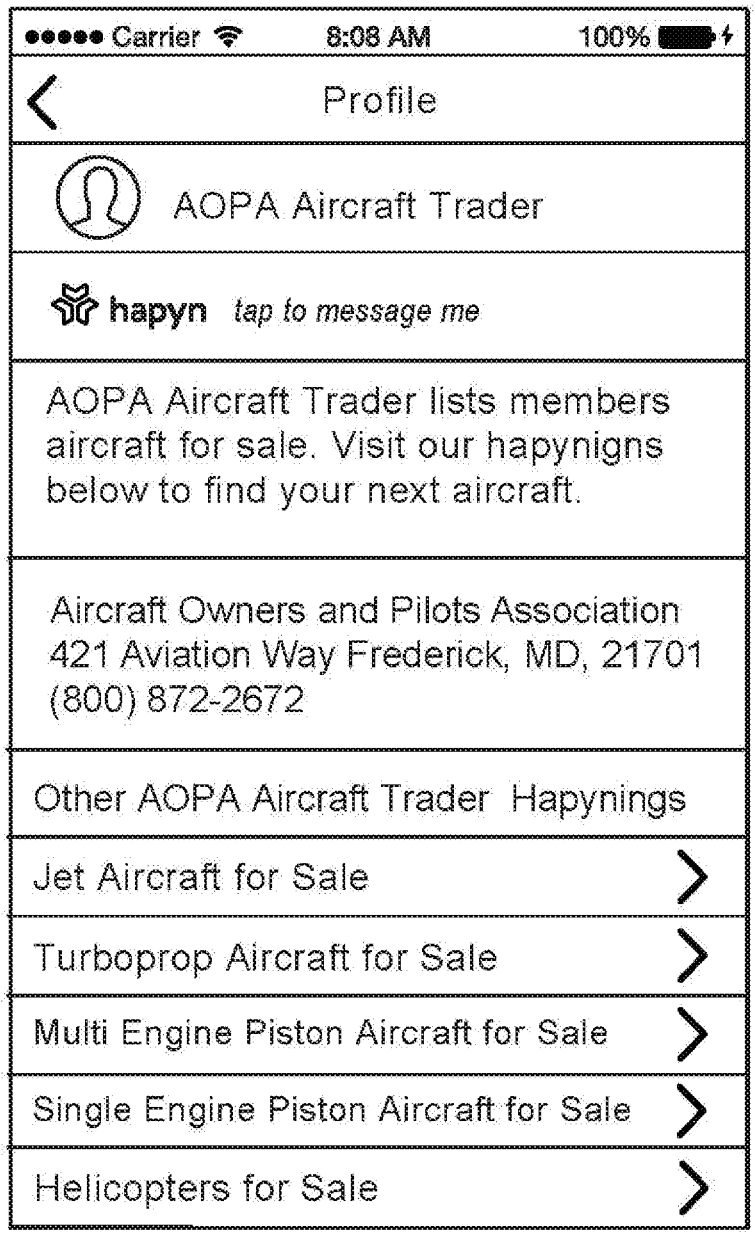
FIG. 37 is a smartphone wireframe diagram depicting the profile for AOPA Aircraft Trader accessed by selecting the like named block in FIG. 36.
Figure 38:
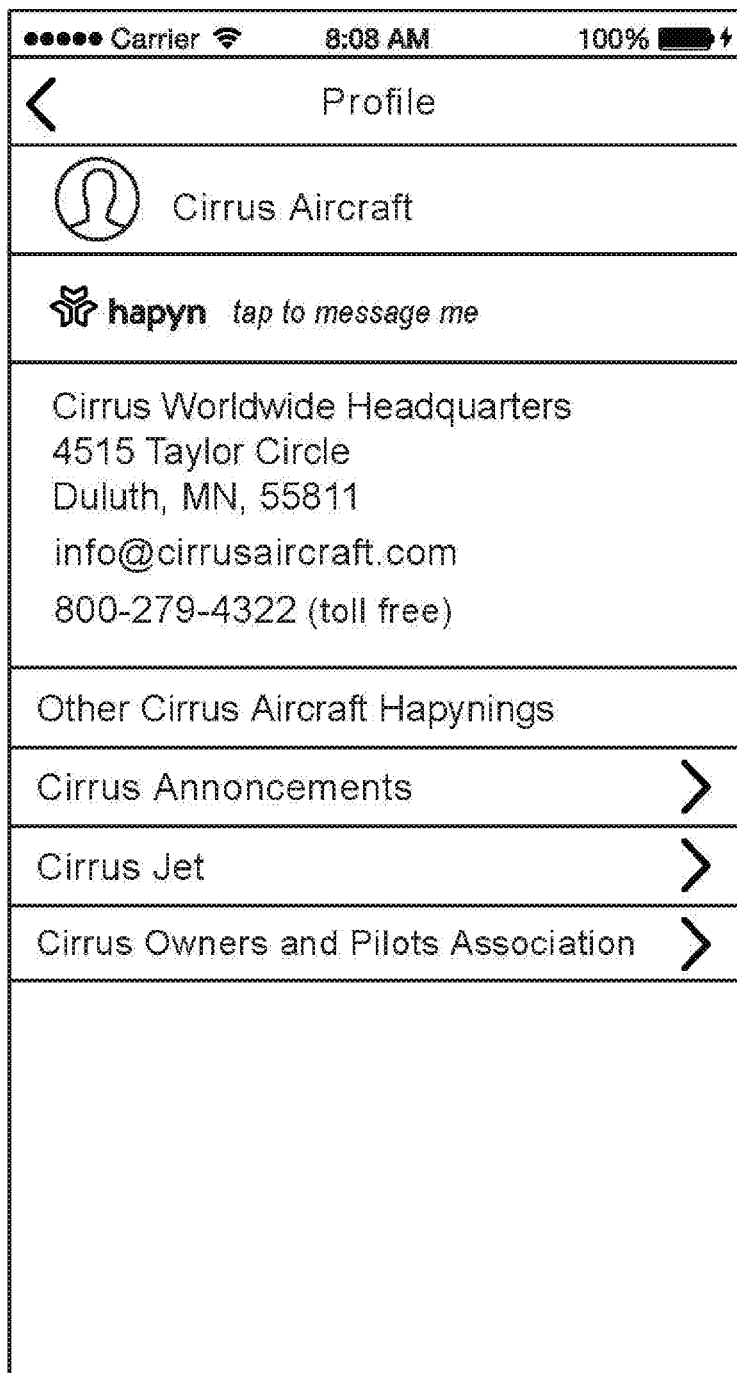
FIG. 38 is a smartphone wireframe diagram depicting the profile for Cirrus Aircraft, a sponsor of the AOPA Announcements tracked object, accessed by selecting the like named block in FIG. 36.

Associations often derive a substantial portion of their operating revenues from advertising, and a lesser fraction of revenues from membership dues or donations. Additionally, associations often wish to provide, as a service to members, access to businesses that are related to, or relevant to, the activities of the association. The profiles screen, FIG. 36, for the tracked object AOPA Announcements is accessed by selecting the persons icon in the upper right corner of the header of the FIG. 35 message screen. In FIG. 36, the tracked object "AOPA Announcements" identifies on the Profile identifiers page, not only the AOPA association profile, but as well the profiles of various AOPA subgroups (i.e., AOPA Aircraft Trader/Flight Instructor/Legal) and various businesses relevant to the activities of the AOPA, here by way of example, Garmin Avionics, Cessna Aircraft and Cirrus Aircraft. Selection of anyone of the listed profile identifiers opens the profile for the named entity, which may be quite extensive as earlier discussed (including the entity website), and may even allow purchases to be made directly from the profile. These profiles may be composed in a manner similar to an individual composing an individual profile as earlier described, but with access to far more advanced resources to give the organization profile a highly sophisticated appearance and a depth of resources not needed by an individual. An exemplary subgroup profile, i.e., AOPA Aircraft Trader, is shown in FIG. 37, which screen is accessed by selecting the like named profile identifier on the FIG. 36 profile identifiers screen. In the FIG. 37 example, the persons at AOPA responsible for this subgroup may be directly messaged by selecting the "tap to message me" block (this sets up a private message tracked object between the user and this subgroup). Successive blocks in the FIG. 37 example describe, respectively, what the purpose of the group, its contact information and other "Hapynings" (trademark), that is, tracked objects associated with the AOPA Aircraft Trader, that is, tracked objects associated with the AOPA Aircraft Trader, specifically the various types of aircraft for sale as shown in FIG. 37. An exemplary sponsor profile for Cirrus Aircraft is depicted in the FIG. 38 screen, which is accessed by selection of the like named block on the profiles identifier screen, FIG. 36. The Cirrus Aircraft sponsor profile includes a private message block, a contact information block and a listing of related tracked objects ("Hapynings"—trademark) of Cirrus Aircraft, each individually accessed by selection of the respective named blocks.

Figure 39:
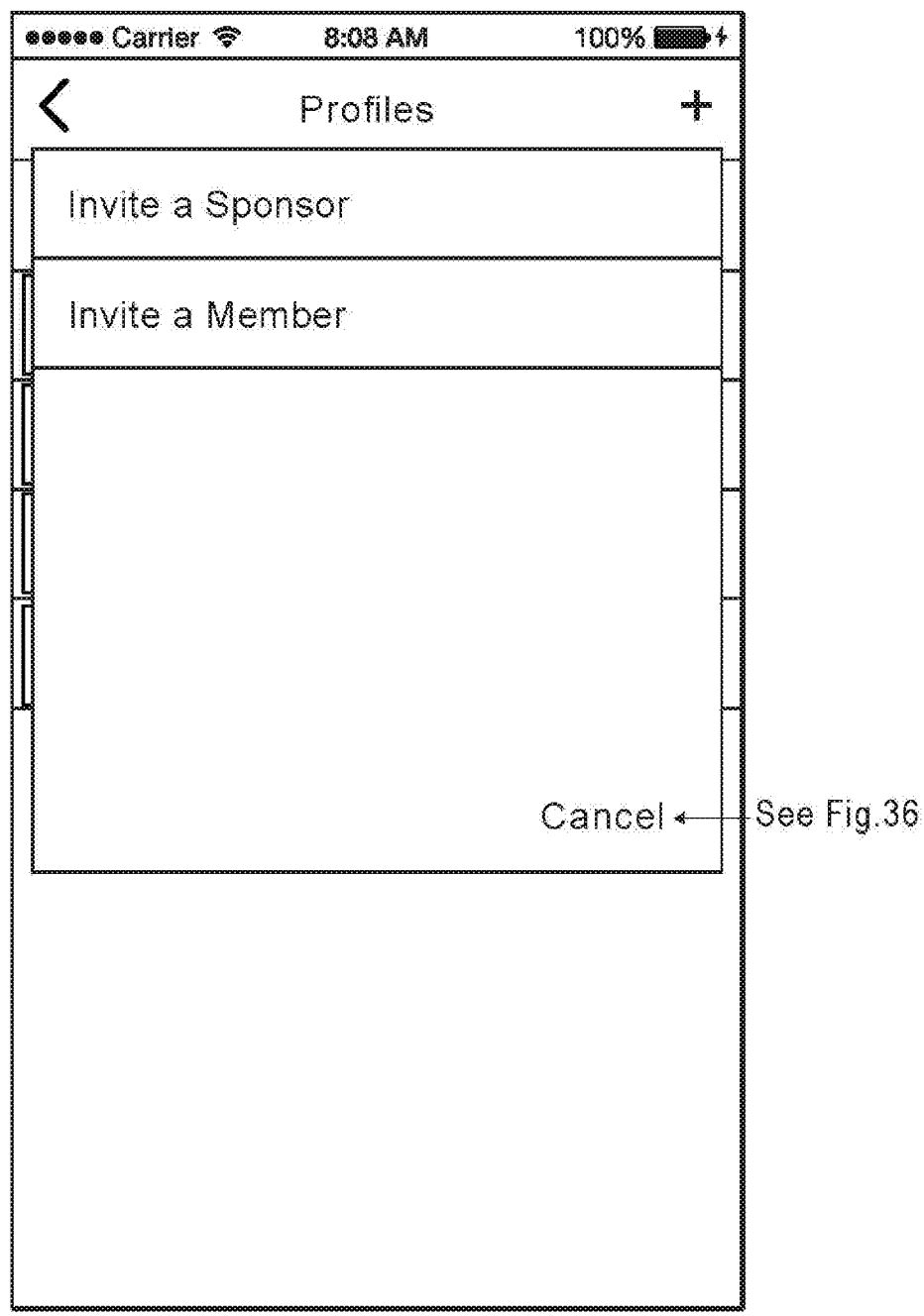
FIG. 39 is a smartphone wireframe diagram depicting a screen enabling the association to invite additional members and sponsors to the AOPA Announcements tracked object, the FIG. 39 screen being accessed by selection of the "+" symbol shown in the header of the FIG. 36 screen.

Further Profiles may be added to the AOPA Announcements tracked object by selecting the "+" in the upper right corner of the header on the FIG. 36 screen. This takes the user to the FIG. 39 screen, where there are shown in separately selectable blocks, "Invite a Sponsor" and "Invite a Member." The businesses on the profile identifier screen, FIG. 36, are considered sponsors since they presumably are paying for the privilege of appearing on the profile page of the AOPA tracked object "AOPA Announcements." Individual or entity members may also be added as appropriate to the profile identifier page, FIG. 36, by selecting the "invite a member" block and identifying the member to be added to the FIG. 39 screen. Individual members added to the FIG. 36 screen also may be officials of the association as opposed to ordinary association members. Selection of "Cancel" in the FIG. 39 screen returns the user to the FIG. 36 profiles screen.

Figure 40:
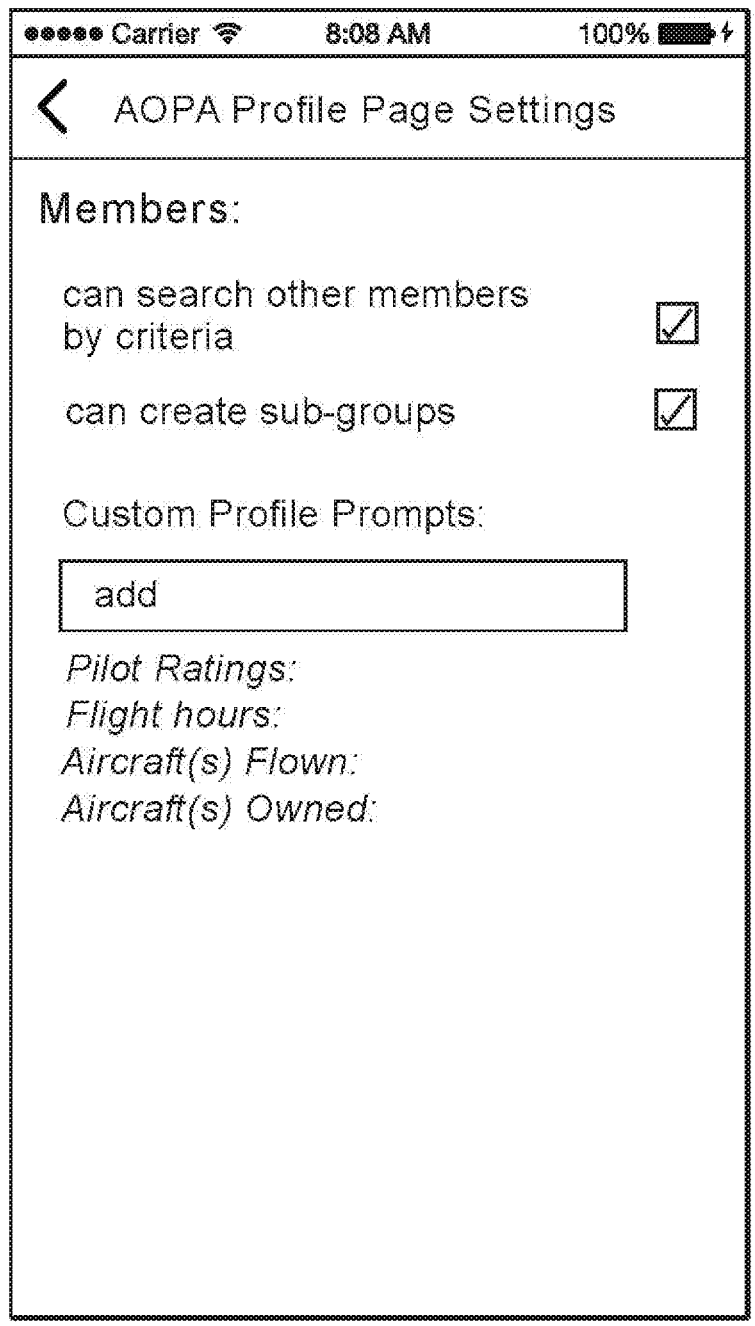
FIG. 40 is a smartphone wireframe diagram depicting an exemplary association profile settings page, the FIG. 40 screen being accessed by selection of the settings gear symbol in the upper right hand corner of the FIG. 36 screen.

Selection of the gear symbol in the upper right hand corner of the FIG. 36 screen opens a profile settings screen, FIG. 40, for the profile identifiers screen. Of course, the gear symbol and the associated screens are visible only to authorized people within the association, and are not visible to ordinary members. The FIG. 40 screen offers the association the opportunity to select among various options to be made available to members—the available options are those granted by the system proprietor. In particular, by checking or not checking certain boxes members either have or do not have certain privileges, such as whether members may search for other members by criteria, e.g. keywords, whether individual members themselves may create subgroups, i.e., their own affinity groups, within the association and whether custom profile prompts or fields may be made available to members when they open a screen to compose their individual profiles, such as fields for pilot ratings, flight hours, aircraft(s) flown and aircraft owned. Provision of such custom fields, if made available for keyword search, make it possible to identify and sort members, or discover members, based on such keyword criteria.

Figure 41:
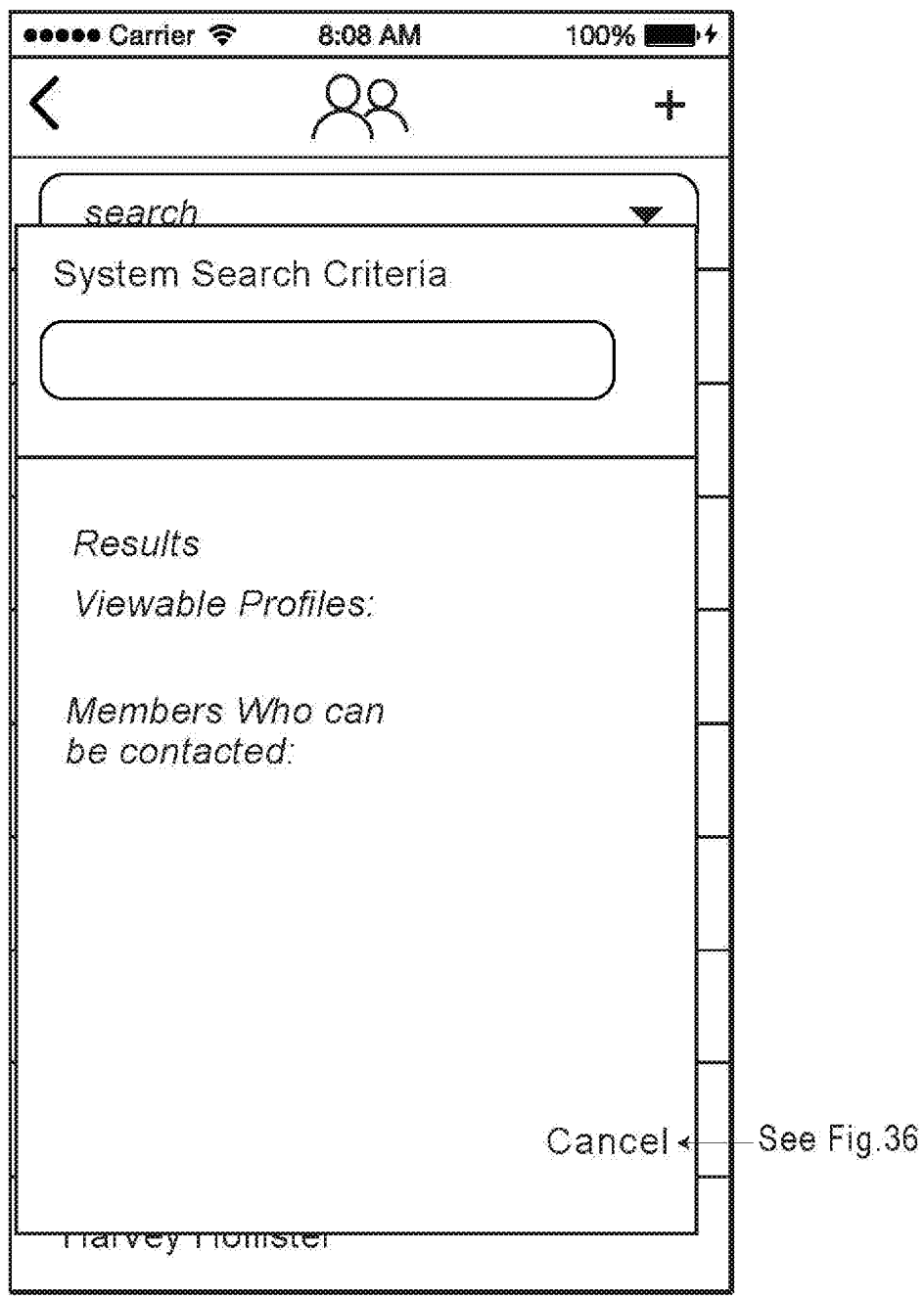
FIG. 41 is a smartphone wireframe diagram depicting a criteria based profile search window accessed in the present example by selecting the down arrow in the search box of the FIG. 36 screen.

A search box may be provided as shown in the FIG. 36 screen to allow individual members to search for other individual members, entity members and/or sponsors or the like. In at least large organizations, it is impractical to list all members on the profile identifiers screen, FIG. 36, so search may be the only practical way of allowing individual members to find the profiles of other members. Selection of the down arrow in the FIG. 36 search box opens a search window, shown by simple example in FIG. 41. The FIG. 41 search box may allow searches by various criteria in a manner well understood in the art. For example, a search may be made of all members by specified criteria, such as all members who have identified themselves as being Cirrus pilots in the Denver area, or a familiar name, like John Smith, may be differentiated from others with a like name by added criteria, such as location. As shown in FIG. 41 some members identified in a search may allow their profiles to be viewed and others not. The total number of members identified in the search appears after the word Results in FIG. 41, while the number allowing their profiles to be viewed follows the phrase "Viewable Profiles." The number may itself be in effect a hot link that opens a listing of the profile identifiers of all members discovered in the search and who have opted to allow their profiles for this organization to be discovered by search. As previously discussed, individuals may elect in their profiles to be not only discovered by a search (either by name or criteria or both), but to allow or not those who discover them in a search to contact them, by name or anonymously, within the system.

Figure 42:
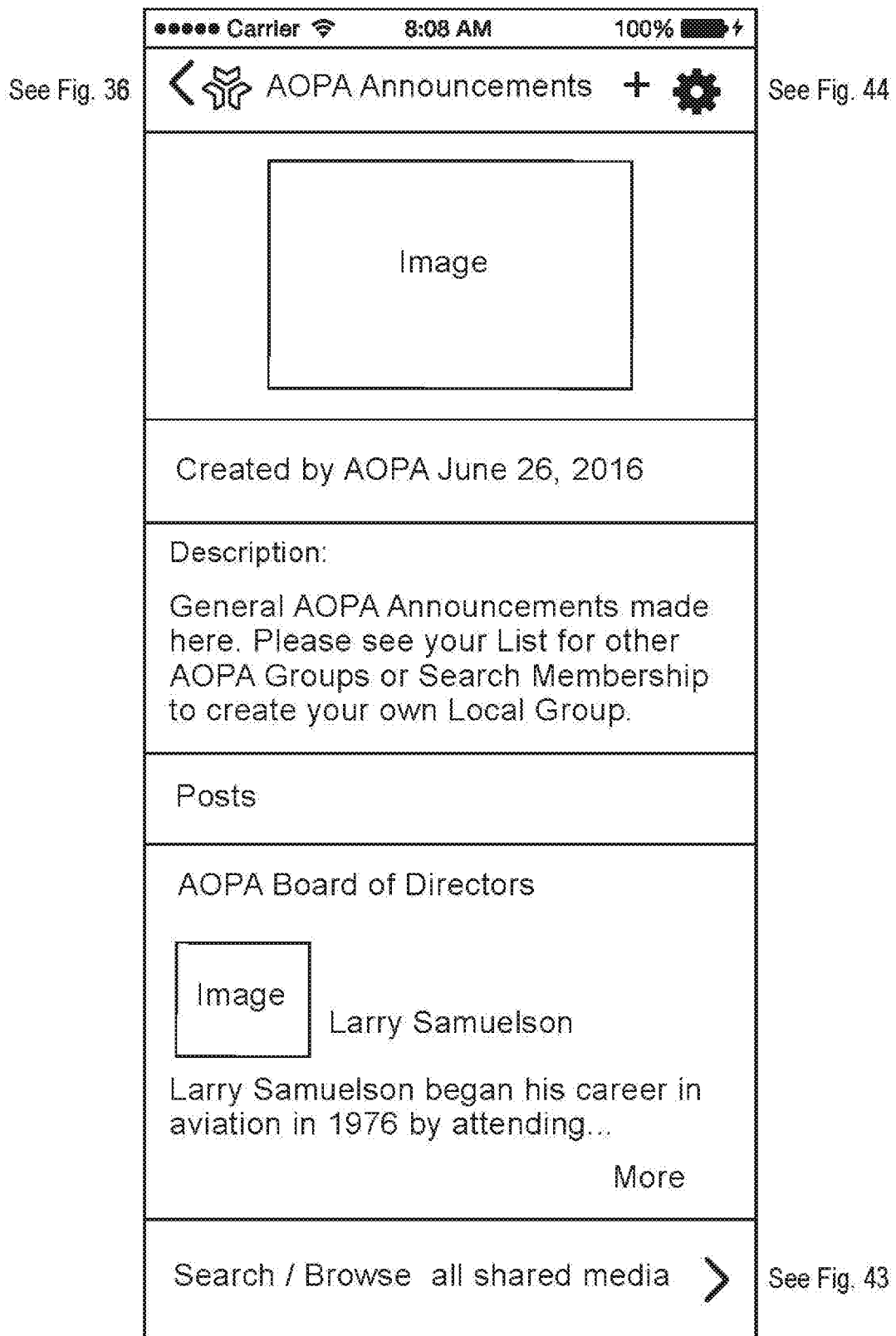
FIG. 42 is a smartphone wireframe diagram depicting an association About profile for the tracked object AOPA Announcements, accessed by selecting the like named About profile identifier (having the associated Hapyn logo) in the screen, FIG. 36.

Selection of the AOPA Announcements block in FIG. 36 opens the About profile, FIG. 42, for this tracked object. As previously discussed in connection with individual profiles, the profiles screen for a tracked object may include not only identifiers for individual members, sponsors and the like, but as well a profile "about" the tracked object. Members may refer to the FIG. 42 "about" profile to gain an overall understanding of the nature and purpose of the tracked object via, by way of example, some header information depicted schematically by the box with the word "Image" inside, who created the about profile and when, a description of the tracked object (General AOPA Announcements, etc.), posts by the association to this about profile, a listing of the members of the Board of Directors of the association, and information or profiles for each Board member. In addition, and as previously discussed for individual accounts, the FIG. 42 about profile may include any of a wide range of shared and/or searchable media including all or substantial portions of the content of the association website. Profiles may be used in any number for anything appropriate to the situation, such as for providing information about businesses, activities, subject areas, "things" and the like, and a single, scrollable profiles identifier page may include separate profiles of many different kinds and types. In other words, the familiar social meme of profiles along with hapynings, i.e., tracked objects, can be used to "unpack" and organize, in a user and mobile friendly way, large amounts of information. Currently many websites use a top down hierarchical organizational structure, which presents users with varying layouts and multiple levels of drill down which are often not clear and which results in reduced user engagement.

Furthermore, these hierarchical organizational schemes and their subsequent implementation usually require professional developers or website creators, whereas by using the familiar social elements as described, the system allows organization and publication of large and complex amounts of content by those with no training whatsoever beyond familiarity with social media memes.

Figure 43:
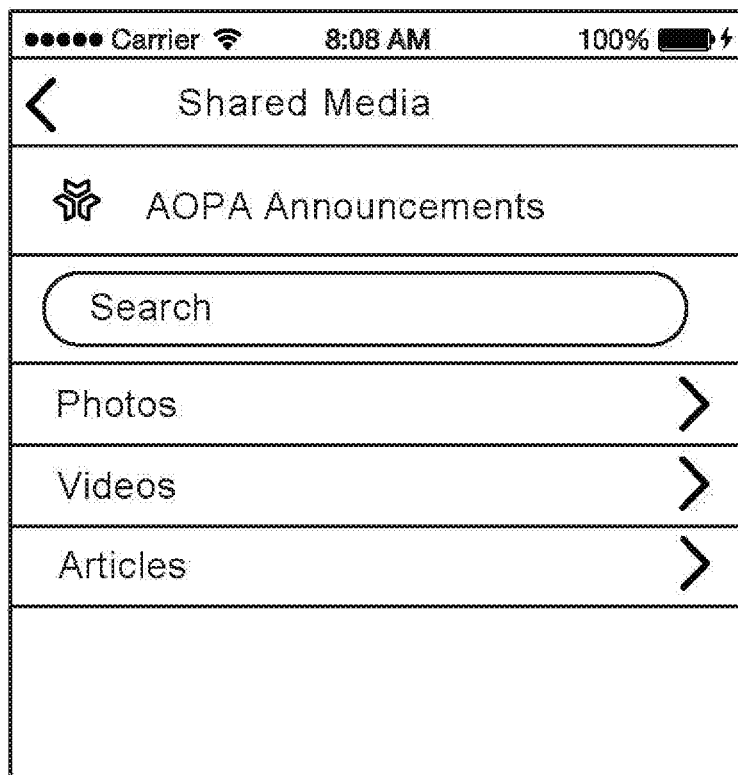
FIG. 43 is an exemplary smartphone wireframe diagram depicting an AOPA Announcements shared media screen accessed by selecting the block "Search/Browse all shared media" in FIG. 42.

The gear symbol in the upper right hand corner of the FIG. 42 screen is only visible to authorized representatives of the association, and is not visible to ordinary association members. Selection of the gear symbol opens the FIG. 44 screen which allows the association to select various rules and permissions applicable to the profile of this specific tracked object, AOPA Announcements. These rules may include such things as whether or not within the tracked object member profiles are visible or not visible, whether all members may post in the tracked object stream or only the tracked object creator is permitted to make such posts, whether all tracked object members may invite others to the tracked object or only the tracked object creator may invite others to the tracked object. If only the tracked object creator may post, this is a way for the creator to "broadcast" information to affinity group members as a one-way communication uncluttered by other member posts; this is often a preferred form of communication for large affinity groups, such as associations with hundreds or thousands of members. On the other hand, smaller sub-groups within an association or the like may allow some or all members to post messages, that is, to communicate with one another and join in the group conversation. Associations in particular rely on the social interaction of smaller, special interest affinity groups to establish strong bonds with the association. The FIG. 44 profile setting screen also gives the association the prerogative of making the particular tracked object private, that is, only the tracked object creator and other authorized persons, if any, may invite new members to the tracked object and the content of the tracked object is only accessible to those who are invited. Alternatively, by checking the public box, the tracked object may be made public, meaning it is discoverable by keyword search or other criteria within the ecosystem and/or by search through a public search engine. Keywords for public discovery in the FIG. 44 example are depicted as aviation, aircraft and pilots. If the profile has substantial shared media, then selection of the "Search/Browse all shared media" block may open a screen, FIG. 43, enabling a user to, for example, selectively look at photos, videos and articles by selecting the like named block or search for specific information by entering keywords in the FIG. 43 search window.

Figure 45:
FIG. 45 is a smartphone wireframe diagram depicting an account information/business profiles screen made available to a user upon selection of the account type "Business" in FIG. 2.

Selection of a "Business" account in the FIG. 2 new account screen takes the user to a business account setup screen depicted in FIG. 45. The FIG. 45 Business Account setup screen is shown for simplicity as being similar in appearance to the setup screen, FIG. 3, for a Personal Account as earlier described, although it will be recognized that business, association and enterprise accounts (the latter presently to be described) may have materially different Account Information screens reflective of the differences between the inherent nature and needs of the respective kinds of accounts. The centralized, cloud based information storage and control structure of the invention facilitates great flexibility in terms of the number and kinds of accounts, and the features, rules and permissions for the different accounts since the setup and all controlling functions are done at the cloud computing center, rather than at the individual devices within the ecosystem. In FIG. 45, there is shown a username, password and Profiles header block with a "+" in the right hand corner, the selection of which takes the user to a business Profile composition page or screen which may be generally similar to those profile composition/edit screens previously described for personal and association accounts and hence is not here depicted by a separate figure.

Like an association account, and similar to a personal account, a business account offers a business the opportunity to reach its customers/clients through multiple, different profiles. In FIG. 45, one of the three named, exemplary profiles is that for "Christina's Clothing," presumably a profile providing an overview of the women's apparel sold by Christina's Boutique, a tracked object among those listed on the list screen of FIG. 18. The other two, exemplary profiles are for "Christina's Clearance" and Christina's Shoes," thereby enabling prospective customers to focus on precisely the product categories of interest to them and to allow various profiles, perhaps managed by different employees, to create multiple tracked objects via those profiles. For example, the Christina's Shoes profile might create tracked objects for "Sandals," "Boots," and "High Heels.". It will be recognized by those skilled in the art that the small business here described is typical of tens of thousands of small, medium and even large businesses in terms of the utility of the invention with respect to such businesses.

In the present example, the business has not only established a lead profile, Christina's Clothing, but has additionally added two other profiles named, respectively "Christina's Clearance" and "Christina's Shoes." These separate profiles denote the specific different kinds or character of goods to be found at Christina's upon opening of these profiles by selection of the associated block in FIG. 45. As with associations, profiles (and the creation of related tracked objects) for businesses may be used to "unpack" a website (or take the place of a business website) into a series of separate subject or product areas that are simply and clearly identified to a user by a named profile identifier or tracked object name. This obviates the inconvenience of having to visit a website and probe various menu options to find a product/service area of interest. Imposing such a burden on a customer is often enough to cause a customer to not visit the website and thus not make a purchase that otherwise would be made, if a more convenient option was offered, as here provided by the invention. Another way to "unpack" a website, or otherwise provide a further degree of freedom in design for tracked object creators, is to create related tracked objects. As stated earlier, the described system empowers individuals without web building skills to create these interrelated groups and profiles and to distribute the work of doing so amongst many individuals.

Individual employees or managers at the store may add new items to each of the profiles by, for example, taking photos of the items directly from a mobile device and composing/posting related text. Unavailable or sold out items may be removed by a simple swipe of the entry from the profile page, in a manner as earlier described for personal and association accounts. Of course, there may be many such profiles for a business thereby to allow prospective customers to easily and quickly identify areas of product/service interest, review the available goods/services and as appropriate to make a purchase directly within the screen showing the article to be purchased. Also, the responsibility of keeping the profiles current may be divided amongst various employees simply by giving specified persons the authority to make profile changes. Further, the various business profiles may create other tracked objects. For example, the profile Christina's shoes may create tracked objects for boots, slippers, dress shoes, and so on. The message streams of those tracked objects would then be populated by posts reflecting only that topic (e.g., boots). This demonstrates how very large and diverse websites may be "unpacked" using multiple profiles and multiple, related tracked objects in a way that is more mobile friendly and intuitive to discover and navigate than a conventional website and as well how the jobs of creating and maintaining the content may be easily distributed amongst employees by assigning them to various profiles as described earlier in the association profile example.

Figure 46:
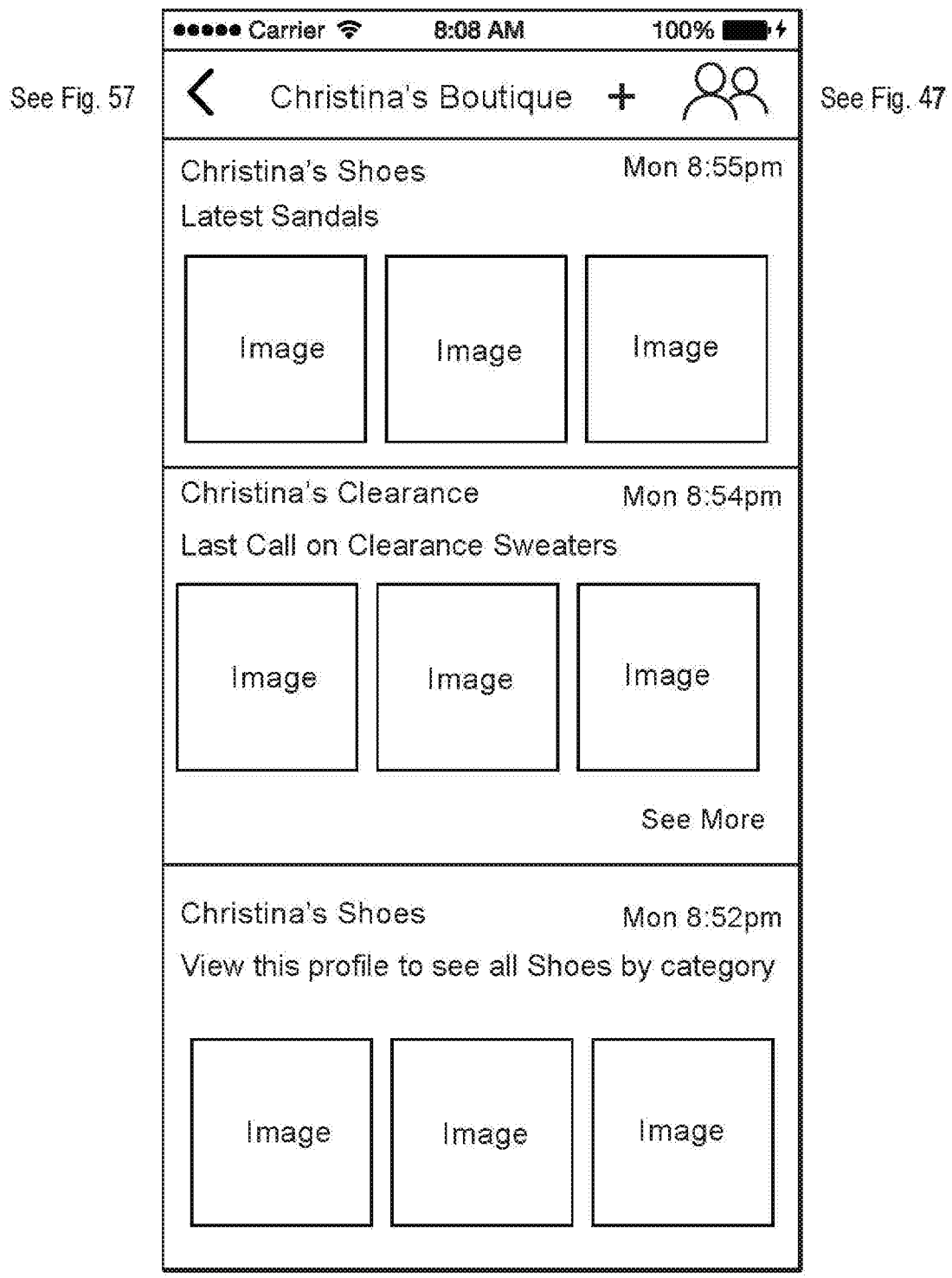
FIG. 46 is a smartphone wireframe diagram depicting the message posting stream for Christina's Boutique, accessed by selecting the like named tracked object block in FIG. 18.

FIG. 46 depicts the stream page for the business which was named "Christina's Boutique" at the time this tracked object was created by the store owner or manager. Tracked objects for businesses may be created and handled in a manner similar to that earlier described for personal accounts so the various personal account screens earlier described are not repeated here for a business. Christina's Boutique is among those tracked objects shown on the mobile device list screen, FIG. 18.

The FIG. 46 stream as shown has a series of individual posts created in a manner similar to those earlier described for the stream in a personal account and having the various features earlier described, such as a standard cell size that is expandable and the absence from the stream of message overhead. In the context of a business, authorized employees may make timely posts informing customers of what is new, what is on sale, what is on clearance and so on. Individuals who are members of the business tracked object may easily follow all such activity in the business stream and may find additional information in the business profiles, all quickly and easily on a mobile device.

The invention eliminates the need to send prospective customers annoying machine generated emails and eliminates the need for customers to visit websites. The invention further eliminates the time, effort and expense to setup and maintain an interactive website, burdens that often are beyond the capabilities of businesses of modest size. The invention enables businesses and associations to easily distribute the work of creating, maintaining and monitoring many tracked objects with many members or viewers amongst employees, to monitor their work on behalf of the organization, and to remove and replace employees as necessary. The invention enables businesses to make as many posts as they desire without the risk of customers becoming annoyed or unsubscribing, as is frequently the case, when associations or businesses send more frequent machine generated emails than individuals are willing to accept or tolerate. The invention also enables members of associations and customers/clients of businesses to easily access all information relevant to an association or business directly from a mobile phone or other device, and when desired by the individual as opposed to an individual being required to receive frequent, shotgun emails from a multitude of organizations in a time organized, rather than subject organized format.

Figure 47:
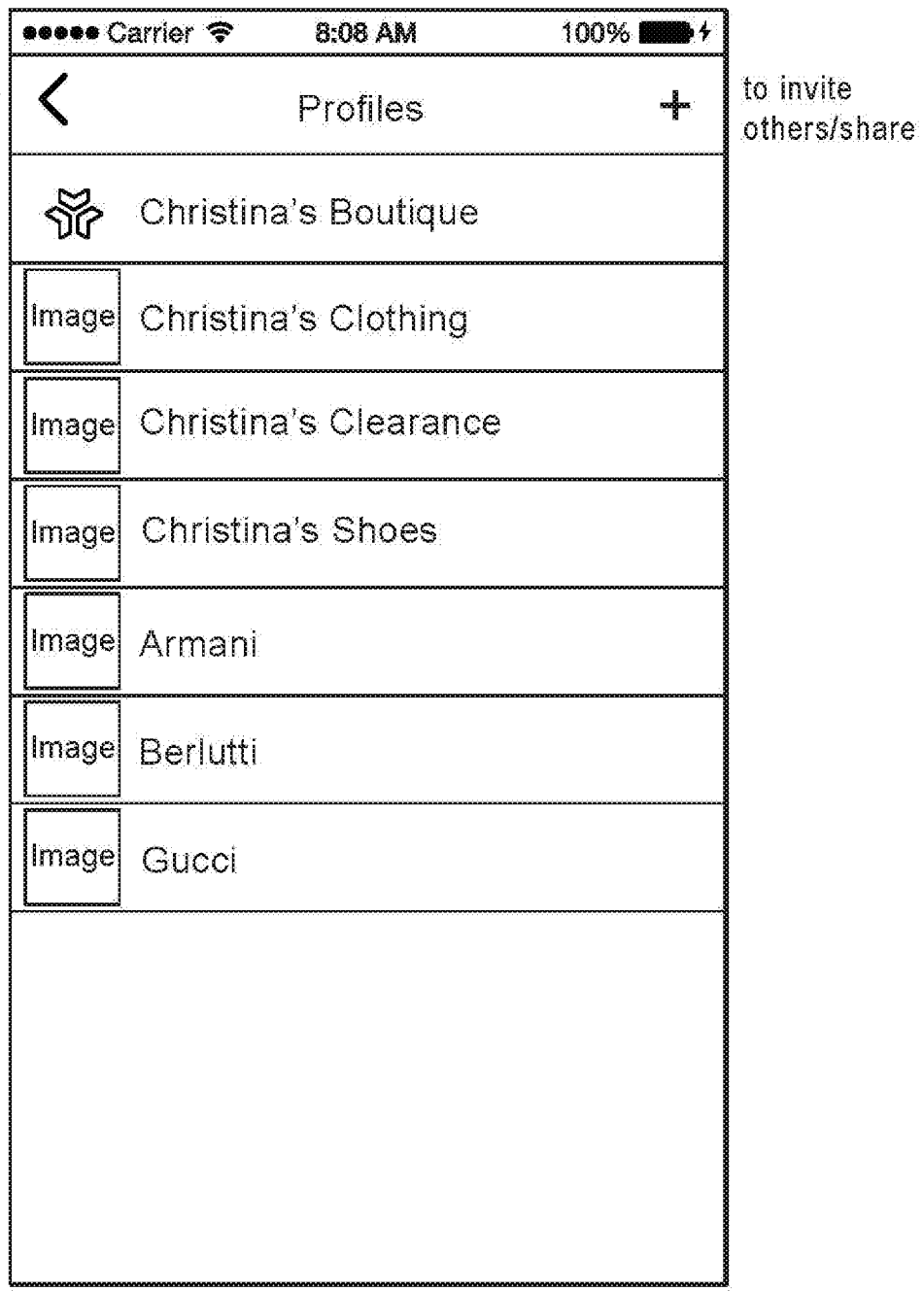
FIG. 47 is a smartphone wireframe diagram depicting an exemplary profile identifiers screen for the tracked object Christina's Boutique, the FIG. 47 screen being accessed by selection of the persons symbol in the upper right corner of the header in the FIG. 46 screen.
Figure 57:
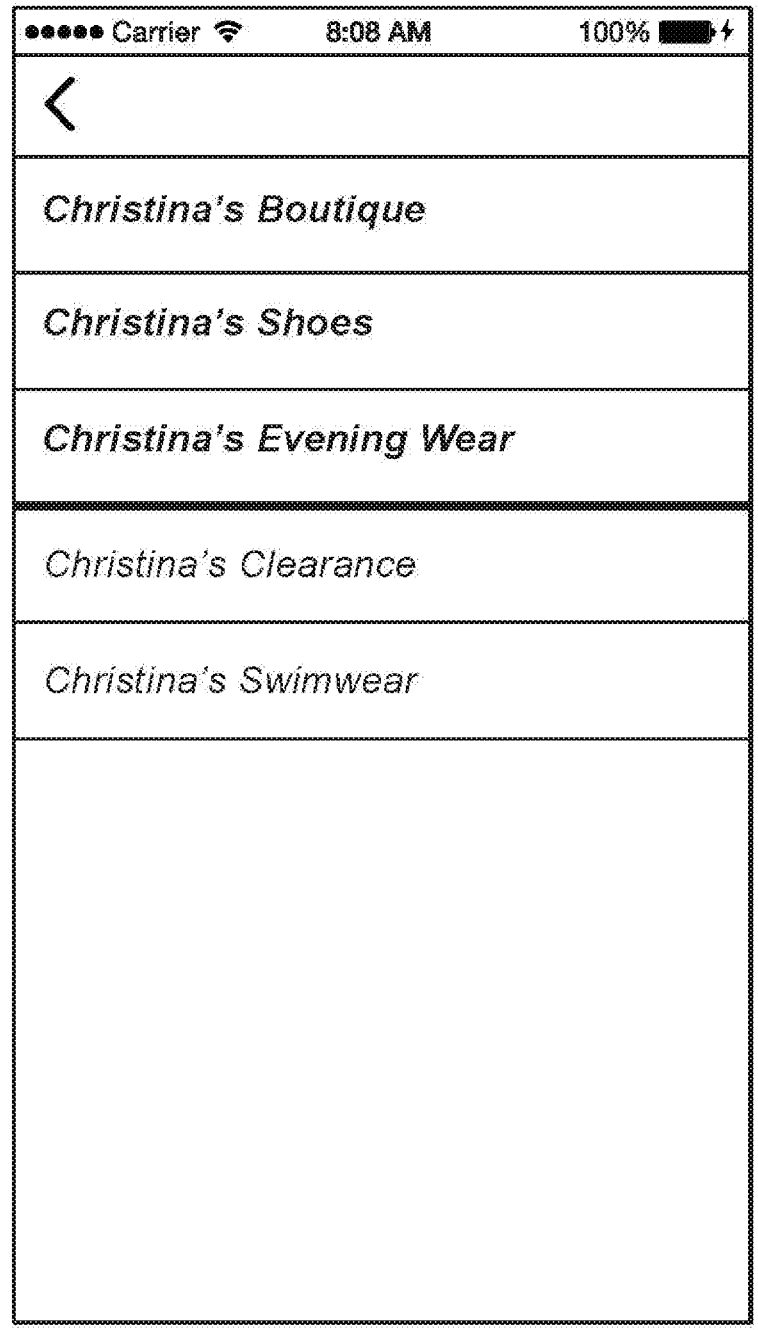

As with personal accounts, the selection of the people icon in the upper right corner of the FIG. 46 stream page takes the user to the FIG. 47 profiles screen, here the profiles screen for the tracked object, Christina's Boutique. As shown, the profiles may include not only those profiles earlier described in connection with FIG. 45 and there listed as existing profiles, but may include as well profiles for familiar brand name goods sold at the store, as shown in FIG. 47. These brand or sponsor profiles may be added to the business profiles page in the same manner as sponsors are added to association profiles, as earlier described. Customers interested in particular brands are thus given quick and easy access to and as well in depth information on such things as brand merchandise and, if desired, access to the website or subsets of website information from the various brands via the brand profiles listed on the profiles identifiers screen, FIG. 47. Such brand name companies are akin to association sponsors and may be charged by the business for being given prominence on the business profiles screen. Selection of the "+" symbol in the upper right corner of FIG. 47 enables additions to be made to the business profiles page in a manner similar or the same as earlier described for association members and sponsors in connection with FIGS. 38 and 39. Selection of the back arrow in the upper left corner of the header in FIG. 47 returns the user to the message stream, FIG. 46. Likewise, selection of the back arrow in the header of the message stream returns the user to the List page, FIG. 18, a modified version of which showing "nested" tracked objects is depicted in FIG. 57.

Figure 48:
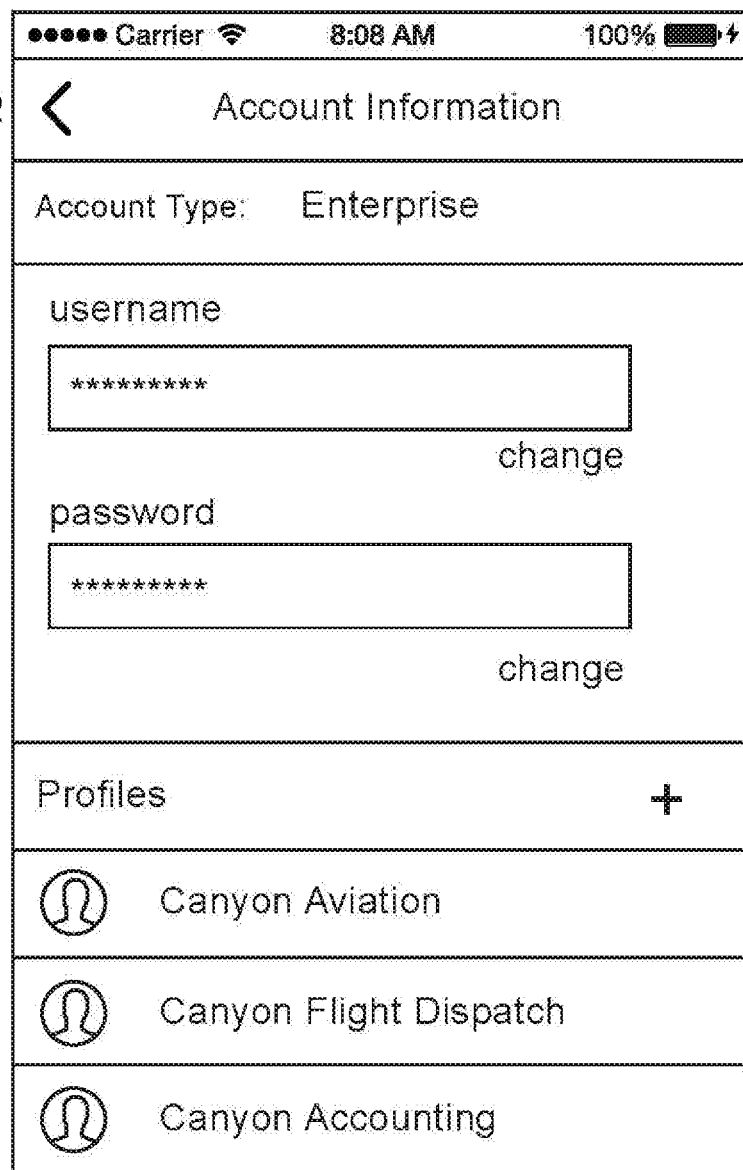
FIG. 48 is a smartphone wireframe diagram depicting an exemplary account information screen made available to a user upon selection of the account type "Enterprise" in FIG. 2.

Selection in FIG. 2 of an "Enterprise" account takes the user to the screen depicted in FIG. 48 (and the back arrow in FIG. 48 returns the user to the FIG. 2 screen). The FIG. 48 account setup screen is shown for simplicity as being similar in appearance to the FIG. 3 screen earlier described for a Personal account, although it will be recognized that business, association and enterprise accounts may have different Account Information screens reflective of the differences between the inherent nature and needs of the respective kinds of accounts. In FIG. 48, there is a username, password and profiles header block with a "+" in the right hand corner, the selection of which takes the user to an enterprise Profile composition/edit screen which may be similar to those profile composition/edit screens previously described, for example, the profile composition/edit screen shown in FIG. 4 for a personal account and in FIG. 31 for an association account. Hence the enterprise profile composition/edit screen is not depicted here by a separate figure. FIG. 48 reveals that the enterprise has earlier created three profiles, named, respectively, Canyon Aviation, Canyon Flight Dispatch and Canyon Accounting. The first profile may be for the overall business, while the other two may be for departments within the company. Each profile may be opened for viewing/editing by selecting the associated profile block, as earlier described for the other account types.

Like an individual account, an enterprise account offers the enterprise the opportunity to reach its members/employees/departments/customers/vendors and the like internally within the enterprise and, if desired, those outside the organization through multiple, different profiles and and/or selected, related tracked objects. A profile may provide appropriate information for the project or department including information about the persons in each department, the department's function, its staffing, etc. and may embody institutional knowledge of the organization that is maintained even with employees coming and going. Tracked objects involving outsiders will, of course, have protective safeguards to protect internal communications and proprietary information.

Figure 52:
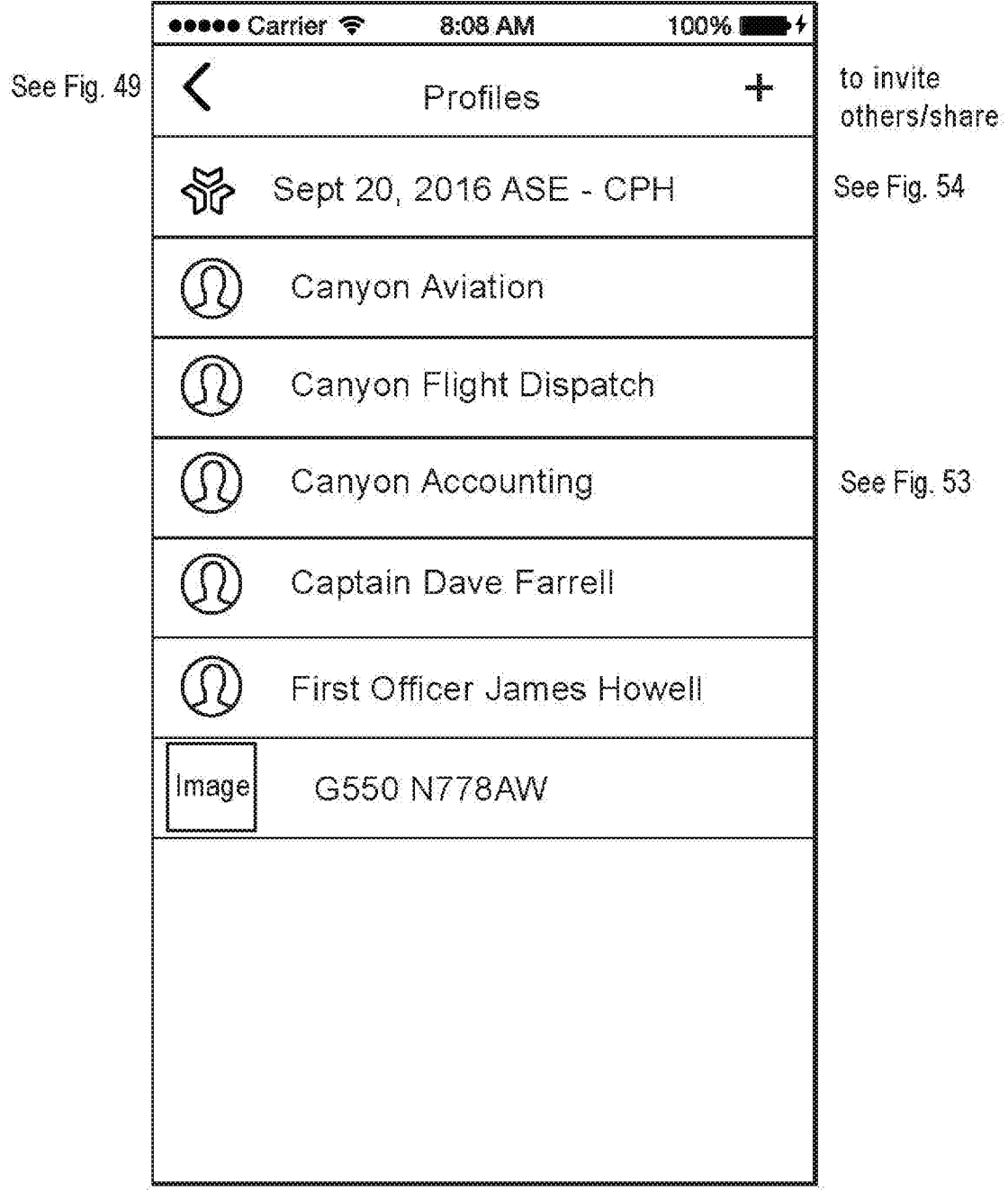
FIG. 52 is a smartphone wireframe diagram depicting an exemplary profile identifiers screen for an enterprise, accessed by selection of the persons icon in the upper right corner of the message post stream for the enterprise as shown in FIG. 49.

FIG. 52 is an exemplary profiles identifiers screen for the Canyon Aviation enterprise account. FIG. 52 depicts not only the profile identifiers shown in FIG. 48, but reveals that the enterprise subsequently created additional profiles, specifically: (a) an "about" profile identifier for the associated tracked object, that is, an aircraft trip on Sep. 20, 2016 between the airport identifiers shown ASE-CPH, i.e., Aspen, Colo. and Copenhagen, Denmark; (b) the flight captain Dave Farrell; (c) the first officer James Howell; and (d) the aircraft to be used for the trip, a Gulfstream G550, tail number N778AW. In the manner previously discussed with the other account types, selection of a particular profile identifier block opens the profile associated with the named profile identifier. Additional persons/entities/business departments may be invited to the tracked object by an authorized business person selecting the "+" symbol in the upper right corner of the header in the FIG. 52 profile identifiers screen and handling the invitation in a manner previously described in connection with the other account types. Thus, profiles are not constrained to the identification of persons or entities and the providing of information about them. Profiles provide the invention with great versatility and flexibility as they may be used for any purpose appropriate to the circumstance, such as for providing access to information about an aircraft and a trip on the aircraft as shown in FIG. 52, and information on various goods sold by a business or information on a business itself as earlier described. Profiles, where appropriate, may be used as a substitute for one or more nested tracked objects, such as affinity groups within a larger organization. For example, as will be explained in connection with FIG. 58, "things," such as a thermostat, a security system or the like, may be presented to the user as individual items on a list screen (or in a nested list) or, alternatively, may be presented to the user as profiles on a profiles screen associated with a single list item, such as "My House."

Figure 49:
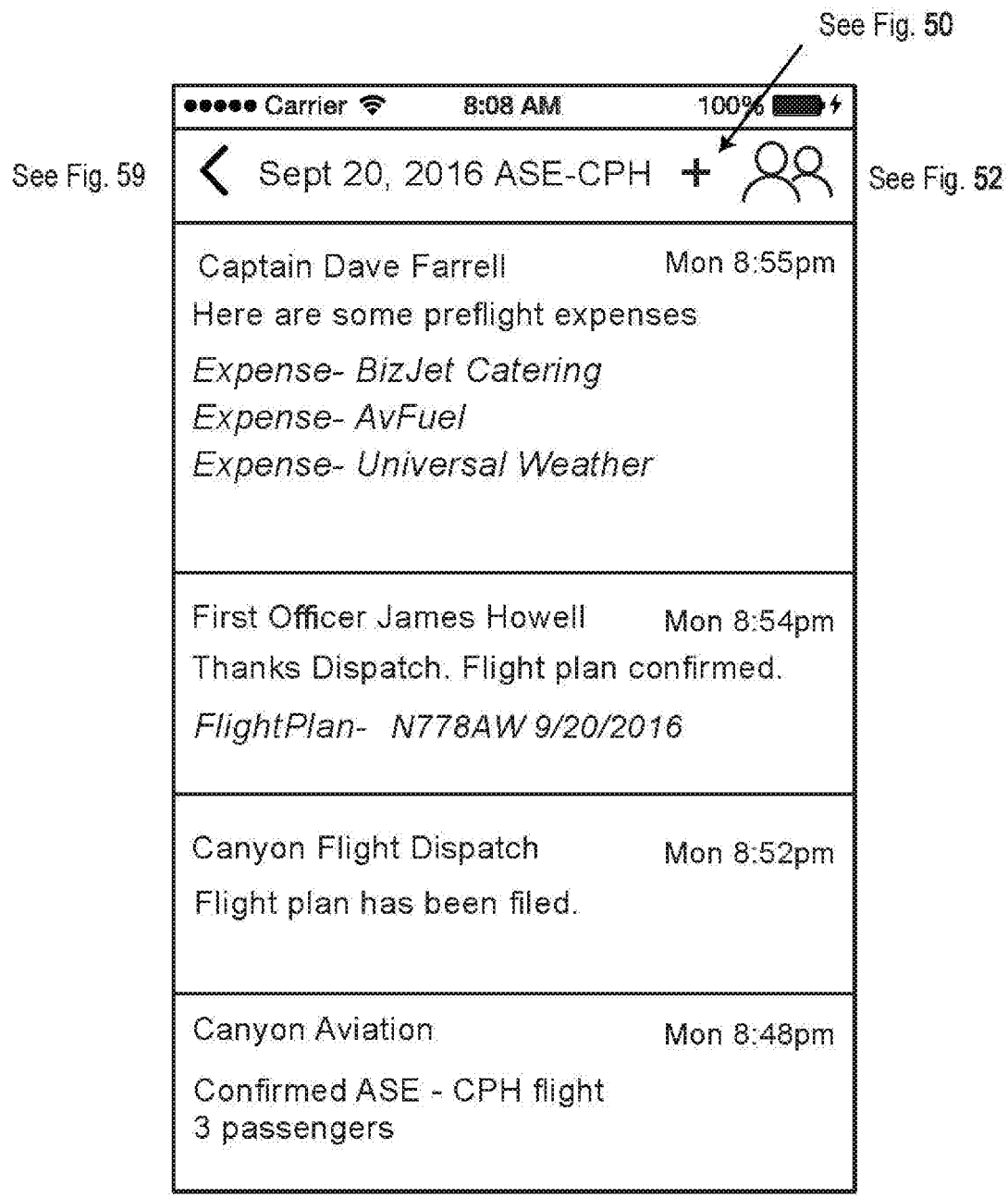
FIG. 49 is a smartphone wireframe diagram depicting an exemplary message stream for an enterprise tracked object, which may be generally similar in appearance to the message streams in the earlier cited examples for personal, association and business accounts.

Selecting the back arrow in the upper left corner of the profiles header in the enterprise profile identifiers screen, FIG. 52, returns the user to the enterprise message stream, FIG. 49. As shown in FIG. 49, there are posts made by the captain, first officer, flight dispatch department and Canyon Aviation; all of the persons and entities making posts in the FIG. 49 message screen are members of the tracked object as denoted by the presence of their profiles on the profiles identifiers screen, FIG. 52. Only tracked object members in this example may post to the stream and only the person posting and the date/time of the post is set forth in the post. Information on the tracked object members is accessed through the profile identifiers screen, all as previously described in connection with the other account types.

Figure 59:
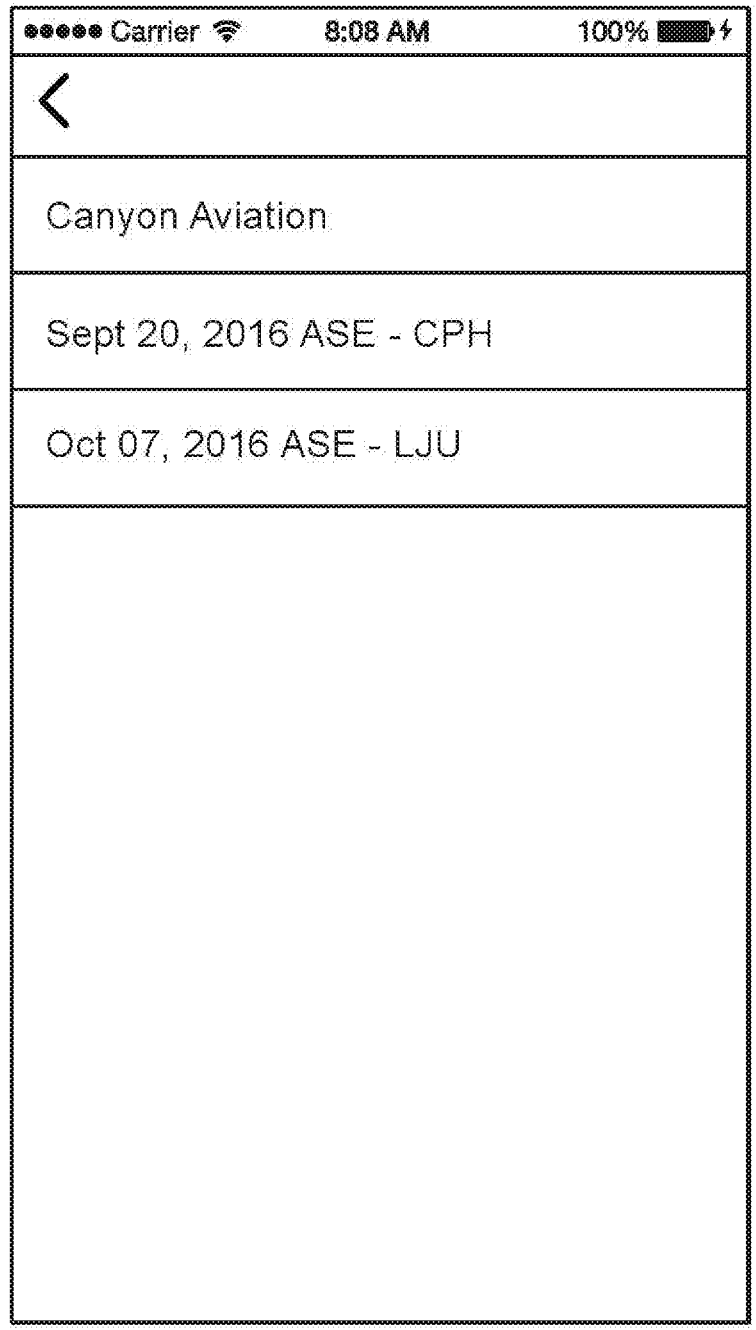

Selection of the back arrow in the upper left corner of FIG. 49 message stream screen returns the user to the user list page, FIG. 59 and subsequently FIG. 18, which shows Canyon Aviation as one of many tracked objects on the user's list screen; FIG. 59, to be described, shows how related tracked objects may be nested on the List screen for user convenience. An individual user having only an individual account may be a member of and have on the user's list screen, FIG. 18, many tracked objects including associations, businesses and enterprises in which the user is a "member" in some sense as well as other individual users and informal affinity groups created by individual users. On the other hand, a business or association will typically have only its related tracked objects on the list page. The profiles of ordinary members of association and business tracked objects may or may not be accessible from such tracked objects, as previously discussed.

The usual practice or starting point in navigating the various screens is for the user to select the desired tracked object, such as Canyon Aviation, on the list screen, FIG. 18 (or FIG. 59 to be described), thereby to open the stream for Canyon Aviation, FIG. 49. Selection of the people symbol in the upper right corner of the stream header in FIG. 49 takes the user to the profile identifiers screen, FIG. 52 for that tracked object, Canyon Aviation. From the FIG. 52 enterprise profiles page, the user returns to the enterprise stream, FIG. 49, by selecting the back arrow in the upper left corner of the profiles identifier screen, FIG. 52, and returns to the list screen, FIG. 18 via the nested list, FIG. 59, by selecting the back arrow in the upper left corner of the post stream, FIG. 49.

The captain and first officer posts in the FIG. 49 Canyon Aviation stream include in this example documents or forms or links to documents or forms, specifically certain expenses entered by the captain preferably in documents or forms with predetermined fields for the entry of specific information as recognized by the system, such as the amount of the expense, the vendor, date and so on, all as is well understood in the art. Similarly, the first officer post includes another form filled out with flight plan information or includes a link to the filled out form. The other posts provide tracked object related information, that is information about the flight. Thus, everyone having involvement in the tracked object is kept in the loop on all information pertinent to the tracked object, here the Canyon Aviation enterprise activity involving a flight between the identified cities, as well as the people, expenses and information pertinent to that activity.

Figure 50:
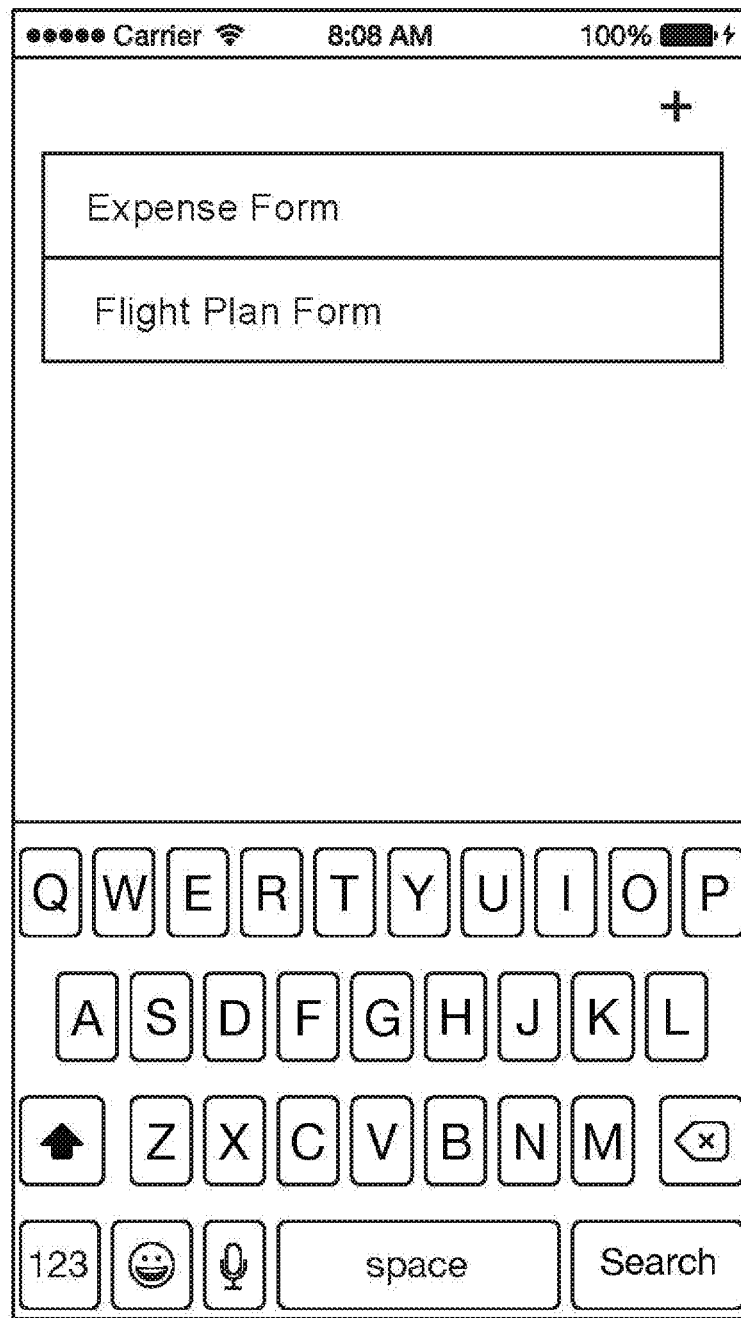
FIG. 50 is an exemplary enterprise form selection screen for the enterprise accessed by selection of the "+" symbol in the header of the FIG. 49 screen, FIG. 50 offering the user the option of selecting either the form "expense" or "flight plan;"

FIG. 50 is a schematic depiction of a screen listing in separate identifier blocks two exemplary forms identifiers pertinent to the Canyon Aviation enterprise, namely, an expense form and a flight plan form. Selection of the "+" symbol in the upper right corner of the FIG. 50 forms screen may open a form composition screen or a menu of forms from which selections may be made to add form identifiers for such forms to the form list page, FIG. 50.

Figure 51:
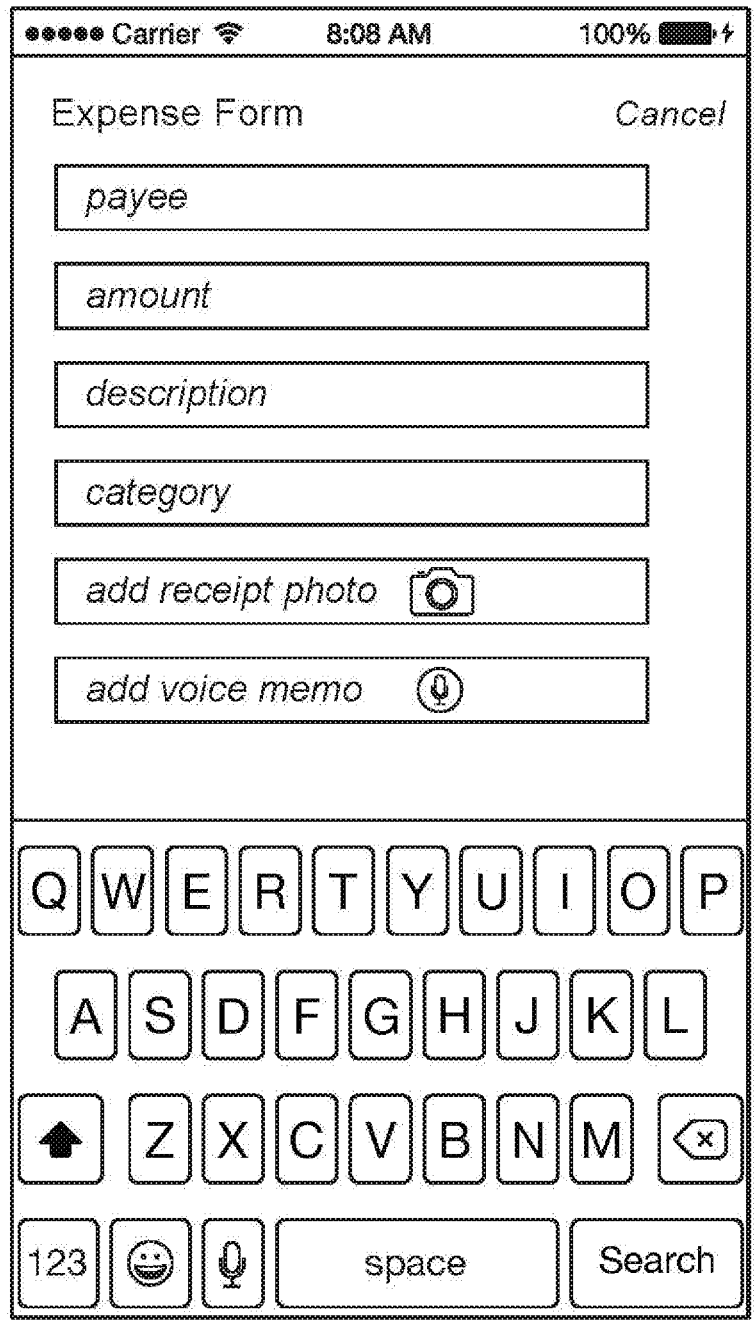
FIG. 51 is an exemplary expense form opened upon selection of the block expense form in FIG. 50.
Figure 53:
FIG. 53 is a smartphone wireframe diagram depicting an exemplary "Canyon Accounting" profile accessed by selecting the like named block in the enterprise profile page, FIG. 52.

FIG. 51 depicts an exemplary expense form as may be made available to the user upon selection of the expense form identifier block in FIG. 50. The expense form includes fields for entry of the payee, the amount in dollars or other currency, the description of the expense, the category of the expense as may be used to categorize expenses for internal bookkeeping, the adding of an image of an expense receipt and the adding of a voice memo pertinent to the expense. The provision and creation of such forms is well understood in the art. Selection of the Canyon Accounting block on the profiles page, FIG. 52, takes the user to the associated profile, FIG. 53. As there shown, there is a private message block to enable profile members to privately message the Canyon accounting department, a block describing the function of the department and a listing of pertinent links and related tracked objects. GAAP, an acronym for "generally accepted accounting practices" provides a link to important accounting reference material, the link to FAQs provides answers to frequently asked question about expenses and the lowermost block provides access for review of a person's submitted expenses. These examples illustrate only several of the many useful purposes that may be served by an enterprise profile.

Figure 54:
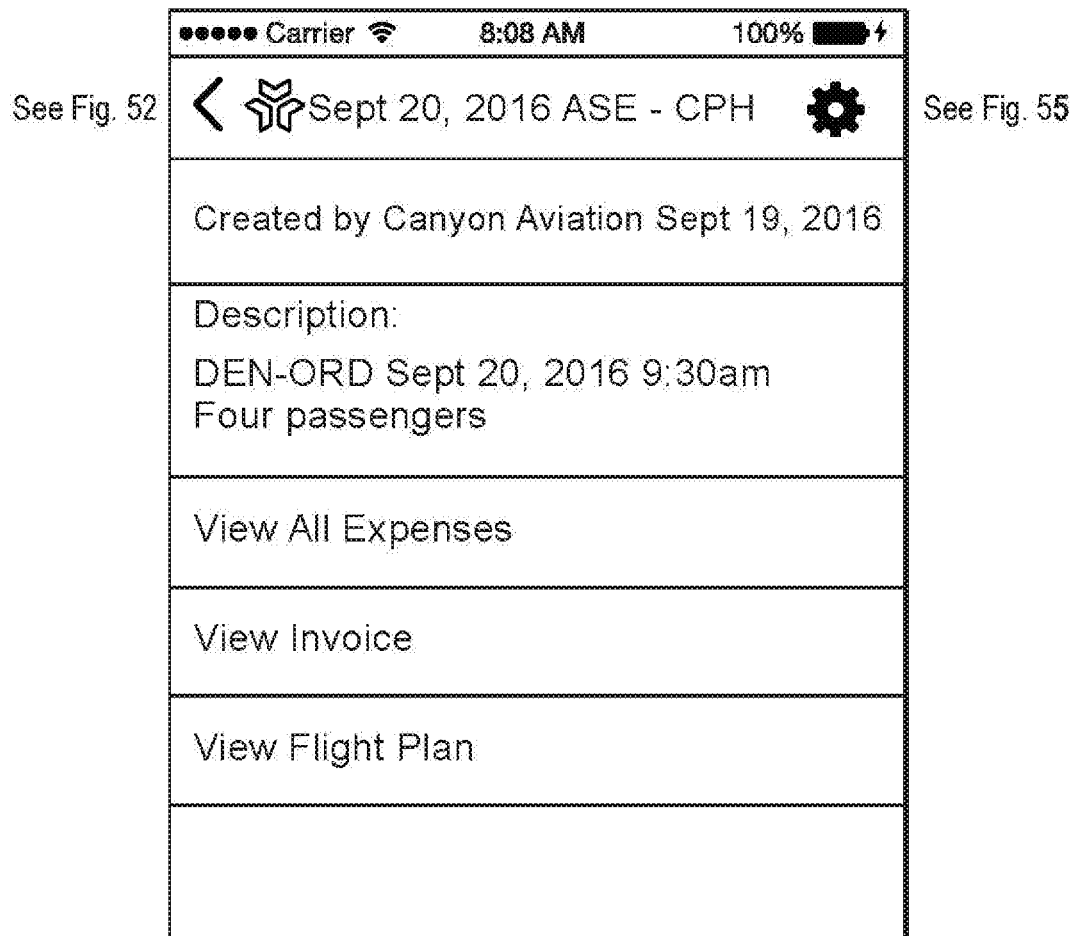
FIG. 54 is a smartphone wireframe diagram depicting an exemplary About profile for the enterprise, accessed by selecting the About profile identifier block (the uppermost profile block having the Hapyn logo) in the profile identifiers screen, FIG. 52.

The enterprise About profile identifier in FIG. 52, that is, the block "Sep. 20, 2016 ASE-CPH" is in this example a private aircraft flight from Aspen to Copenhagen. Selection of this block takes the user to the enterprise About profile, FIG. 54. FIG. 54 depicts another invention feature which highlights the wide ranging utility of the architecture of the invention. The enterprise About profile, or profiles in general, may take on diverse uses depending upon the needs of a person, association, business or enterprise. As is now apparent, profiles in the context of the present invention embraces far more than simply a description of a person or entity. The about profile, FIG. 54, indicates in the separate blocks, proceeding from top to bottom, when and by whom it was created, the description of the tracked object and individually selectable blocks which may be opened to view, respectively, all expenses associated with the tracked object, invoices for the tracked object to perhaps a charter customer and the flight plan for the tracked object, i.e., the trip from Aspen to Copenhagen in the plane identified on the profiles page.

Figure 55:
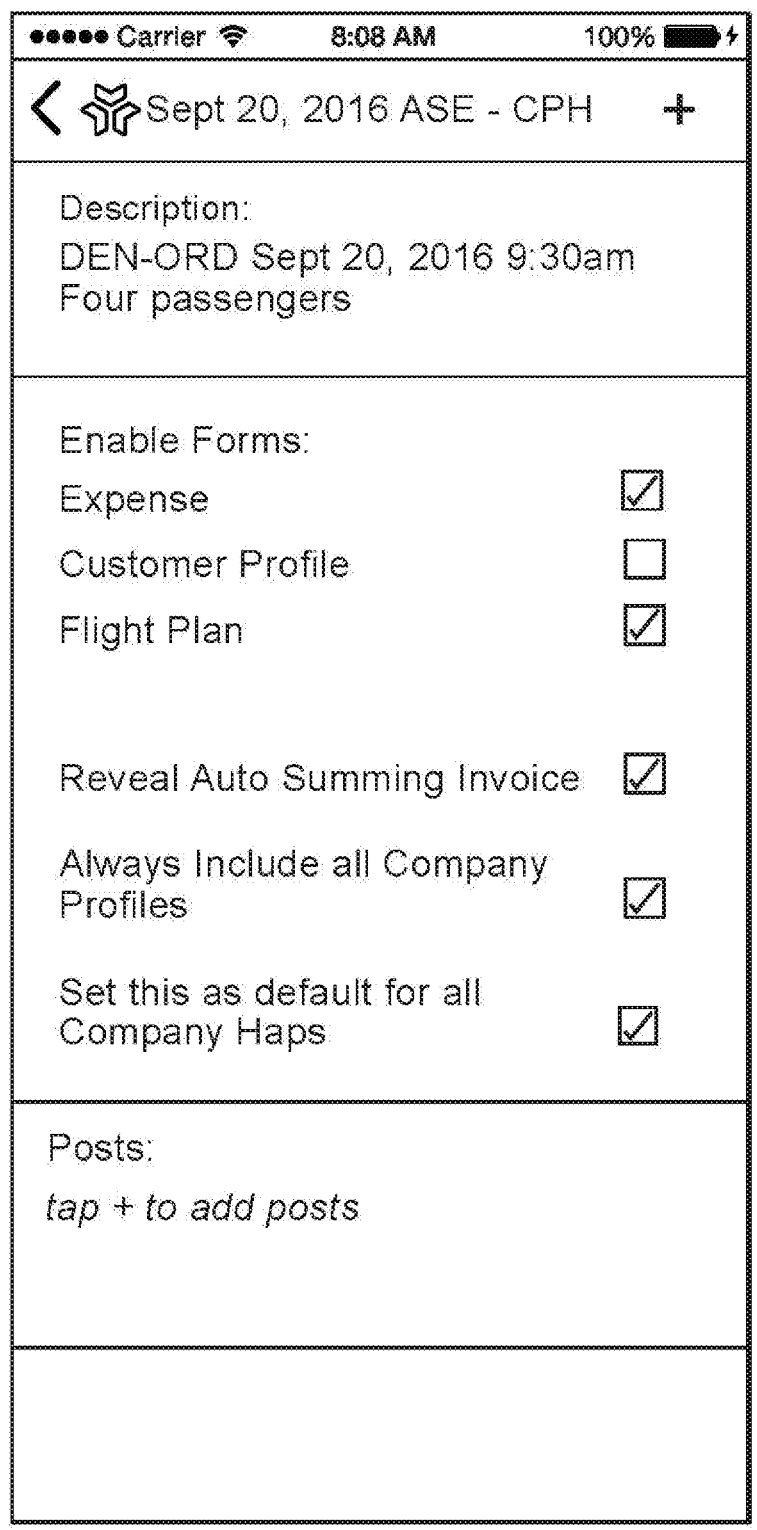
FIG. 55 is a smartphone wireframe diagram depicting the rules/permissions selected for the exemplary enterprise tracked object, accessed by selecting the gear icon in the upper right corner of the FIG. 54 screen.

FIG. 55 is the rules/permissions screen established for the identified tracked object at the time it was created. The FIG. 55 screen is accessed by selection of the gear symbol in the header of the FIG. 54 About profile screen and choices are made for rules/permissions in the FIG. 55 screen the same way as earlier described for the other account types. By way of example, it is shown that forms may be made available for use with the tracked object, here expense, customer profile and flight plan forms; only two forms are selected as denoted by the check marks. Further, the rules provide that an auto summing invoice is to be revealed, all company profiles are to be included and that these rules are to be set as a default for all company tracked objects. Of course, many other and different rules and permissions may be made available as desired consistent with the teachings of the present invention. There is also a section for the adding of posts to the FIG. 55 about screen.

Note that the forms added to the tracked object may be components of an enterprise application, which may be integrated as part of the described system or may be a third party system. These forms link to the enterprise system via an application program interface (API), a technique familiar to those skilled in the art, whereby the data in each field is transferred and entered into the other system seamlessly. In this manner, a large, perhaps less mobile friendly and less intuitive enterprise system can be linked or integrated with the described invention allowing mobile users a more convenient interface with a large enterprise system. As well known to the art, an application program interface (API) is a set of routines, protocols, and tools for building software applications. An API specifies how software components should interact and APIs are used when programming graphical user interface (GUI) components.

Figure 56:
FIGS. 56-60 are exemplary smartphone wireframe diagrams depicting features of the invention (including a nested list feature) in the context of, respectively, two types of businesses (FIGS. 56 and 57), a home control "internet of things" (FIG. 58), an enterprise (FIG. 59) and an association (FIG. 60)

FIGS. 56-60 illustrate another feature of the invention that finds applicability in all account types and in various ways in connection with, among other things, joining, leaving and managing tracked objects on the list screen. Specifically, in FIG. 56 it is assumed that the user has selected the tracked object BR Travel from the FIG. 18 list screen thereby to open many related BR Travel tracked objects as shown in FIG. 56. The related BR tracked objects shown in FIG. 56 are nested under the lead or primary tracked object, BR Travel, shown in FIG. 18. Selecting the back arrow in the upper left corner of the header in FIG. 56 returns the user to the primary user list screen, FIG. 18.

In the FIG. 56 example, it is assumed that BR Travel is a travel company that offers prospective clients many different vacation trips from which to choose for biking, hiking and the like at different times of year in different locations around the world. BR Travel has created a primary tracked object, BR Travel, which may include much of what might be found on a travel company website. BR travel has also created separate tracked objects related to various trips, here shown as examples BR Burgundy France 2016, BR Tuscany Italy 2016 and BR Asia Trips. BR Burgundy and BR Tuscany, for example, may include as members all the clients/customers signed up for and ultimately on the respective trips, as well as the associated BR guides, drivers, and home office support people. BR Travel, BR Burgundy and BR Tuscany are depicted in bold print in FIG. 56, which is a signal to the user that there are new, unread posts in these tracked objects. Since BR Asia Trips 2016 is in greyed print as is the BR Office Private Message tracked object, the user is informed that there are no new messages in either of these tracked objects. Of course, instead of bold print, changes in print color, identifier symbols or the like may be used to denote new messages and the like. Unique BR Office Private Message tracked objects are assigned to each customer/client in each tracked object upon a person opting to contact the office so that the office staff and client may directly, bilaterally and privately communicate via posts to the private message stream of each client/customer.

The bold, dark line on the FIG. 56 screen between the tracked objects BR Office Private Message and the two lower tracked objects, that is, BR North America 2016 and BR South America 2016 indicates that the user is not a member of the tracked objects below the bold line, but is a member of those above the bold line.

Users may leave any tracked object in which they are a member by a simple gesture or the like, such as by swiping the tracked object off the screen in which event it will reappear in grey print below the bold line. Users may join tracked objects below the bold line by selecting the desired tracked object by any appropriate gesture or action, such as BR South America 2016 in which event the selected tracked object will move to a position above the bold line. With businesses and associations, it may be desirable for some of the related tracked objects to allow users to freely join the tracked objects, as opposed to having the business or associations being required to invite a person to a tracked object.

The invention as exemplified in the FIG. 56 illustration allows a company with a deep website of customer trip offerings or the like to "unpack" the website into any number of separate trips or the like by creating corresponding tracked objects in any number. Only the lead tracked object, BR Travel, is shown on the user's primary list screen FIG. 18, but selection of the BR Travel tracked object from the list screen opens a dynamic list as shown in FIG. 56 including all of the nested, related tracked objects created by BR Travel and made available to its customers/clients, either for them to freely join or to become a member only upon invitation, such as might be sent when a person has signed up and paid for a particular trip, like BR Burgundy 2016.

Some of the tracked objects may be open to the public to join, while others, such as a specific, active trip like BR Burgundy may only be joined by a member who is invited to the tracked object by BR Travel, or is given some passcode or the like enabling the customer to join a particular tracked object. Having all BR Travel tracked objects, for example, all trips offered to the public in one place as separate but nested tracked objects makes it very easy for a customer to see what trip offerings exist and to join the tracked object by selecting the desired tracked object below the bold line to learn more about the trip, the guides, the itinerary, lodging and the like. With the architecture of the invention, everything about an affinity group, association, business or enterprise may be found in one, easily navigable application.

The FIG. 56 list and the others to be described in connection with FIGS. 57-60 are herein denoted as dynamic lists with, as shown, a nesting feature. Dynamic in the present context means that "automatic" system prompted changes occur to tracked objects in the list in response to certain actions or events. For example, as here shown, tracked objects that receive new messages migrate to the top of the list while the names of the tracked objects with new messages change from a standard font to a bold font thereby to visually inform a user which tracked objects have new messages, not yet viewed. Other visual indicators for new messages may also be used, such as changes in color, symbols or the like. Although not presently preferred, the tracked objects may remain in a predetermined order, such as an alphabetical order, with the user being required to scan the entire tracked object list to identify those tracked objects bearing some easily identifiable visual indicator denoting the presence of new messages. Existing tracked objects may be removed from the list with a simple swipe and then reappear below the bold line as among the tracked objects available for the user to join.

FIG. 57 depicts how the nested list may serve the interests of a business, such as Christina's Boutique. Since Christina's Boutique is on the user's primary list screen, FIG. 18, the user is already a member of this tracked object. Selection of Christina's Boutique in FIG. 18 opens the dynamic, nested list screen for Christina's Boutique, FIG. 57. On initial opening of this tracked object, all of the other tracked objects may be below the bold line since the user has not determined which, if any, of the other tracked objects the user wishes to join. In the present example, and as is the case in all of the examples, selection of a greyed tracked object moves it from below the bold line to above the bold line. Here the user determined to join the tracked objects Christina's Shoes and Christina's Evening Wear (all of which are shown in bold denoting the existence of new messages), but has not yet joined the tracked objects Christina's Clearance or Christina's Swimwear.

Figure 58:
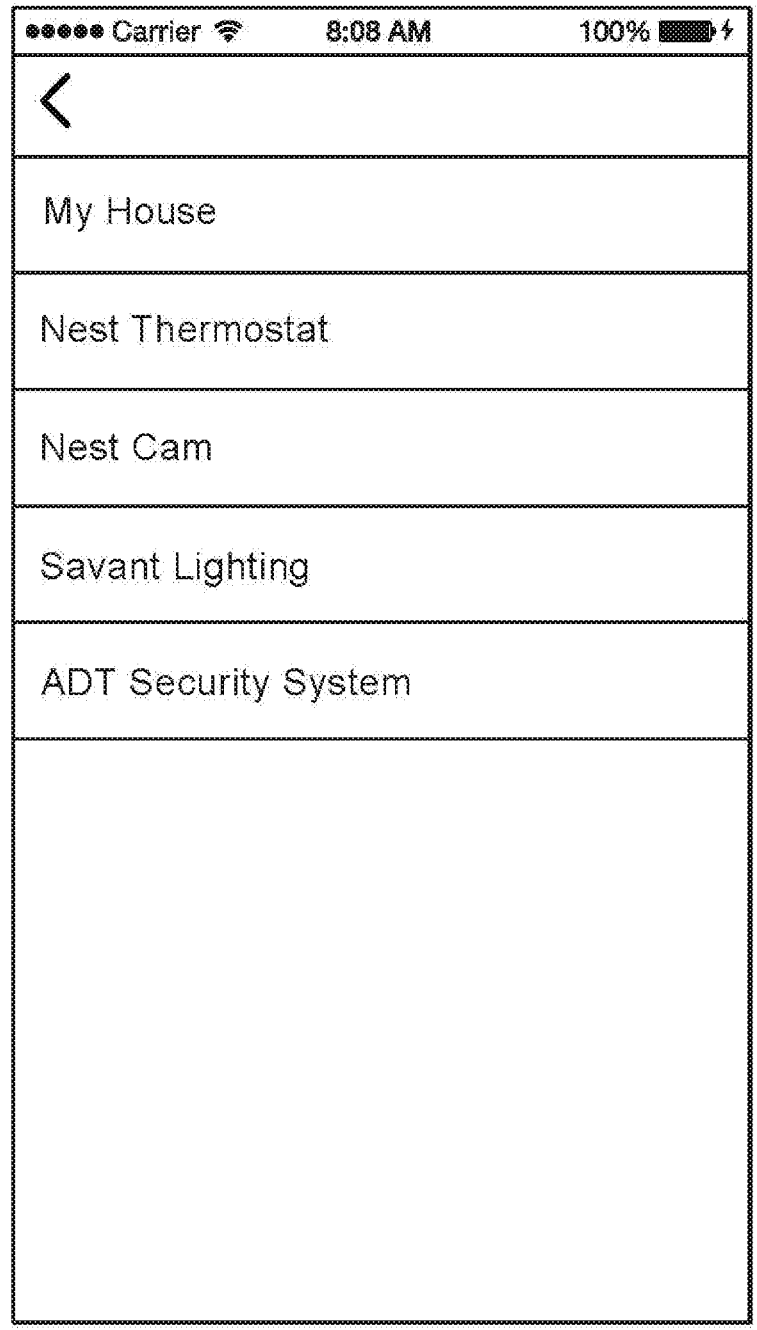

FIG. 58 is an example of how the invention may find utility in the upcoming "internet of things" which involves communications between a user and various "things" that have the capability to, for example, communicate information about their status and to allow their control from a remote location via an iPhone, Android phone or other device. Profiles may be used in conjunction with the internet of things. For example, control of the device may be done from the device profile on the profiles page and/or information regarding the device, selection of settings, etc. may be placed in the profile. In FIG. 18, the list includes as the top selectable block, the primary tracked object, My House. Selection of this block in FIG. 18 opens the nested list for My House as shown in FIG. 58, specifically the home related tracked objects Nest Thermostat, Nest Cam, Savant Lighting and ADT Security System for dealing with respectively home temperatures by room, web cameras strategically located within and around the house, the house lighting inside and out, and home security and alarm systems. In this example, the user is a member of all of the tracked objects and there are no others for the user to select so the bold line is absent from the dynamic list FIG. 58. Thus, even a user's interaction with all of the items for controlling, for example, all home systems may be placed in a single nested list rather than requiring a user to locate and select appropriate, individual apps from among numerous "chicklets" on an iPhone or Android screen. Selection of the blocks in FIG. 58 may open individual, unrelated apps for each of the items listed, as opposed to opening a tracked object or may present a custom interface designed by the third party which links via an API in the manner earlier described, to a cloud based third party application which then subsequently communicates with the thermostat, security camera or any other device or service. In other words, the tracked object blocks may serve through an appropriate application program interface (API) to connect the user directly to the application simply by selection of the named block on the dynamic list. This is far more convenient than searching for and individually selecting particular apps from among many on a mobile device. Message streams may exist in association with each of these tracked objects such that any device may send an alert or other message to the user and each device may have its own profile.

Figure 60:
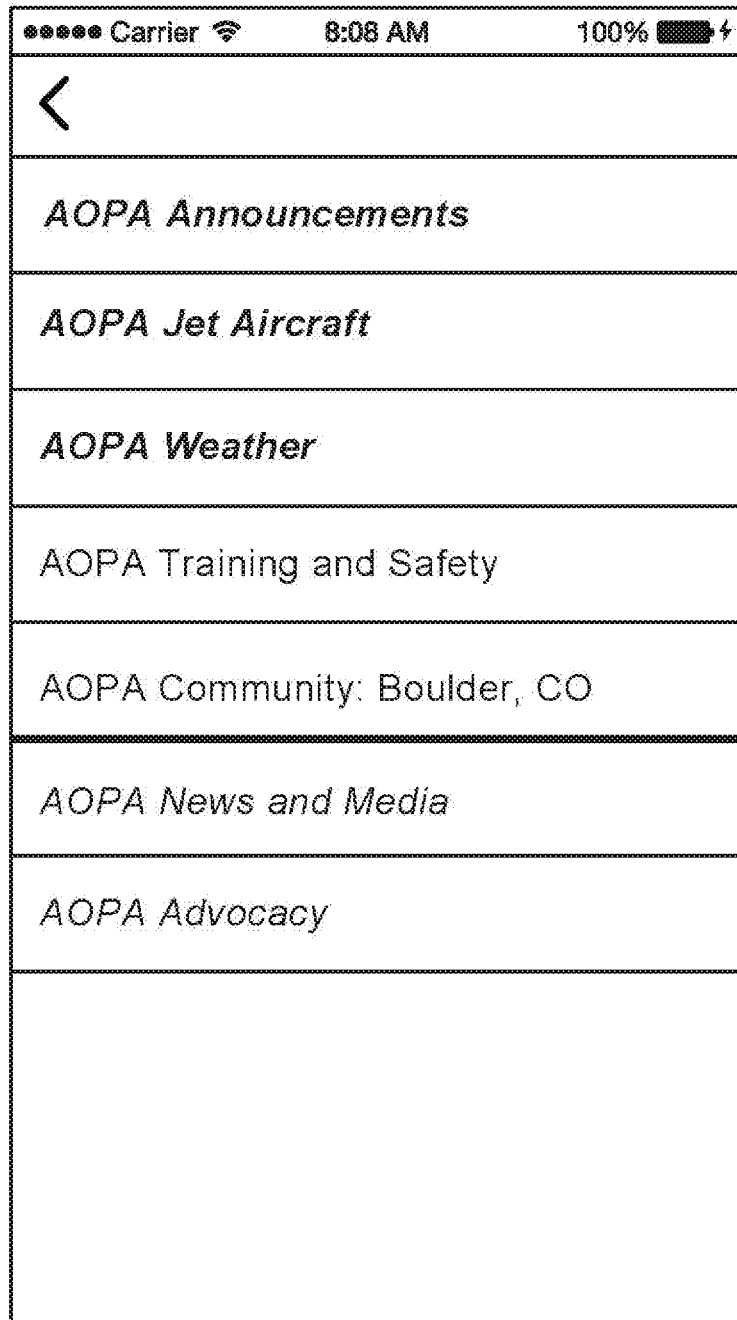

FIG. 59 depicts an example of the utility of the dynamic and nested list in the context of an enterprise. Specifically, selection of the tracked object block Canyon Aviation in the FIG. 18 list opens the nested Canyon Aviation tracked objects, here specific aircraft trips, as shown in the dynamic list, FIG. 59. Opening of the individual trips, as earlier shown, provides all of the information relevant to the trip as earlier described in connection with FIGS. 48-55. FIG. 60 depicts the utility of the dynamic and nested list in the context of an association, here AOPA. Selection of the block "AOPA Announcements" in FIG. 18 opens the nested AOPA tracked objects, here specific subgroups within the larger organization. Some of these subgroups may allow member participation while others may be "broadcasts" from the parent organization or subgroup that provide information and messages to the affinity group members while not allowing a member to contribute to the message stream for the tracked object and/or the About profile posts. Consistent with the earlier described convention, the three bold tracked objects identified in the top three blocks of FIG. 60 each have new messages, while the next two do not. The two additional tracked objects, that is, affinity or subgroups identified below the bold line are groups which the user has not joined, but may join by selecting them in the manner earlier described. In each of the nested list screens FIGS. 56-60, the user may return to the main list screen by selection of the back arrow in the upper left corners of the respective screens.

Figure 61:
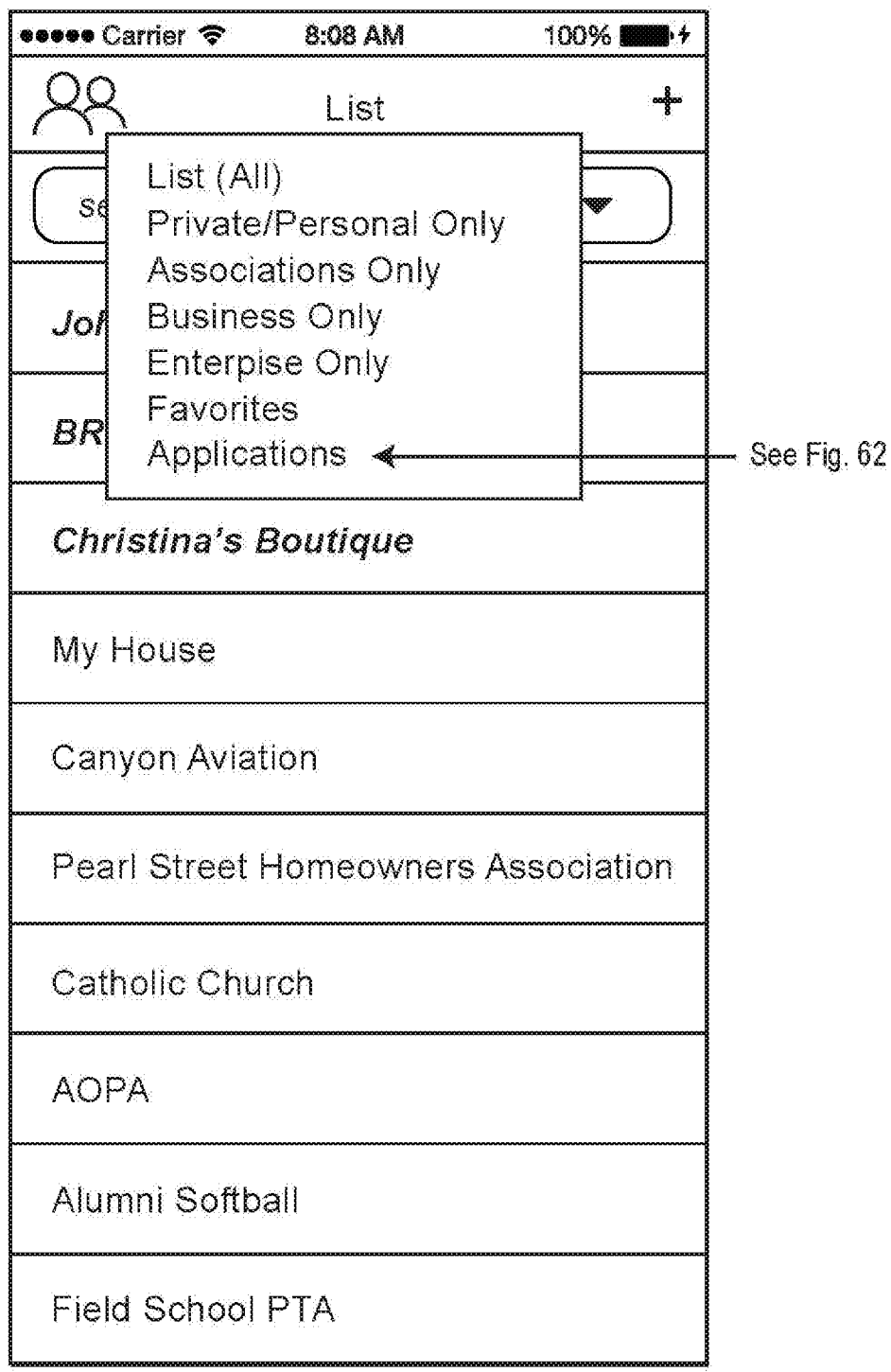
FIG. 61 is an exemplary smartphone wireframe diagram depicting a list filter for enabling users to display a list of all tracked objects or, alternatively, selected kinds or categories of tracked object lists.
Figure 62:
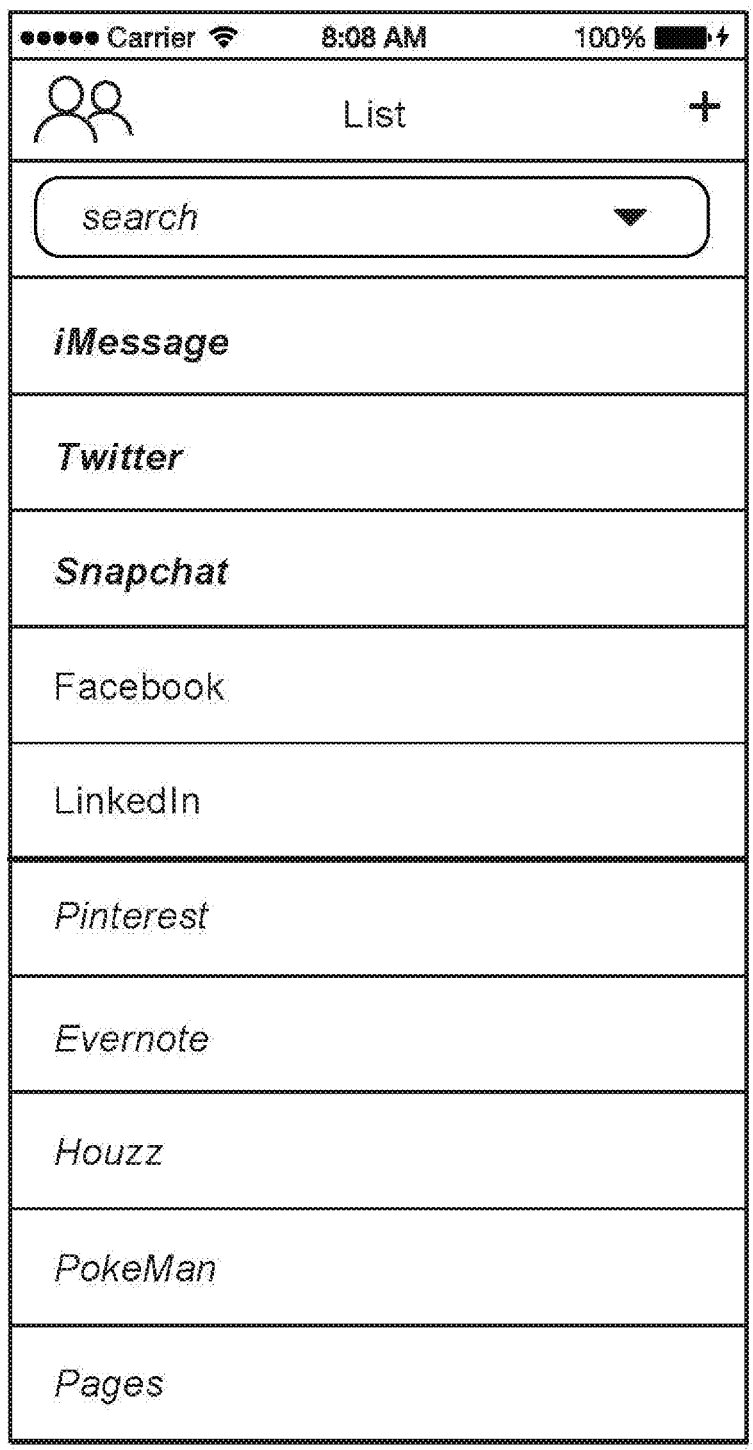
FIG. 62 is an exemplary smartphone wireframe diagram depicting an "Applications" list of currently popular social applications accessed by selecting the item "Applications" in FIG. 61.

Selection of "List" in the header control bar of FIG. 18, opens the list selection panel or screen as shown in FIG. 61. The List filter screen of FIG. 61 is useful when a user is a member of many private/personal, association, business and enterprise tracked objects. In such event, it is often convenient to display only desired list groups, such as those shown in the filter screen in FIG. 61, and/or a favorites list to facilitate review and selection of desired tracked objects. Additionally, third-party apps may be accessed from the format of the list. For example, selection of the item "Applications" in the filter panel list of FIG. 61 opens the screen FIG. 62. For user convenience, and to obviate the necessity for a user to leave the environment of the present invention, the Applications list may include links to the user's various, popular third-party apps, such as Facebook, LinkedIn, Twitter and the like. This is not a list of tracked objects, but rather a list where the individual blocks serve to link the user through appropriate API's to the user's feeds for the applications listed in FIG. 62 or, alternatively to open the named app and allow a user to interact with it directly, then hit "return to hapyn," i.e., "return to tracked object" or some similar command as is currently used in Apple iOS. This allows the List page to act as a convenient directory of many frequently used apps. In this sense, the invention is an application manager for the user's links to these third-party applications. The list may also include shortcuts to reaching third-party apps, either as particular app feeds or entire apps. Profiles may be used for the same purpose where appropriate or desired. The present invention provides a far more efficient and compact way of accessing such third-party apps than the typical app "chicklets" and chicklet folders for grouping apps, as now commonly used in mobile devices.

Figure 63:
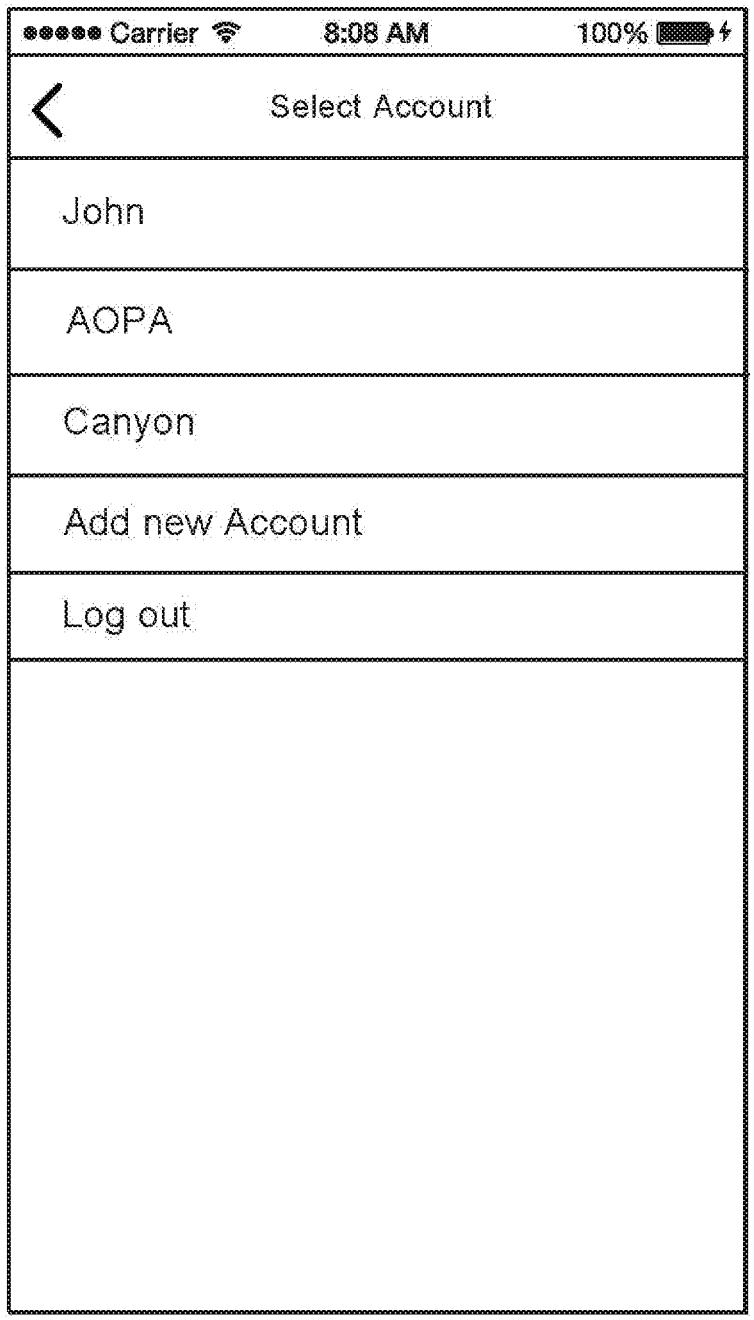
FIG. 63 is an exemplary smartphone wireframe diagram depicting a Select Account screen accessed by selecting the word "Account" in the upper right corner of the FIG. 27 Profile Directory and Search screen.
Figure 64:
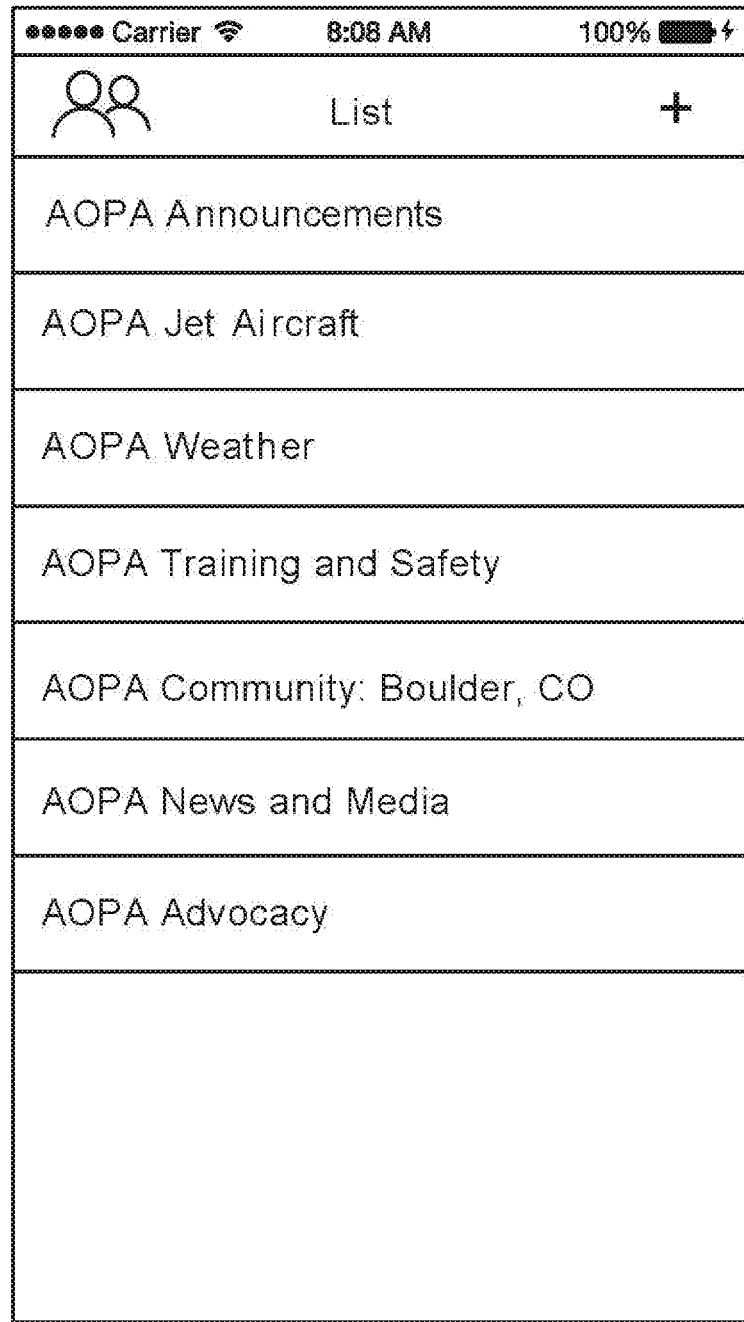
FIG. 64 is an exemplary smartphone wireframe diagram depicting a List screen for the association account AOPA accessed by selecting the like named block in FIG. 63.

A user may have multiple accounts, that is, one or more personal, association, business and enterprise accounts. One convenient way to access a desired account is from the profile directory and search screen, FIG. 27. Selecting the word "Account" in the upper right hand corner of the header of the FIG. 27 screen takes the user to the account list screen, FIG. 63, which here depicts the user, John, having a personal account of like name, an AOPA account as an employee or official of that organization and enterprise account, Canyon, as an employee, official or other authorized member of that account. Selection of the account "John" in FIG. 63 takes John to the list screen, FIG. 18, for his personal account, while selection, for example, of the AOPA account takes John to the list screen, FIG. 64, for the AOPA account. The tracked objects in the FIG. 64 list are those for which John has authorized access at the AOPA. Selecting "Add new Account" on FIG. 63 takes the user to FIG. 2 where he can add another account. Selecting "Log out" of FIG. 63 logs the user out of all accounts and sends them to a login screen, not shown, requiring entry of a username and password to regain access to accounts.

With clean, uncluttered "streams" of predetermined cell size and other characteristics as described, dynamic lists with nesting of related tracked objects as described, profiles (profiles for persons, entities and "things" of all kinds and in any number) as described and a filterable list screen, among the other features described, a user can easily identify, respond, review and control from a single app every form of person, entity, enterprise, "thing" interaction typical of everyday modern life. In effect, the message stream for each tracked object is one tracked object information channel having preselected characteristics as earlier described, while individual profiles are further, independent information channels useful for wide ranging purposes related to an individual tracked object, such as person profiles, business and other entity profiles, things profiles and, indeed, profiles of virtually anything, as earlier described. The unbearable cognitive tax typical of current approaches to such interaction is also eliminated as, among other things, all interactions/subjects are inherently organized from the outset. Deleting, archiving, etc. are also unnecessary thereby to relieve users from burdensome, unproductive tasks.

While the above detailed description has shown, described, and pointed out novel features of the invention as applied to various embodiments, it will be understood that various omissions, substitutions, and changes in the form and details illustrated may be made by those skilled in the art without departing from the invention. This description is in no way meant to be limiting, but rather should be taken as illustrative of the general principles and teachings of the invention. The scope of the invention should be determined with reference to the claims.

I claim:

1. In a hand-held mobile computing device, including (i) a display for generating information screens having screen portions responsive to user gestures, and (ii) the capability to wirelessly communicate, via a cloud computing center, with other such devices, a graphical user interface comprising:

(a) a first display screen configured for enabling the device user to selectively initiate creation of an editable default profile and an associated default profile identifier, said first display screen being further configured for enabling said device user to access a predetermined menu of profile privacy rules to select the privacy rules applicable to said default profile;

(b) a second, scrollable, display screen configured for a device user to create a social group by specifying (i) its members, (ii) a tracked object identifier, (iii) an initial message; and (iv) the member rules applicable to the group from a predetermined menu of member rules;

(c) a third, scrollable, display screen configured for listing in separate gesture sensitive screen portions the tracked object identifiers of those social groups in which the device user is a member, the third screen being configured to have a first gesture sensitive navigation control for accessing the second screen by gesture to enable the device user to create a new social group with a tracked object identifier listed on the third screen;

(d) a fourth, scrollable, display screen configured for displaying, on gesture selection of a particular tracked object identifier on the third screen, messages associated with the particular tracked object identifier, each message being of a standard cell size expandable by gesture to reveal the full content of messages longer than the standard cell size and each message identifying only the author of the message and not including repetitive message overhead, the date and time the message was posted and the substantive content of the message and the fourth screen displaying the tracked object identifier for the social group only in a single location apart from the individual messages;

(e) a fifth display screen configured to enable a device user to compose a message to the social group associated with the particular tracked object identifier;

(f) a sixth, scrollable, display screen configured to list, in separate gesture sensitive screen portions, the default profile identifier of each social group member in the social group associated with the particular tracked object identifier listed on the third screen; and (g) a seventh, scrollable, display screen configured for viewing the profile of a particular member on gesture selection of that member's profile identifier on the sixth screen, said seventh screen being further configured for enabling each device user to edit only that user's own profile, associated profile identifier and profile privacy rules thereby enabling each group member to create a unique and different profile, profile identifier and set of profile privacy rules for each social group in which the device user is a member, and in which only the device user's most recently edited profile and profile identifier for each social group is accessible for viewing by the other members of the social group.

2. The graphical user interface of claim 1 and further including an eighth screen for enabling a device user to select an account type to join from among a menu comprising a personal social group account, an association social group account, a business social group account and an enterprise social group account.

3. The graphical user interface of claim 2 in which for an association account the default profile is that of the association and in which the association has multiple, additional profiles for different member interests within the association and in which persons that are members of the association have their own personal profiles.

4. The graphical user interface of claim 3 and further including association authorized advertiser sponsor profiles that may be selectively viewed and contacted by individual members of the association.

5. The graphical user interface of claim 2 in which for a business account the default profile is that of the business and in which the business has multiple, additional profiles for different aspects of the business.

6. The graphical user interface of claim 1 in which the menu of profile privacy rules comprises at least one of (a) allowing advertising to a device user's profile based on demographic information, insufficient to uniquely identify the device user, supplied by the device user in the device user's own profile, and (b) allowing contact of a device user's profile based on said device user supplied demographic information.

7. The graphical user interface of claim 1 in which the menu of profile privacy rules comprises at least three of selectively allowing (a) other device users who have the device user's telephone or email information in their own contact files to access the device user's profile; (b) only other device user's authorized by the device user to access the device user's profile; (c) other device user's to discover the device user's profile by search based on preselected criteria in the device user's profile including a device user's stated interests insufficient to reveal the device user's personal identity; (d) other device user's to discover by search and contact the device user's profile based on preselected criteria in the device user's profile, including a device user's stated interests, insufficient to reveal the device user's personal identity; (e) the device user to view the profiles of those other device user's that are authorized to view the device user's profile; (f) the device user to view the profiles of those other device user's that are authorized to view the device user's profile and to selectively block other device user's from viewing the device user's profile.

8. The graphical user interface of claim 1 in which the device user may create multiple profiles, each with their own device user selected profile privacy rules, and in which the device user may selectively choose different profiles for different social groups.

9. The graphical user interface of claim 1 in which a device user is enabled to selectively view for another device user (a) the social groups that the device user and other device user have in common, and (b) the profile of the other device user.

10. The graphical user interface of claim 1 in which the member rules applicable to the social group are selected from a menu including at least one of whether (a) only the social group creator may make posts to the social group, (b) social group members other than the group creator may make posts to the social group, (c) only the social group creator may add members to, and delete members from, the social group, (d) members other than the social group creator may add members to, and delete members from, the social group, (e) members may, or may not, delete their own posts to the social group, (f) only the social group creator, and others authorized by the social group creator, may invite other device users to become members of the social group, and (g) the social group is publicly discoverable by search and the social group posts are publicly viewable.

* * * * *